United States Patent
Bettle, III et al.

(10) Patent No.: US 10,889,515 B2
(45) Date of Patent: Jan. 12, 2021

(54) SYSTEMS AND METHODS FOR FORMATION OF BIOLOGICALLY ACTIVE GRANULES AND BIOLOGICALLY ACTIVE GRANULES

(71) Applicant: BLUE FROG TECHNOLOGIES LLC, Roscoe, IL (US)

(72) Inventors: Griscom Bettle, III, Sarasota, FL (US); Ricky Eugene Roberts, Greeley, CO (US); James Rhrodrick Key, Grove, OK (US)

(73) Assignee: BLUE FROG TECHNOLOGIES LLC, Roscue, IL (US)

( * ) Notice: Subject to any disclaimer, the term of this patent is extended or adjusted under 35 U.S.C. 154(b) by 178 days.

(21) Appl. No.: 15/803,539

(22) Filed: Nov. 3, 2017

(65) Prior Publication Data

US 2018/0057377 A1 Mar. 1, 2018

Related U.S. Application Data

(63) Continuation-in-part of application No. PCT/US2016/030852, filed on May 4, 2016.
(Continued)

(51) Int. Cl.
*C02F 1/74* (2006.01)
*C02F 3/14* (2006.01)
(Continued)

(52) U.S. Cl.
CPC ............ *C02F 1/74* (2013.01); *B01F 3/04595* (2013.01); *B01F 3/04609* (2013.01);
(Continued)

(58) Field of Classification Search
CPC .... C02F 3/14; C02F 3/16; C02F 3/301; C02F 3/1257; C02F 7/00; C02F 2303/06;
(Continued)

(56) References Cited

U.S. PATENT DOCUMENTS

| 5,942,116 A | 8/1999 | Clark et al. |
| 2007/0039878 A1* | 2/2007 | Roberts ............... B01F 3/04609 |
| | | 210/605 |

(Continued)

FOREIGN PATENT DOCUMENTS

WO 2016/179327 A1 11/2016

OTHER PUBLICATIONS

International Search Report dated Feb. 15, 2019 issued in corresponding International Application No. PCT/US18/58642.

*Primary Examiner* — Bobby Ramdhanie
*Assistant Examiner* — Donovan Bui-Huynh
(74) *Attorney, Agent, or Firm* — Scully, Scott, Murphy & Presser, P.C.

(57) ABSTRACT

In one embodiment, hydrodynamic cavitation lyses influent bacteria, releasing intracellular enzymes, and creates $CaCO_3$ seed crystals that are discharged at the base of the water column. Bottom-dwelling upflow anaerobic sludge blanket (UASB)-like granules grow in a dense, viscous N, P & Ca++ rich fluid ("hydrolytic brine"). The brine hydrolyzes ancient sludge and fresh solids into simple liquids. The granules convert hydrolyzed liquids into gas. New $CaCO_3$ seeds grow at the produced gas/supernatant interface and propagate across the entire lagoon. Once the sludge inventory is digested, there is an excess of granules that modulate their gross productivity in response to substrate load, pH, and temperature. In one specific example, the treated lagoon has no odor, is free of gelled sludge and effluent.

29 Claims, 34 Drawing Sheets

Related U.S. Application Data

(60) Provisional application No. 62/156,889, filed on May 4, 2015.

(51) Int. Cl.

| | | |
|---|---|---|
| *B01F 13/02* | (2006.01) | |
| *B01F 13/00* | (2006.01) | |
| *C02F 3/16* | (2006.01) | |
| *C02F 3/30* | (2006.01) | |
| *B01F 3/04* | (2006.01) | |
| *C02F 7/00* | (2006.01) | |
| *C02F 3/12* | (2006.01) | |

(52) U.S. Cl.
CPC ...... *B01F 3/04617* (2013.01); *B01F 3/04773* (2013.01); *B01F 13/0049* (2013.01); *B01F 13/02* (2013.01); *C02F 3/14* (2013.01); *C02F 3/16* (2013.01); *C02F 3/301* (2013.01); *C02F 7/00* (2013.01); *C02F 3/1257* (2013.01); *C02F 2303/06* (2013.01); *Y02W 10/15* (2015.05)

(58) Field of Classification Search
CPC ........ C02F 1/74; B01F 13/0049; B01F 13/02; B01F 3/04595; B01F 3/04609; B01F 3/04617; B01F 3/04773
See application file for complete search history.

(56) References Cited

U.S. PATENT DOCUMENTS

| | | |
|---|---|---|
| 2010/0096324 A1 | 4/2010 | Roberts et al. |
| 2014/0219054 A1 | 8/2014 | Mousa et al. |
| 2015/0057153 A1 | 2/2015 | DiTuro |

\* cited by examiner

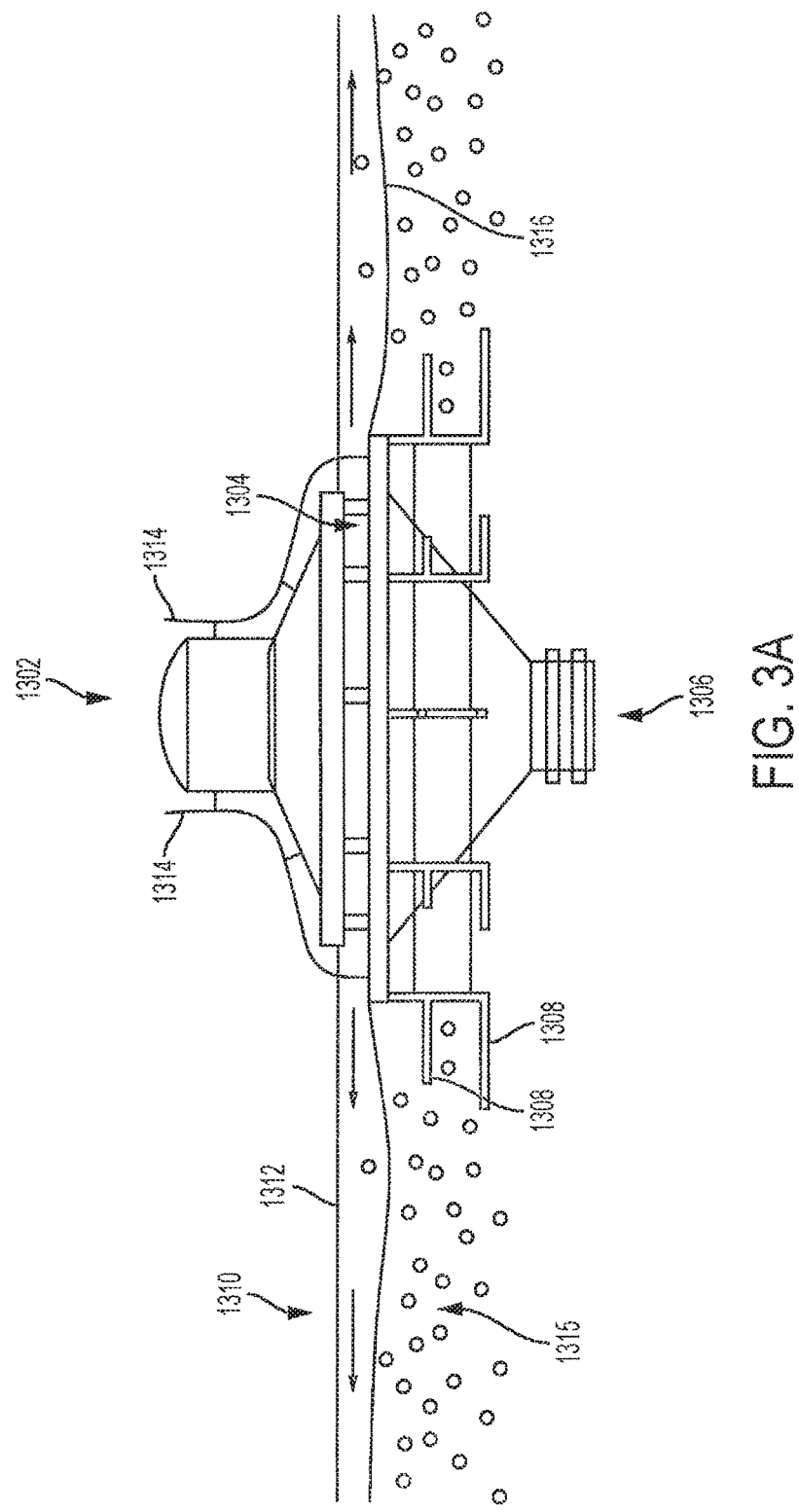

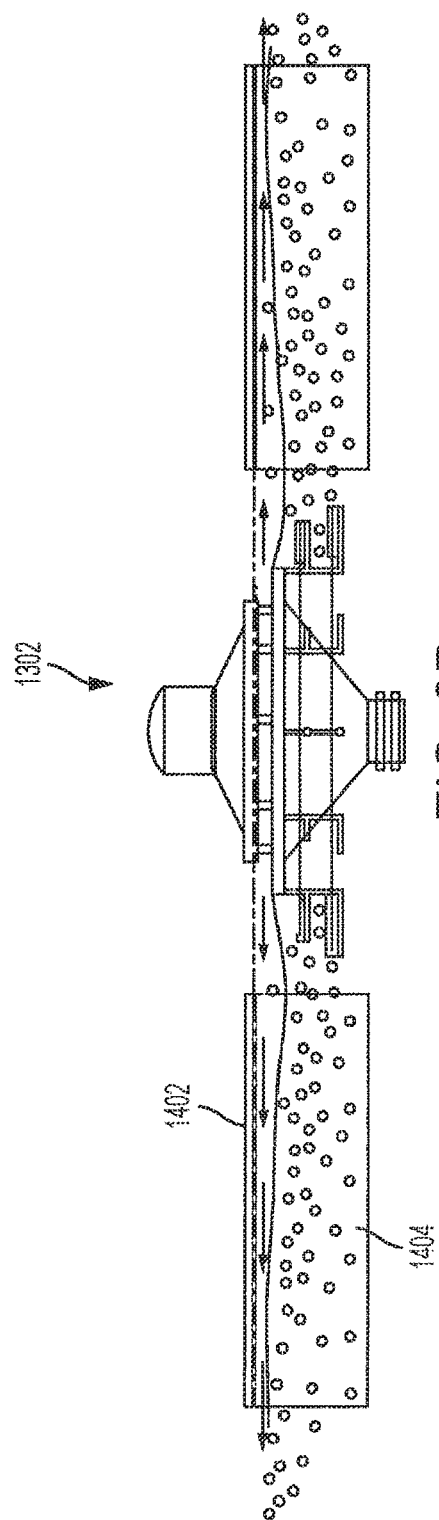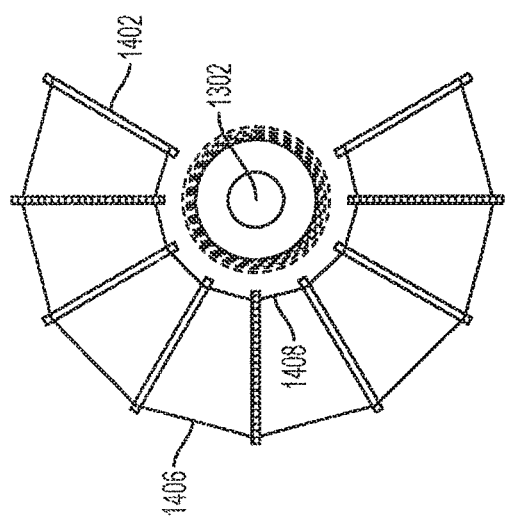

3PACK CLUSTER

4PACK CLUSTER

5PACK CLUSTER

8PACK CLUSTER

5 PACK CLUSTER BF/CSTR

1 BF/CSTR

SYSTEMS AND METHODS FOR FORMATION OF BIOLOGICALLY ACTIVE GRANULES AND BIOLOGICALLY ACTIVE GRANULES

CROSS-REFERENCE TO RELATED APPLICATION

The present disclosure is a continuation-in part of International Patent Application PCT/US 2016/030852, filed on May 4, 2016, and claims priority from U.S. Provisional Patent Application No. 62/156,889 filed on May 4, 2015, the contents of both of which are incorporated by reference.

FIELD OF THE DISCLOSURE

The present disclosure relates generally to systems and methods of waste treatment. In one, embodiment, the present disclosure relates to systems and methods for treating wastewater.

Other embodiments relate to systems and methods for formation of biologically active granules and biologically active granules useful for treating waste.

BACKGROUND OF THE DISCLOSURE

Wastewater remediation is a broadly studied art with many innovations. Waste is treated aerobically, anaerobically or both. In waste water, especially from industrial waste, there is an accumulation of biomass, called biosolids or sludge. It is costly and difficult to treat biosolids because the contents are virtually unknown and unknowable. Therefore, much of the biosolids are concentrated, digested, composted, land applied or entombed in landfills and the like.

Aerobic systems for treating waste products, including sludge, are well known. They usually involve oxygen-addition, return activated sludge (RAS) as a source of active aerobic bacteria, a mixing step and a clarification step. Some of the clarified solids are returned as RAS or are wasted (WAS).

Anaerobic systems for treating waste products, including sludge, are also well known. A common reactor design is the Up-flow Anaerobic Sludge Bed (UASB). Wastewater is pumped into a granular sludge bed to fluidize the granules. Fluid flow allows the gas to escape and the granules return to the fluidized bed. The granules self-form or can be introduced from an outside source.

The biochemistry of biofilms on minerals is well known. A solid mineral is formed (or introduced as a seed crystal). Bacteria colonize onto the surface of these seed crystals. The first colonizers die as they make a sacrificial glue to bind the biofilm to the surface. More colonizers form a synergistic organized collection of bacteria. Bacteria secrete a biopolymer that can bind small mineral crystals to the surface, building up a granule.

Attached growth surfaces are well known. In creeks, for example, slime grows on rocks as flooded aerated water flows by generally in one direction (downhill). In trickling filters, wastewater trickles down over rocks while air is bubbled up from below. Trickling filters are not flooded. An entire ecosystem grows in the thin, aerated film that grazes on the dead and dying attached bacteria. The grazing keeps the trickling filter from fouling.

More recently Kania et al., U.S. Pat. No. 8,372,277 (Kania '277), disclosed a floating streambed of a permeable matrix flooded by flow from a circulator, with or without added air and intended to de-stratify the water column. Kania '277 teaches flow through the permeable matrix. However, a periphyton layer grows over the surface, requiring periodic cleaning.

Circulators are well known (Roberts et al., U.S. Pat. Nos. 8,298,411 and 7,329,351). Impingement aeration to make fine bubbles is also known (Bettle U.S. Pat. No. 5,772,886). The contents of the art cited in this paragraph are incorporated by reference Other circulators are described in PCT Publication No. WO 2014/176388, the contents of which are incorporated by reference.

Granules are common in up-flow anaerobic reactors but are not common in ponds as there are no seeds to start the process. The present disclosure provides a means of generating these granules in a controlled location in a higher concentration and as a result, provides a more effective method for removing the sludge in the waste water.

SUMMARY OF THE DISCLOSURE

The present disclosure provides a system for the treatment of sludge in a lagoon containing water that promotes the formation of biologically active granules that digest sludge in the lagoon, the lagoon including a bottom thereof, the water of the lagoon having a surface layer, the system comprising: X number of water circulators having an impeller disposed in the lagoon in a cluster, wherein X is greater than three or equal to 3, e.g., 3, 4, 5, 6, 7, 8, 9, or 10; at least one of said X number of water circulators being configured to: (a) cavitate water taken from the lagoon; and (b) expel the water after cavitation, wherein the water is expelled from said impeller at constant impeller rotational speed at a cyclically varying flow rate radially across the surface from the centerline of each circulator such that at least some of the expelled water travels away from the water circulator in a path essentially parallel to the surface layer of the lagoon water; when said at least one water circulator is a number of water circulators less than X, the remainder of said X number of water circulators, other than said at least one water circulator, being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: each water circulator is located essentially on a circumference of a circle defined by a predetermined radial distance from a center point of the circle each water circulator is located essentially equidistant, along the circumference of the circle, from each adjacent one of the other water circulators; (e) a respective hydraulic wall formed from at least some of the water expelled from each of a given pair of adjacent water circulators, where horizontal flow vectors of the expelled water are substantially equal and opposite between adjacent circulators, said hydraulic wall redirecting the expelled water downward towards the bottom of the lagoon, thereby creating the conditions for the formation of the biologically active granules; and a quiescent area in fluid communication and downstream from the water circulator that cavitated the water, and located in the redirected path of the expelled water towards the bottom of the lagoon, whereby the expelled water forms a water column in said quiescent area to stratify the granules into a plurality of layers according to their density. (the water in the lagoon when said X water circulators are disposed in the lagoon having an initial pH sufficient to form biologically active granules, such as at a pH of 7.5 or greater.

The reference herein to "circumference of a circle" refers to an imaginary circle. The reference herein to "center point of the circle" refers to an imaginary center point.

Another embodiment of the present disclosure provides a method for the treatment of sludge in a lagoon containing water that promotes the formation of biologically active granules that digest sludge in the lagoon, the lagoon including a bottom thereof, the water of the lagoon having a surface layer, the water of the lagoon at the commencement of treatment having an initial pH of at least 7.5, after which the pH may range from 6.2 to 10, the method comprising: placing X number of water circulators in the lagoon in a cluster, wherein X is greater than or equal to 3, e.g., 3, 4, 5, 6, 7, 8, 9, or 10; at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, a remainder of said X number of water circulators, other than said at least one water circulator being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are placed in the lagoon in a configuration such that: each water circulator is located essentially on a circumference of a circle defined by a predetermined radial distance from a center point of the circle and; each water circulator is located essentially equidistant, along the circumference of the circle, from each adjacent one of the other water circulators; (c) forming a respective hydraulic wall from at least some of the water expelled from each of a given pair of adjacent water circulators where horizontal flow vectors of the expelled water are substantially equal and opposite between adjacent circulators, said hydraulic wall redirecting the expelled water downward, towards the bottom of the lagoon, thereby creating the conditions for the formation of the biologically active granules; and a quiescent area in fluid communication and downstream of the water circulator cavitating the water and located in the redirected pathway of the expelled water towards the bottom of the lagoon, whereby the expelled water forms in the quiescent area a water column to stratify the granules into a plurality of layers according to the density of each of the granules.

Another embodiment of the present disclosure provides lagoon granules formed by the above method.

The present disclosure provides a system for the treatment of sludge in a lagoon containing water that promotes the formation of biologically active granules that digest sludge in the lagoon, the lagoon including a bottom thereof, the water of the lagoon having a surface layer, the system comprising: X number of water circulators disposed in the lagoon, wherein X is 3, 4, 5, 6, 7, 8, 9, or 10; at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, the remainder of said X number of water circulators, other than said at least one water circulator, being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: (c) each water circulator is located essentially on a circumference of a circle defined by a predetermined radial distance from a center point of the circle; (d) each water circulator is located essentially equidistant, along the circumference of the circle, from each adjacent one of the other water circulators; (e) at least some of the water expelled from each of a given pair of adjacent water circulators forms a respective hydraulic wall; (f) each of the hydraulic walls intersects essentially at the center line where the horizontal outflow vectors are equal and opposite; (g) each of a given pair of adjacent hydraulic walls forms a respective hydraulic corner where the given pair of hydraulic walls intersect essentially at the center point; (h) the hydraulic walls direct water expelled from each of the water circulators into the hydraulic corners; and (i) the hydraulic corners force at least some of the water directed therein by the hydraulic walls downward, towards the bottom of the lagoon, thereby creating the conditions for the formation of the biologically active granules, the water in the lagoon when said X water circulators are disposed in the lagoon having an initial pH sufficient to form biologically active granules, such as at a pH of 7.5 or greater.

Another embodiment of the present disclosure provides a method for the treatment of sludge in a lagoon containing water that promotes the formation of biologically active granules that digest sludge in the lagoon, the lagoon including a bottom thereof, the water of the lagoon having a surface layer, the water of the lagoon at the commencement of treatment having an initial pH of at least 7.5, after which the pH may range from 6.2 to 10, the method comprising: placing X number of water circulators in the lagoon, wherein X is 3, 4, 5, 6, 7, 8, 9, or 10; at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, a remainder of said X number of water circulators, other than said at least one water circulator being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are placed in the lagoon in a configuration such that: (c) each water circulator is located essentially on a circumference of a circle defined by a predetermined radial distance from a center point of the circle; (d) each water circulator is located essentially equidistant, along the circumference of the circle, from each adjacent one of the other water circulators; (e) at least some of the water expelled from each of a given pair of adjacent water circulators forms a respective hydraulic wall; (f) each of the hydraulic walls intersect essentially at the center point; (g) each of a given pair of adjacent hydraulic walls forms a respective hydraulic corner where the given pair of hydraulic walls intersect essentially at the center point; (h) the hydraulic walls direct water expelled from each of the water circulators into the hydraulic corners; and (i) the hydraulic corners force at least some of the water directed therein by the hydraulic walls downward, towards the bottom of the lagoon, thereby creating the conditions for the formation of the biologically active granules.

Another embodiment of the present disclosure provides lagoon granules formed by the above method.

Another embodiment of the present disclosure provides a system for the treatment of sludge in a lagoon containing water that promotes the formation of biologically active granules that digest sludge in the lagoon, the lagoon including a bottom thereof, the water of the lagoon having a surface layer, the system comprising: Y number of clusters of water circulators disposed in the lagoon, wherein Y is 2, 3, 4, 5, 6, 7, 8, 9, 10, 11, 12, 13, 14, 15, 16, 17, 18, 19, or 20; each of the Y number of clusters of water circulators comprising: X number of water circulators disposed in the lagoon, wherein X is 3, 4, 5, 6, 7, 8, 9, or 10 (wherein the value of X for any given cluster may be independent of the value of X for any other cluster); at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, a remainder of said X number of water circulators, other than said at least one water circulator, being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: each water circulator is located essentially on a circumference of a circle defined by a predetermined radial distance from a center point of the circle; and each water circulator is located essentially equidistant, along the circumference of the circle, from each adjacent one of the other water circulators; (c) respective hydraulic wall formed from at least some of the water expelled from each of a given pair of adjacent water circulators, wherein horizontal flow vectors are substantially equal and opposite between adjacent circulators, said hydraulic wall redirecting the flow of water downward towards the bottom of the lagoon; thereby creating the conditions for the formation of the biologically active granules; (f) a quiescent area downstream of the circulator clusters and in fluid communication therewith and in the pathway of the redirected path of the expelled water towards the bottom of the lagoon, wherein the expelled water forms a water column to stratify the granules into a plurality of layers according to the density of each of the granules, the water of the lagoon when the circulators are so arranged having an initial pH of at least 7.5, after which the pH may range from 6.2 to 10.

Another embodiment of the present invention provides a method for the treatment of sludge in a lagoon containing water that promotes the formation of biologically active granules that digest sludge in the lagoon, the lagoon including a bottom thereof, the water of the lagoon having a surface layer, the water of the lagoon at the commencement of treating having an initial pH of at least 7.5, after which the pH may range from 6.2 to 10, the method comprising: forming Y number of clusters of water circulators in the lagoon, wherein Y is 2, 3, 4, 5, 6, 7, 8, 9, 10, 11, 12, 13, 14, 15, 16, 17, 18, 19, or 20; each of the Y number of clusters of water circulators being formed by: placing X number of water circulators in the lagoon, wherein X is 3, 4, 5, 6, 7, 8, 9, or 10 (wherein the value of X for any given cluster may be independent of the value of X for any other cluster); at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, a remainder of said X number of water circulators other than said at least one water circulator being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are placed in the lagoon in a configuration such that: each water circulator is located essentially on a circumference of a circle defined by a predetermined radial distance from a center point of the circle and each water circulator is located essentially equidistant, along the circumference of the circle, from each adjacent one of the other water circulators; ) at least some of the water expelled from each of a given pair of adjacent water circulators forms a respective hydraulic wall wherein horizontal flow vectors are substantially equal and opposite between adjacent circulators, said hydraulic wall redirecting the flow of water downward towards the bottom of the lagoon; thereby creating the conditions for the formation of the biologically active granules; and a quiescent area downstream of the circulator clusters and in fluid communication therewith and in the redirected pathway of the expelled water to the bottom of the lagoon, wherein the expelled water forms a water column to stratify the granules into a plurality of layers according to the density of each of the layers, the water of the lagoon when the circulators are so arranged having an initial pH of at least 7.5, after which the pH may range from 6.2 to 10.

Another embodiment of the present invention provides lagoon granules formed by the above method.

Another embodiment of the present disclosure provides a system for the treatment of sludge in a lagoon containing water that promotes the formation of biologically active granules that digest sludge in the lagoon, the lagoon including a bottom thereof, the water of the lagoon having a surface layer, the system comprising: Y number of clusters of water circulators disposed in the lagoon, wherein Y is 2, 3, 4, 5, 6, 7, 8, 9, 10, 11, 12, 13, 14, 15, 16, 17, 18, 19, or 20; each of the Y number of clusters of water circulators comprising: X number of water circulators disposed in the lagoon, wherein X is 3, 4, 5, 6, 7, 8, 9, or 10 (wherein the value of X for any given cluster may be independent of the value of X for any other cluster); at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, a remainder of said X number of water circulators, other than said at least one water circulator, being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: (c) each water circulator is located essentially on a circumference of a circle defined by a predetermined radial distance from a center point of the circle; (d) each water circulator is located essentially equidistant, along the circumference of the circle, from each adjacent one of the other water circulators; (e) at least some of the water expelled from each of a given pair of adjacent water circulators forms a respective hydraulic wall; (f) each of the hydraulic walls intersects essentially at the center point; (g) each of a given pair of adjacent hydraulic walls forms a respective hydraulic corner where the given pair of hydraulic walls intersect essentially at the center point; (h) the hydraulic walls direct water expelled from each of the water circulators into the hydraulic corners; and (i) the hydraulic corners force at least some of the water directed therein by the hydraulic walls downward, towards the bottom of the lagoon, thereby creating the conditions for the formation of the biologically active granules, the water of the lagoon when the circulators are so arranged having an initial pH of at least 7.5, after which the pH may range from 6.2 to 10.

Another embodiment of the present invention provides a method for the treatment of sludge in a lagoon containing water that promotes the formation of biologically active granules that digest sludge in the lagoon, the lagoon including a bottom thereof, the water of the lagoon having a surface layer, the water of the lagoon at the commencement of treating having an initial pH of at least 7.5, after which the pH may range from 6.2 to 10, the method comprising: forming Y number of clusters of water circulators in the lagoon, wherein Y is 2, 3, 4, 5, 6, 7, 8, 9, 10, 11, 12, 13, 14, 15, 16, 17, 18, 19, or 20; each of the Y number of clusters of water circulators being formed by: placing X number of water circulators in the lagoon, wherein X is 3, 4, 5, 6, 7, 8, 9, or 10 (wherein the value of X for any given cluster may be independent of the value of X for any other cluster); at least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, a remainder of said X number of water circulators other than said at least one water circulator being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are placed in the lagoon in a configuration such that: (c) each water circulator is located essentially on a circumference of a circle defined by a predetermined radial distance from a center point of the circle; (d) each water circulator is located essentially equidistant, along the circumference of the circle, from each adjacent one of the other water circulators; (e) at least some of the water expelled from each of a given pair of adjacent water circulators forms a respective hydraulic wall; (f) each of the hydraulic walls intersects essentially at the center point; (g) each of a given pair of adjacent hydraulic walls forms a respective hydraulic corner where the given pair of hydraulic walls intersect essentially at the center point; (h) the hydraulic walls direct water expelled from each of the water circulators into the hydraulic corners; and (i) the hydraulic corners force at least some of the water directed therein by the hydraulic walls downward, towards the bottom of the lagoon, thereby creating the conditions for the formation of the biologically active granules.

Another embodiment of the present invention provides lagoon granules formed by the above method.

Another embodiment of the present invention provides a system for effecting the clearance of sludge in a lagoon containing water, the lagoon including a bottom thereof, the lagoon being bounded on at least a first side by a first berm and a second side by a second berm, the lagoon having an influent input side, the water of the lagoon having a surface layer, the water of the lagoon having an initial pH of at least 7.5, after which the pH may range from 6.2 to 10, the system comprising: at least one baffle, the at least one baffle being disposed across the lagoon between the first berm and the second berm, the at least one baffle dividing the lagoon into at least a first cell and a second cell, the first cell being on a first side of the at least one baffle, the first cell being adjacent to the influent input side of the lagoon, the second cell being on a second side of the at least one baffle, the second cell being adjacent to the first cell, the at least one baffle extending from the surface layer of the lagoon water toward the bottom of the lagoon, the at least one baffle being of a vertical height such that the at least one baffle does not reach the bottom of the lagoon; and at least one water circulator disposed in the first cell of the lagoon, the at least one water circulator being configured to (a) take in water from the lagoon travelling along a substantially vertical path, essentially perpendicular to the surface layer of the lagoon water, leading up to the at least one water circulator from below the at least one water circulator; and (b) to expel the water taken in, wherein the water is expelled such that at least some of the expelled water travels away from the at least one water circulator toward the at least one baffle in a path essentially parallel to the surface layer of the lagoon water; wherein at least some of the expelled water impinges on the at least one baffle and is redirected downward toward the bottom of the lagoon; and wherein a path for effluent to travel from the first cell to the second cell is formed below the at least one baffle, between a bottom edge of the at least one baffle and the bottom of the lagoon.

Another embodiment of the present invention provides a method for forming a system that effects the clearance of sludge in a lagoon containing water, the lagoon including a bottom thereof, the lagoon being bounded on at least a first side by a first berm and a second side by a second berm, the lagoon having an influent input side, the water of the lagoon having a surface layer, the water of the lagoon having an initial pH of at least 7.5, after which the pH may range from 6.2 to 10, the method comprising: placing in the lagoon at least one baffle, the at least one baffle being disposed across the lagoon between the first berm and the second berm, the at least one baffle dividing the lagoon into at least a first cell and a second cell, the first cell being on a first side of the at least one baffle, the first cell being adjacent to the influent input side of the lagoon, the second cell being on a second side of the at least one baffle, the second cell being adjacent to the first cell, the at least one baffle extending from the surface layer of the lagoon water toward the bottom of the lagoon, the at least one baffle being of a vertical height such that the at least one baffle does not reach the bottom of the lagoon; and placing at least one water circulator in the lagoon, the at least one water circulator being disposed in the first cell of the lagoon, the at least one water circulator being configured to (a) take in water from the lagoon travelling along a substantially vertical path, essentially perpendicular to the surface layer of the lagoon water, leading up to the at least one water circulator from below the at least one water circulator; and (b) expel the water taken in, wherein the water is expelled such that at least some of the expelled water travels away from the at least one water circulator toward the at least one baffle in a path essentially parallel to the surface layer of the lagoon water; wherein at least some of the expelled water impinges on the at least one baffle and is redirected downward toward the bottom of the lagoon; and wherein a path for effluent to travel from the first cell to the second cell is formed below the at least one baffle, between a bottom edge of the at least one baffle and the bottom of the lagoon.

Another embodiment of the present invention provides a system for effecting the clearance of sludge in a lagoon containing water, the lagoon including a bottom thereof, the water of the lagoon having a surface layer, the water of the lagoon having an initial pH of at least 7.5, after which the pH may range from 6.2 to 10, the system comprising: at least one baffle, the at least one baffle being disposed in the water of the lagoon, the at least one baffle providing substantially 360 degree containment around a portion of the surface layer of the lagoon water; and at least one water circulator, the at least one water circulator being disposed in the water of the lagoon in the portion contained by the at least one baffle, the at least one water circulator being configured to (a) take in water from the lagoon travelling along a substantially vertical path, essentially perpendicular to the surface layer of the lagoon water, leading up to the at least one water circulator from below the at least one water circulator; and (b) expel the water taken in, wherein the water is expelled such that at least some of the expelled water travels away from the at least one water circulator toward the at least one baffle in a path essentially parallel to the surface layer of the lagoon water; wherein at least some of the expelled water impinges on the at least one baffle and is redirected downward toward the bottom of the lagoon; and wherein a path for effluent to travel to an area of the lagoon outside the at least one baffle is formed below the at least one baffle, between a bottom edge of the at least one baffle and the bottom of the lagoon.

Another embodiment of the present invention provides a method for forming a system that effects the clearance of sludge in a lagoon containing water, the lagoon including a bottom thereof, the water of the lagoon having a surface layer, the water of the lagoon having an initial pH of at least 7.5, after which the pH may range from 6.2 to 10, the method comprising: placing in the lagoon at least one baffle, the at least one baffle providing substantially 360 degree containment around a portion of the surface layer of the lagoon water; and placing at least one water circulator in the lagoon, the at least one water circulator being disposed in the water of the lagoon in the portion contained by the at least one baffle, the at least one water circulator being configured to take in water from the lagoon travelling along a substantially vertical path, essentially perpendicular to the surface layer of the lagoon water, leading up to the at least one water circulator from below the at least one water circulator; and (b) expel the water taken in, wherein the water is expelled such that at least some of the expelled water travels away from the at least one water circulator toward the at least one baffle in a path essentially parallel to the surface layer of the lagoon water; wherein at least some of the expelled water impinges on the at least one baffle and is redirected downward toward the bottom of the lagoon; and wherein a path for effluent to travel to an area of the lagoon outside the at least one baffle is formed below the at least one baffle, between a bottom edge of the at least one baffle and the bottom of the lagoon.

Another embodiment of the present invention provides a method for formation of biologically active granules that digest sludge in a lagoon containing water, the lagoon including a bottom thereof, the lagoon being bounded on at least a first side by a first berm and a second side by a second berm, the lagoon having an influent input side, the water of the lagoon having a surface layer, the water of the lagoon having an initial pH of at least 7.5, after which the pH may range from 6.2 to 10, the method comprising: placing in the lagoon at least one baffle, the at least one baffle being disposed across the lagoon between the first berm and the second berm, the at least one baffle dividing the lagoon into at least a first cell and a second cell, the first cell being on a first side of the at least one baffle, the first cell being adjacent to the influent input side of the lagoon, the second cell being on a second side of the at least one baffle, the second cell being adjacent to the first cell, the at least one baffle extending from the surface layer of the lagoon water toward the bottom of the lagoon, the at least one baffle being of a vertical height such that the at least one baffle does not reach the bottom of the lagoon; and placing at least 3 water circulators in the lagoon, each of the at least 3 water circulator being disposed in the first cell of the lagoon, each of the at least 3 water circulator being configured to (a) take in water from the lagoon travelling along a substantially vertical path, essentially perpendicular to the surface layer of the lagoon water, leading up to each of the at least 3 water circulators from below each of the at least 3 water circulators; and (b) expel the water taken in, wherein the water is expelled such that at least some of the expelled water travels away from each of the at least 3 water circulators toward the at least one baffle in a path essentially parallel to the surface layer of the lagoon water; wherein at least some of the water expelled from a given one of the at least 3 water circulators forms a respective hydraulic wall between the given one of the at least 3 water circulators and a respective one of the 2 other water circulators; wherein each of the hydraulic walls intersects essentially at a center point relative to the at least 3 water circulators; wherein each of a given pair of adjacent hydraulic walls forms a respective hydraulic corner where the given pair of hydraulic walls intersect essentially at the center point; wherein the hydraulic walls direct water expelled from each of the plurality of at least 3 water circulators into the hydraulic corners; wherein the hydraulic corners force at least some of the water directed therein by the hydraulic walls downward, towards the bottom of the lagoon, thereby creating the conditions for the formation of the biologically active granules; wherein at least some of the expelled water impinges on the at least one baffle and is redirected downward toward the bottom of the lagoon; and wherein a path for effluent to travel from the first cell to the second cell is formed below the at least one baffle, between a bottom edge of the at least one baffle and the bottom of the lagoon.

Another embodiment of the present invention provides a method for formation of biologically active granules that digest sludge in a lagoon containing water, the lagoon including a bottom thereof, the water of the lagoon having a surface layer, the water of the lagoon having an initial pH of at least 7.5, after which the pH may range from 6.2 to 10, the method comprising: placing in the lagoon at least one baffle, the at least one baffle providing substantially 360 degree containment around a portion of the surface layer of the lagoon water; and placing at least 3 water circulators in the lagoon, each of the at least 3 water circulators being disposed in the water of the lagoon in the portion contained by the at least one baffle, each of the at least 3 water circulators being configured to take in water from the lagoon travelling along a substantially vertical path, essentially perpendicular to the surface layer of the lagoon water, leading up to each of the at least 3 water circulators from below each of the at least 3 water circulators; and (b) expel the water taken in, wherein the water is expelled such that at least some of the expelled water travels away from each of the at least three water circulators toward the at least one baffle in a path essentially parallel to the surface layer of the lagoon water; wherein at least some of the water expelled from a given one of the at least 3 water circulators forms a respective hydraulic wall between the given water circulator and a respective one of the at least 2 other water circulators; wherein each of the hydraulic walls meets essentially at a center point relative to the at least 3 water circulators; wherein each of a given pair of adjacent hydraulic walls forms a respective hydraulic corner where the given pair of hydraulic walls intersect essentially at the center point; wherein the hydraulic walls direct water expelled from each of the plurality of the at least 3 water circulators into the hydraulic corners; wherein the hydraulic corners force at least some of the water directed therein by the hydraulic walls downward, towards the bottom of the lagoon, thereby creating the conditions for the formation of the biologically active granules; wherein at least some of the expelled water impinges on the at least one baffle and is redirected downward toward the bottom of the lagoon; and wherein a path for effluent to travel to an area of the lagoon outside the at least one baffle is formed below the at least one baffle, between a bottom edge of the at least one baffle and the bottom of the lagoon.

In still another embodiment, the methodology disclosed herein not only reduces or eliminates waste but also reduces or eliminates odor.

BRIEF DESCRIPTION OF THE DRAWINGS

These and other features, aspects, and advantages of the present invention will become better understood with regard to the following description, appended claims, and accompanying drawings (which are not drawn to scale) wherein:

FIGS. 3A-3C illustrate schematic representations of an aerator apparatus used in the present disclosure;

DETAILED DESCRIPTION OF DISCLOSURE

Figure 1A:
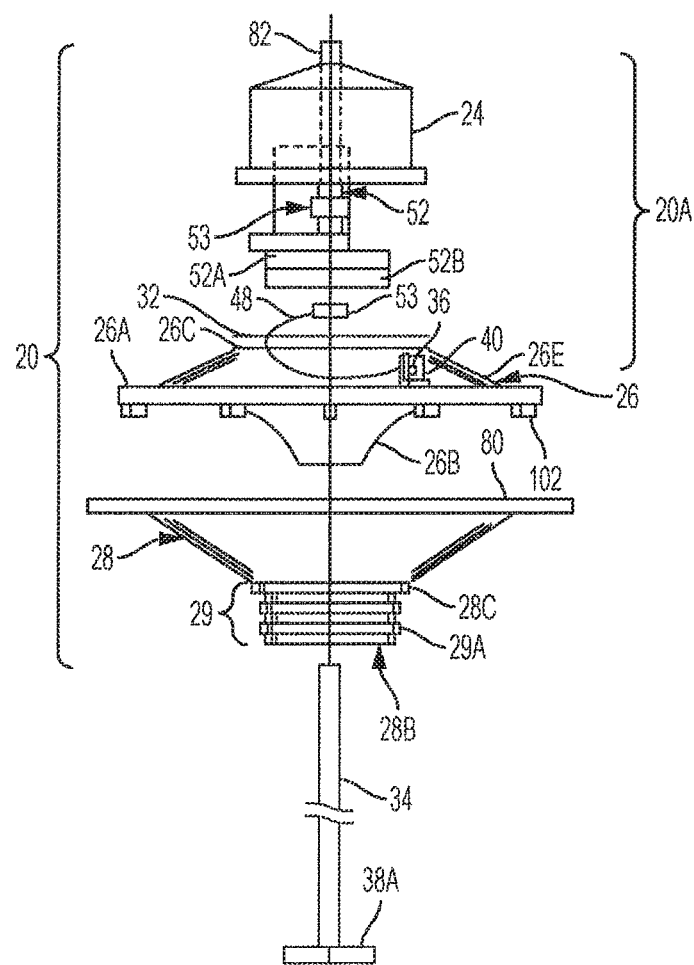
FIG. 1A illustrates an exploded schematic view of an example water circulator used in the present disclosure (in one specific example, such a water circulator may be a Blue Frog™ circulator)

For the purposes of describing and claiming the present invention, the term "lagoon" is intended to refer to an artificial or naturally occurring body of water for the treatment of influent and/or effluent and/or for accommodating surface water that overflows drains during precipitation. In various examples, such a lagoon may contain salt water or fresh water. In other examples, such a lagoon may be a tank, a pool, a pond or a lake, including natural lake. In yet another example, such a lagoon may be an equalization tank (EQ) for treating influent (such EQ tanks are designed to equalize high/low flows, etc.). As defined, a lagoon does not have any natural current or flow to a larger body of water, such as a river, lake or ocean, but rather is a body of water contained in boundaries that may be natural, such as bordered by land or bordered by man-made structures. The lagoon, in an embodiment, is at least 3 feet deep and may be as deep as 1000 feet or more. In this disclosure, the terms tank, pool, pond or lake or EQ are being used interchangeably.

The term continuous flow stirred-tank reactor (CSTR), also known as vat- or backmix reactor, typically means a common ideal reactor type as used in chemical engineering.

A CSTR often refers to a model used to estimate the key unit operation variables when using a continuous agitated-tank reactor to reach a specified output. The mathematical model works for all fluids: liquids, gases, and slurries. The behavior of a CSTR is often approximated or modeled after a Continuous Ideally Stirred-Tank Reactor (CISTR). All calculations performed with CISTRs assume perfect mixing. In a perfectly mixed reactor, the output composition is identical to the composition of the material mixed inside the reactor, which is a function of residence time and rate of reaction. If the residence time is 5-10 times the mixing time, this approximation is typically valid for engineering purposes. The CISTR model is often used to simplify engineering calculations and can be used to describe research reactors. In practice it can only be approached in particular in industrial size reactors.

As used herein, the term BF/CSTR includes the volume enclosed by a circumferential baffle around a central circulator or circulators.

As used herein, when the term "from" is used before a numerical range, it includes the endpoints. For example, the term" from 6.5 to 7.5, includes the numerals in-between 6.5 and 7.5, as well as the endpoints 6.5 and 7.5. In addition, when the term "between" is used prior to a numerical range, as used herein, it is synonymous to the term "from", as defined above.

In an embodiment, a cluster (or single circulator) such as described herein is not a CSTR, but approximates a CSTR (i.e., the cluster (or single circulator) has outflow but does not have complete recirculation; also the material inside the baffle is not homogeneous).

As defined herein, when it is indicated that the initial pH of the water in the lagoon is 7.5 or greater, it is understood that the pH is basic or neutral or slightly less than neutral. Thus, for example, if the pH is less than 5.0, which is acidic, then the lagoon is treated so that the pH of the water therein initially prior to operating the system herein is made more basic, i.e., until the pH of the lagoon is at least 7.5. In an embodiment, the initial pH of the lagoon may be as high as 10. In an embodiment, the initial pH of the water may range from 7.5 to 10.

As defined herein, the pH in different regions of the lagoon may be the same or different. For instance, the pH at the top of the lagoon may be different relative to the pH at the bottom of the lagoon. For example, the pH at the top of a lagoon (e.g., in a CSTR) may be 7.4, but at the bottom of the lagoon (e.g., in a CSTR) the pH may be 6.5. When pH is referred to, the pH could be the top, the bottom, anywhere in between or a combination thereof.

As described herein, an aspect of the present invention relates to the arrangement of the circulators in the lagoon. Various circulators may be used. An example of a circulating apparatus (see, e.g., U.S. Patent Application Publication No. 2014/0319054, the contents of which are incorporated by reference) comprises an upper float chassis with a wider lower base thereof being equipped with an annular water outflow lip at essentially the surface level of the water; motor-driven means being mounted on the upper float chassis for drawing water into a water intake at a lower open end of the circulating apparatus for effectuating a flow of the water over the water outflow lip; a first set of concentric air hoses disposed at a first position between the water outflow lip and the water intake, the first set of concentric air hoses being in fluid communication with an air inlet disposed at a position on the upper float chassis above the surface level of the water; and a second set of concentric air hoses disposed at a second position between the water first set of concentric air hoses and the water intake, the second set of concentric air hoses being in fluid communication with the air inlet, the second set of concentric air hoses being horizontally offset from the first set of concentric air hoses such that air bubbles emitted by the second set of concentric air hoses rise to the surface level of the water between adjacent centric air hoses of the first set of concentric air hoses, wherein the first set of concentric air hoses and the second set of concentric air hoses emit jets of air bubbles into the water column between the water intake and the water outflow lip.

A further example of a circulator that can be used includes a circulating apparatus (see again, U.S. Patent Application Publication No. 2014/0319054) comprising an upper float chassis with a wider lower base thereof being equipped with an annular water outflow lip at essentially the surface level of the water; motor-driven means being mounted on the upper float chassis for drawing water into a water intake at a lower open end of the circulating apparatus for effectuating a flow of the water over the water outflow lip; and an air injector disposed between the surface level of the water and the water intake, the air injector comprising a pair of venturis configured with respective outflows directed to impinge on each other, the air injector being configured to emit a high volume of air bubbles more than 500 standard cubic feet per hour mixed with water.

Various circulators are illustrated herein.

FIG. 1A provides an exploded view of circulator 20, which is exemplary of the circulator that may be used in the present disclosure, illustrating most of the unit's components and their interaction. FIG. 1A illustrates a Blue Frog™ Circulator (such a circulator may be referred to herein as a "BF" circulator), described in U.S. Patent Application Publication No. 2014/0319054, the contents of which are incorporated by reference. Diverter 28, the lower portion of the unit, includes an inverted frusto-conical shell of substantially circular cross section and substantially straight sides. It has a protruding edge around its upper periphery, outflow lip 80, which serves to guide water discharged from circulator 20 into laminar flow along the water surface. The lower, narrowest portion of the diverter has a collar 28C, below which is located a substantially cylindrical standard connection fitting 29, including concentric ridges 29A. Diverter intake 28B is located inside connection fitting 29. These components are discussed in detail below. Drive shaft 34 extends through diverter intake 28B and mounts at its lower end an impeller hub mount 38A to which is removably attached the impeller and a plurality of blades (not shown here). In one example, drive shaft 34 is made of stainless steel or a similar strong, corrosion-resistant alloy, and is 1½ inches in diameter in a present embodiment. Optionally, the impeller can be a helical screw. In another example, the impeller may be an air fan.

Mounted above the diverter 28 is the circulator upper assembly 20A, with a float chassis 26, first including an upper frusto-conical shell 26E connected to a flat circumferential rim 26A, and mounting plate 32 mechanically attached to top surface 26C of float chassis 26 for use in mounting internal components discussed below. The float chassis 26 has a wider lower base portion formed by the base of the frusto-conical shell 26E and flat circumferential rim 26A. This wider base provides stability of the circulator in the water as well as accommodating the shape of the sectional diverter 26B attached to the lower portion of float chassis 26.

When the lower base portion has a diameter less than the upper outflow lip 80, the water profile is, in one embodiment, triangular. By the time the flow reaches the end of the upper outflow lip, there is a substantial horizontal vector and flow is radial away from the circulator centerline (that is, the outflow has a horizontal velocity vector that insures radial surface outflow).

The sectional diverter 26B resembles an inverted frustum of a cone with substantially parabolically curved sides inside and out. The upper edge of sectional diverter 26B connects to the bottom of float chassis rim 26A A plurality of supports 102 are integrally attached to the bottom of rim 26A to separate it from the outflow lip 80 when the float chassis 26 and diverter 28 are joined with mechanical connectors, as described below.

When assembled, the circulator 20 includes a motor cover 24 to protect the electric motor and other components, this cover being removably attached mechanically to the top of float-chassis 26. A lifting rod 82 is attached to the unit to facilitate moving the assembled unit. In one example, lubrication for the rotating parts is provided by a Petromatic™ grease cup 40 held by grease cup holder 36 fastened atop the rim 26A of float chassis 26, with a grease line 48 directing grease to bearing 53. An electric motor 52 is mounted on motor mounts 52B and connects to gear reducer 52A to drive the impeller attached to the impeller hub 38A at a suitable speed via drive shaft 34.

Figure 1B:
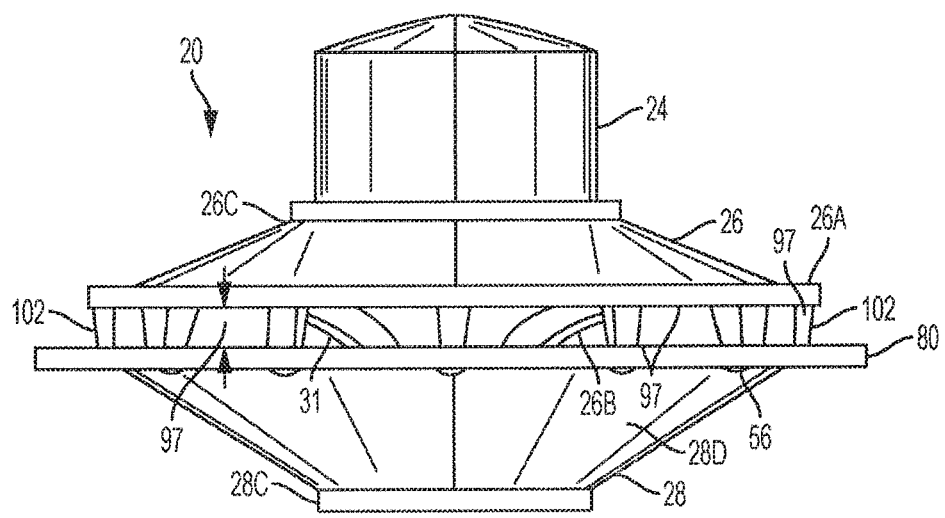
FIG. 1B illustrates an assembled view of the embodiment shown in FIG. 1A.

FIG. 1B provides a detailed view of the assembled circulator 20, including motor cover 24, float chassis 26 and diverter 28. Cover 24 is removably mechanically connected to the upper surface 26C of float chassis 26. Supports 102 are, in one example, molded as integral parts of the underside of rim 26A of float chassis 26, but can optionally be fabricated separately and attached by any suitable mechanical means. Float chassis 26 and diverter 28 are mechanically connected by bolts 56 or other suitable mechanical connectors passing through bolt holes from the underside of outflow lip 80 into the undersides of supports 102. Supports 102 are of a height appropriate to optimize the flow of water discharged through the outflow spaces 97 between the underside of rim 26A of float chassis 26 and outflow lip 80 of diverter 28, and are streamlined. In one embodiment, outflow lip 80 is six inches wide (that is, in this example, outflow lip 80 extends six inches beyond rim 26A).

The diverter intake 28B, within which the impeller operates, takes up water substantially vertically from below into a progressively expanding annular passage defined by the conical interior of diverter 28 and the parabolically curved exterior of the sectional diverter 26B. The intake water then emerges through outflow spaces 97 onto outflow lip 80 to flow in omni-directional laminar flow fashion onto the surface of the water in which the unit floats. The buoyancy of the circulator is designed so that it floats at a level such that water surface is above outflow lip 80, with water covering at least a portion of outflow spaces 97, and the water surface lying at the level of the underside of rim 26A or lower. This produces a laminar flow of water initially having a height of the height of outflow spaces 97.

The width of outflow lip 80 can be varied in different models to optimize the production of laminar flow for various volumes and rates of discharge. For example, a four-inch outflow space and six-inch outflow lip (that is, which extends six inches beyond rim 26A) are effective in producing laminar flow for a discharge of 7 million gallons/day (MG/D) using three horsepower in "mix mode" (e.g., when the impeller runs counterclockwise). When the unit is operating in "aeration mode" (i.e., the impeller runs in the opposite direction (e.g., clockwise) from mix mode), the multiple plane surfaces of diverter 28 (28D) and the sectional diverter 26B (31), forming polygonal cross sections, are helpful in producing some bubbles in the water, which contribute to better mixing and aeration. In aeration mode the flow is 2 MG/D. In other words, if non-cavitating water flow is produced by counterclockwise impeller rotation, then cavitating water flow is produced by clockwise impeller rotation (and vice versa).

Connection fitting 29 below diverter collar 28C at the bottom of diverter 28 includes concentric ridges 29A and diverter inner surface inside (not shown in FIG. 1). Water can be taken up directly through diverter intake 28B or through an intake tube (not shown). Fitting 29 is designed to mate with a fitting for an externally corrugated/internally smooth intake tube.

Figure 2A:
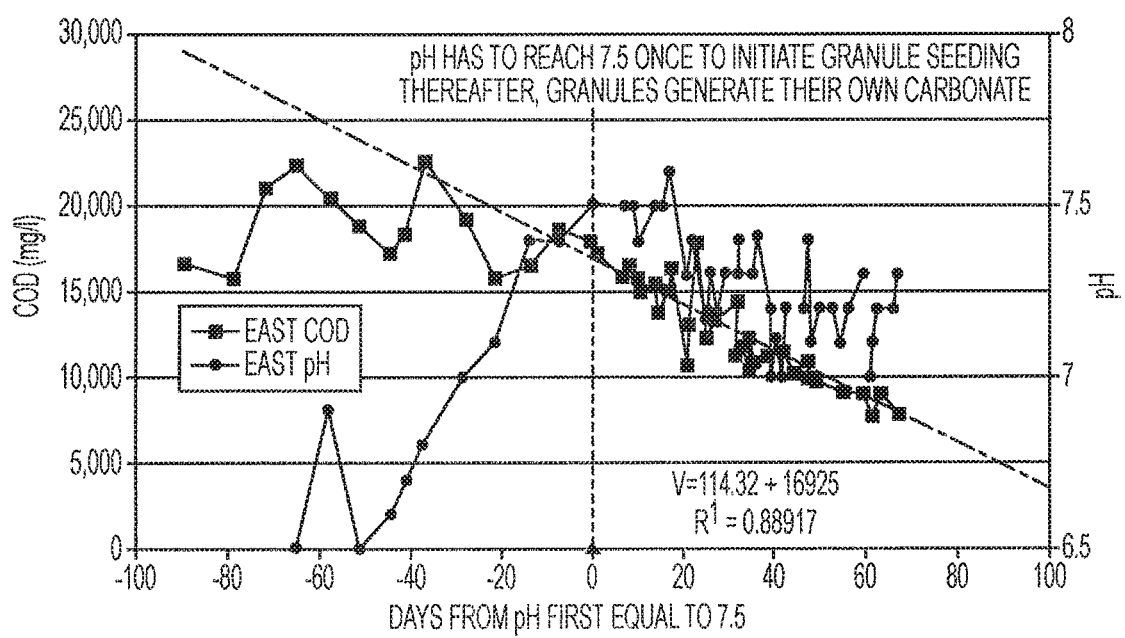
FIG. 2A illustrates a graph showing a change in chemical oxygen demand and pH in a waste pool.

Referring now to FIG. 2A, which relates to use of a water circulator (see also, U.S. Patent Application Publication No. 2014/0319054), the vertical line at zero days is the first day in which the pH=7.5. Prior to this date, the chemical oxygen demand (COD) was random; after this date, COD declined linearly. Colonizing bacteria that form the gas-forming bio-film populate the granules, once formed. The acid-consuming granule then creates $CO_3^-$ anions locally to allow granules to grow. The small granules are fluidized by produced gas and colonize the bottom of the entire pond. The large granules locate on sludge that is not easily broken up (i.e., recalcitrant sludge) and slowly digest it.

Figure 2B:
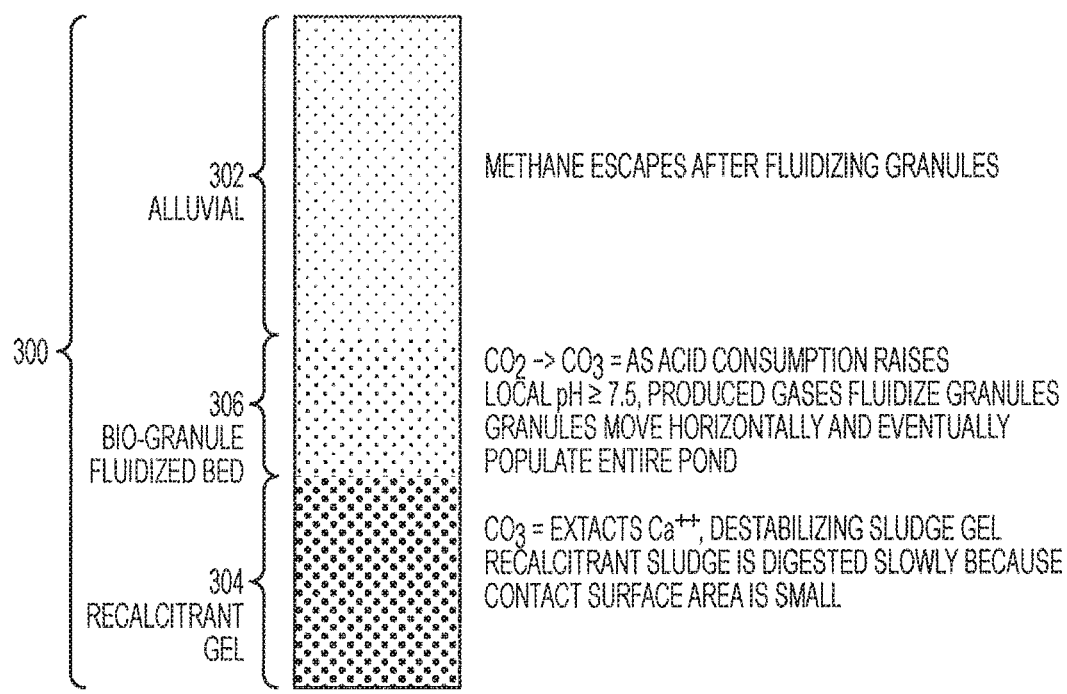
FIG. 2B illustrates a cross-sectional representation of sludge in a waste treatment pond.

Referring now to FIG. 2B, which relates to use of a water circulator (see also, U.S. Patent Application Publication No. 2014/0319054), sludge 300 is a mixture of alluvial sludge 302, having total solids of less than 2.5%, and recalcitrant gelled sludge 304 comprising 2.5% or more total solids. The granules are sufficiently dense to pass through the alluvial sludge and sit on top of the recalcitrant gelled sludge to form a bio-granule fluidized bed 306.

Another water circulator, identified as 1302, is illustrated in FIGS. 3A-3C. Circulator 1302 may be a Yellow Frog™ Circulator (or "YF" circulator), which may be used as a circulator in the disclosure herein. These figures illustrate an apparatus for making vertical-rising bubbles move horizontally. Bubble escape velocity is proportional to bubble radius until the bubble is greater than 1 mm. Thereafter the escape velocity is constant. The internal components of the circulator 1302 (which is sometimes referred to herein as "YF 1302") are similar to those shown in FIGS. 1A and 1B, thus only distinguishing features will be described hereinbelow.

Aerators are historically designed to maximize droplet macro surface area (number of drops×area/droplet) in air, or make air bubbles small (greater macro surface area) and deep (more detention time for oxygen transfer). These strategies consume large amounts of energy by throwing water up into the air or pushing gas deep into the water column. Many inventions have been made to increase the oxygen transfer rate (OTR). OTR is a helpful way to measure efficiency in aerobic systems (lbs $O_2$/hp×hr).

OTR is an inelegant measure in hybrid systems wherein air is added, but much of the remediation takes place in anaerobic granules. OTR explicitly assumes that 100% of remediation is aerobic. For example if half the BOD were removed aerobically and half anaerobically, the reported OTR of the aerators would double.

It is well known that when bubbles rise to the surface, the elevation of the gas/liquid mixture rises and fluid flows radially away from the bubble. If bubbles are added in a line, e.g. from an aerator hose, the flow is left and right from the axis of the hose.

If droplets are thrown radially from a splasher aerator, the drops have a horizontal and vertical vector. The horizontal vector makes the fluid flow away from the splasher.

The YF 1302 is an improved aerator that decouples bubble formation and fluid flow. YF 1302 is a circulator with radial surface outflow 1304, a water intake 1306, air intake 1314, and two sets of four concentric rings of aeration hose 1308 connected to the air intake 1314.

The concentric rings 1308 are positioned at sufficient position apart below the surface of the water for the emission of microbubbles to rise between the aeration hoses of the upper set of concentric rings. In an embodiment, the concentric rings are positioned at 9 inches and 18" below the surface, respectively. Additionally, the lower (second) set of concentric rings 1308 are staggered with respect to the upper (first) set of concentric rings 1308, such that micro-bubbles emitted by the lower set of concentric rings 1308 rise between the aeration hoses of the upper set of concentric rings 1308. The above positioning of the concentric rings 1308 is intended for illustrative purposes. The upper concentric ring is positioned more than 2 times deeper in the water column than the depth of the water discharge from the radial surface outflow 1304 with respect to the surface of the water. At twice the depth, the air bubbles emitted by the upper set of concentric rings 1308 are below the wave/no wave interface created by the water discharge.

In an embodiment, each of the two sets of concentric rings 1308 is connected to a respective air intake 1314, such that the flow between the upper set of concentric rings 1308 and the lower set of concentric rings 1308 is equalized. Since there is a minimum 6 inch gap between the upper set of concentric rings 1308 and the lower set of concentric rings 1308, higher air pressure is needed to push air to the lower set of concentric rings 1308. The depth of the vertical inlet 28B sets the maximum spacing.

The bubbles are externally produced at an intermediate elevation between the aerator inlet and outlet. If the bubbles are produced below the inlet, the bubbles are sucked into the inlet and coalesce. If the bubbles are produced above the outflow, the bubbles escape and do not flow horizontally.

As shown in FIG. 3A, the water exiting from radial surface outflow 1304 is introduced below the water surface 1310. Additionally, the introduction of micro air bubbles into the water column creates a region of low viscosity 1315 in comparison to the surrounding water. Thus a boundary 1316 is created between the typical, high viscosity water 1312 and lower viscosity aerated water 1315. This boundary 1316 acts to dampen the rate of rise of the micro air bubbles. As a consequence the micro air bubbles are directed horizontally for an extended distance before reaching the water surface 1310.

Radially outflowing, well-mixed, water hydraulically redirects rising bubbles horizontally, i.e. redirection is not with machines or steering means. Bubbles less than 1 mm radius are re-entrained in the diverging surface flow lines. The diverging flow lines separate individual bubbles one from another to prevent coalescing and consequent loss of macro surface area.

The radial, well-mixed, substantially gas-free, outflow is non linear and eddies are formed that continuously re-entrain bubbles of less than 1 mm radius. When small bubbles are re-entrained, detention time is increased sufficiently for oxygen to transfer to the water.

In an embodiment of the YF aerator 1302, only one set of concentric rings 1308 is provided. In another embodiment more than two sets of concentric rings 1308 are provided, each disposed at different vertical positions.

Additionally, an embodiment of the YF aerator 1302, as shown in FIGS. 3B and 3C, is in fluid communication with radial, vertical, semi-permeable, attached growth surfaces 1404 disposed from radially extending spokes 1402. For clarity of the structure, FIG. 3B only shows two spokes 1402 and growth surfaces 1404 attached to the floating spoke and hanging vertically down, with a weighted pipe at the lower edge of the growth surfaces 1404 that keeps the growth surface substantially vertical. However, in actuality, the YF 1302 of the present invention has a plurality of spokes 1402, as shown in FIG. 3C, extending radially from the central axis of the YF 1302 and spaced at intervals about the circumference of the YB 1302. With the growth surfaces 1404 disposed as shown in FIG. 3B, large radius bubbles, greater than 1 mm radius, are obstructed from reaching the water surface for a period of time sufficient to discharge their oxygen to the attached growth surface. The attached growth has a DO greater than 1 mg/l for a spoke length of 10 feet. The spokes 1402 and growth surfaces 1404 are optionally equipped on the YF 1302 when a specific waste treatment project would benefit from the additional vertical growth surfaces as discussed above, for example if carbon and or nitrogen reduction is desired. Thus, the YF 1302 discussed in this disclosure encompasses both embodiments with and without the spokes 1402 and growth surfaces 1404. The term "DO" refers to dissolved oxygen (mg/l). This is the concentration of $O_2$ in the water.

As shown in FIG. 3C, the spokes 1402 are not mechanically connected to the YF 1302, but rather float freely and substantially encircle the YF 1302. In the embodiment shown in FIG. 3C a large opening is provided at one side of the arrangement of spokes 1402 to allow easy access to and removal of the YF 1302. However, the spokes 1402 may, in an embodiment, form a completed circle around the YF 1302. Each of the spokes 1402 are connected to adjacent spokes 1402 by connecting members 1406 and 1408. Long connecting members 1406 are disposed on the outside perimeter of the arrangement, while shorter connecting members 1408 are disposed on the inside perimeter. This arrangement of connecting members 1406 and 1408 forces the spokes into a radial configuration. The length of the long connecting members 1406 and short connecting members 1408 are determined by the length of the spokes 1402 and the desired angle formed between adjacent spokes 1402.

It was determined experimentally that aerobic conditions do not exist beyond spoke lengths of 15 feet. The anaerobic section grows thick slime, for example, 8 to 12 inches thick, e.g., 10 inches thick, that sinks the tip of the spoke. The spokes are intentionally shortened to insure that the entire growth surface is sufficiently aerated that the shavers and grazers have sufficient oxygen to thrive. For example, spokes may be 10 ft long, with a growth surface of 27" deep and 2" thick.

The aerobic matrix, i.e. the growth surface 1404, is self-cleaning as long as it is aerobic. The natural color of the matrix is black. The in-use color is tan.

The matrix total volume is populated with sludge worms, insect larvae and nematodes (round worms). The worms graze on the colonizing bacteria and eat the bacteria. The grazers keep the matrix clean (self-cleaning), if the DO is greater than 1 mg/l. In an embodiment, the YF circulator, as illustrated in FIGS. 3A-3C pumps 7 MG/D of water through an annular space 4 inches high with a diameter of 7 ft (7.33 $ft^2$). The exit velocity is less than 2 ft/sec. Turbulent flow in clean water is typically established at velocities greater than or equal to approximately 7 ft/sec. Substantially non-turbulent flow leaves the YF flowing radially and horizontally away from the centerline of the YF. However, the impeller turns slowly enough, such as at 144 rpm, to impart a slight counterclockwise curvilinear flow pattern with a distinct cross vector that moves water right-to-left as well as out from the centerline.

As water flows out from the YF 1302, coarse and fine bubbles rise vertically into the horizontal gas-free, non-turbulent water flow. The coarse and fine bubbles are entrained in the outflowing eddies to a diameter of 50 ft. Non-turbulent flow minimizes bubble coalescing. The bubbles remain in the water column much longer so there is sufficient detention time to transfer bubble-interior oxygen to the water. This results in a 5-fold increase in oxygen transfer efficiency to 3 lbs $O_2$/hp×hr.

Figure 4:
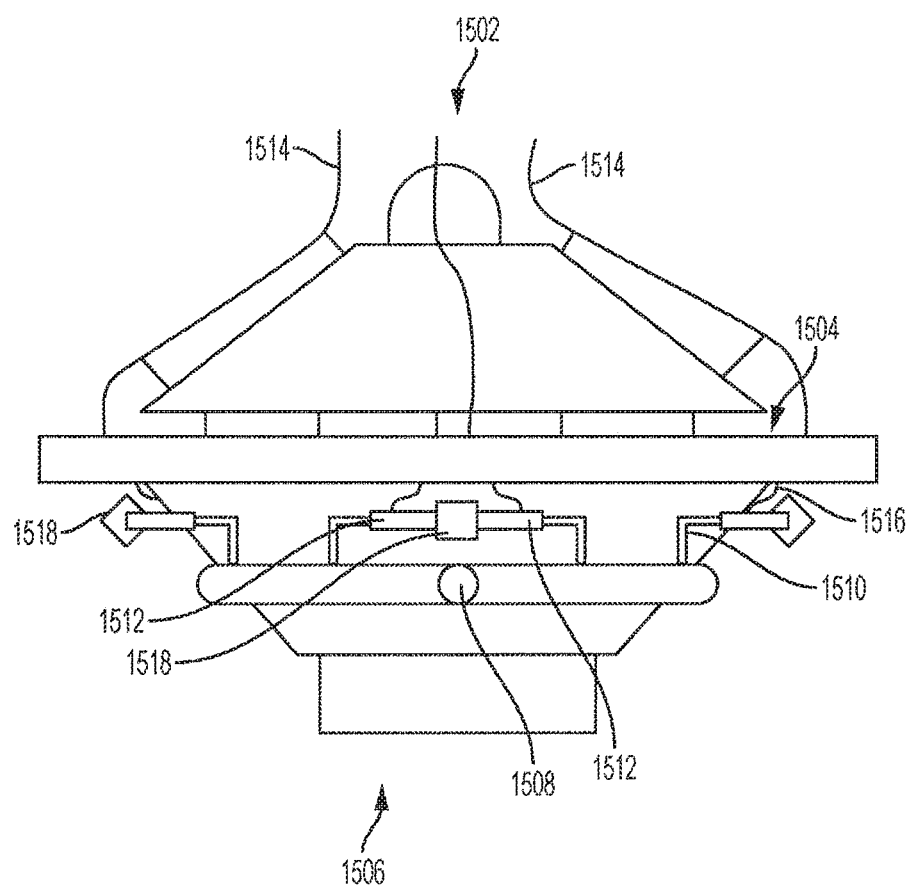
FIG. 4 illustrates a schematic representation of an aerator apparatus used in the present disclosure.

Another water circulator, identified as 1502, is illustrated in FIG. 4. Circulator 1502 may be a Gold Frog™ Circulator (or "GF circulator"), which may be used as a circulator in the disclosure herein. The circulator 1502 (which is sometimes referred to herein as "GF 1502") is an aerator with one or more air jets 1518 for injecting an external source of air bubbles at a vertical position between the water inlet 1506 and water outlet 1504. The injected air bubbles rise under the well-mixed radially outflowing water ejected from the water outlet 1504. The rising air bubbles elevate the outflowing water above the mean elevation of the surrounding water such that gassy water flows left and right. The internal components of the GF circulator are similar to those shown in FIGS. 1A and 1B, thus only distinguishing features are shown in FIG. 4.

In an embodiment, two impinging venturis 1512, are disposed within the air jets 1518 in order to generate a high volume of micro air bubbles in a jet of water emitted through the air jet 1518. Water is drawn into the venturis 1512 through a water inlet 1508 and piping 1510. Additionally, air intake hoses 1514 are provided above the water surface which feed air to the venturis 1512 by way of respective air hoses 1516. Each of the impinging venturis 1512 directs jets of micro air bubbles at one another at a closing velocity of approximately 7 ft/sec and a downward angle of 15°. The closing velocity can be as great as 10 ft/sec. The closing velocity may range from 7 ft/sec to 10 ft/sec. Downward angles may range from 3° to 30°. Flow rates between 2 MG/D and 7 MG/D will work. Skilled artisans can adjust the downward angle to maximize detention time in the water column without deviating from the present invention. The impingement fractures small bubbles into micron-sized bubbles; the downward angle maximizes the time the bubbles are in the water column.

The shear from impinging venturis 1512, wherein each venturi 1512 has turbulent flow, will hydrolyze triglycerides into fatty acid and glycerin. The fatty acid (soap) in turn lowers the surface tension of the water. Lower surface tension ("wetter water") is particularly advantageous with land application of wastewater from manure ponds and municipal waste.

This aerator eliminates hoses inside the chassis that transfer gassy water present in certain conventional devices. The impingement T (or T pipe) is rotated horizontal to an elevation intermediate between the inlet and the outlet of the circulator. For example, the impingement T exit is angled at −15° from the horizontal such that each pair of venturis discharges microbubbles down-then-up such that the net flow is horizontal and under the outflowing laminar gas-free water. In one example, with a given pair of venturis, the combined collision velocity inside the T exit is >7 ft/sec.

Microbubbles generated by the GF 1502 rise up into the outflowing laminar flow and are entrained and made to move horizontally without any one stream intersecting with the adjacent stream, doubling the efficiency over certain conventional devices.

Thus like the YF embodiment, the GF embodiment discharges gas at an intermediate elevation between the pump inlet and outlet where externally-generated bubbles rise vertically into horizontal outflowing laminar flow with a flow vector aligned with the centerline of the circulator and a flow vector at right angles to the centerline flow vector.

An embodiment of the GF 1502 removes the transfer line and the flow resistance and redirects the impingement T so that the discharge from the air jet 1518 ranges from 10 to 20 degrees below the horizontal, such as −15° below the horizontal, from 2 to 10 inches, e.g., 4 inches below the water surface. For instance, it was found that the combination of eliminating back pressure and directing free flowing gassy fluid at an angle of 15 degrees below the horizontal and 4 inches below the water surface increased oxygen transfer efficiency by 400%.

Operating at low backpressure is well known. What is unexpected is combining low backpressure venturi operation with horizontal radial outflowing gas-free water after impingement mixing below horizontally outflowing gas-free water to detain bubbles in the water column for a time sufficient to extract 20% of the oxygen.

In one example, the venturi-equipped GF 1502 pulls 2,023 lbs $O_2$/day through the sum of the venturis. The measured oxygen transfer rate (OTR) is ~4× (max OTR=6.5 lbs $O_2$/hp×hr) the high backpressure prior design of 0.24 lbs $O_2$/hp×hr.

In the world of mechanical aerators, this is a low efficiency aerator. However, the GF 1502 provides additional advantages. The GF 1502 adds oxygen, lowers surface tension, lowers *E. coli*, and lowers TSS. In combination with a circumferential baffle and a YF, very low suspended solids are achievable. Without wishing to be bound, the cavitation at the point of impingement shears flagella from slow-settling flagella-bearing bacteria. Thus the cavitation increases the rate of settling.

Using the circulators, as described hereinabove; they are arranged as described herein.

An embodiment of the present disclosure is directed to, inter alia, a system for the treatment of sludge in a lagoon containing water that promotes the formation of biologically active granules that digest sludge in the lagoon, the lagoon including a bottom thereof, the water of the lagoon having a surface layer, the system comprising: X number of water circulators having an impeller disposed in the lagoon in a cluster, wherein X is greater than three, e.g., 3, 4, 5, 6, 7, 8, 9, or 10; at least one of said X number of water circulators being configured to: (a) cavitate water taken from the lagoon; and (b) expel the water after cavitation, wherein the water is expelled from said impeller at constant impeller rotational speed at a cyclically varying flow rate radially across the surface from the centerline of each circulator such that at least some of the expelled water travels away from the water circulator in a path essentially parallel to the surface layer of the lagoon water; when said at least one water circulator is a number of water circulators less than X, the remainder of said X number of water circulators, other than said at least one water circulator, being configured to expel water taken from the lagoon, wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: each water circulator is located essentially on a circumference of a circle defined by a predetermined radial distance from a center point of the circleeach water circulator is located essentially equidistant, along the circumference of the circle, from each adjacent one of the other water circulators; (e) a respective hydraulic wall formed from at least some of the water expelled from each of a given pair of adjacent water circulators, where horizontal flow vectors of the expelled water are substantially equal and opposite between adjacent circulators, said hydraulic wall redirecting the expelled water downward towards the bottom of the lagoon, thereby creating the conditions for the formation of the biologically active granules; and a quiescent area in fluid communication and downstream from the water circulator that cavitated the water, and located in the path of the redirected expelled water towards the bottom of the lagoon, whereby the expelled water forms a water column in said quiescent area to stratify the granules into a plurality of layers according to their density (the water in the lagoon when said X water circulators are disposed in the lagoon having an initial pH sufficient to form biologically active granules, such as at a pH of 7.5 or greater.

I one aspect of the present disclosure, X number of water circulators are disposed in the lagoon. X is greater than or equal to 3, In an embodiment, X is 3, 4, 5, 6, 7, 8, 9, or 10. At least one of said X number of water circulators being configured to: (a) cavitate water taken from the lagoon; and (b) expel the water after cavitation, wherein the water is expelled such that at least some of the expelled water travels away from the water circulator in a path essentially parallel to the surface layer of the lagoon water; when said at least one water circulator is a number of water circulators less than X, the remainder of said X number of water circulators, other than said at least one water circulator, being configured to expel water taken from the lagoon, wherein the water is expelled (from the remaining water circulator(s)) substantially without cavitation and wherein the water is expelled (from the remaining water circulator(s)) such that at least some of the expelled water travels away from the water circulator in a path essentially parallel to the surface layer of the lagoon water; said X number of water circulators are disposed in the lagoon in a configuration such that: (c) each water circulator is located essentially on a circumference of a circle defined by a predetermined radial distance from a center point of the circle; (d) each water circulator is located essentially equidistant, along the circumference of the circle, from each adjacent one of the other water circulators; (e) at least some of the water expelled from each of a given pair of adjacent water circulators forms a respective hydraulic wall.

As described above, each water circulator is located essentially on a circumference of a circle defined by a predetermined radial distance from a center point of the circle; each water circulator is located essentially equidistant, along the circumference of the circle, from each adjacent one of the other water circulators; (e) at least some of the water expelled from each of a given pair of adjacent water circulators forms a respective hydraulic wall. In an embodiment, each of the hydraulic walls intersects essentially at the center point. Moreover, in an embodiment, each of a given pair of adjacent hydraulic walls forms a respective hydraulic corner where the given pair of hydraulic walls intersect essentially at the center point. In this embodiment, the hydraulic walls direct water expelled from each of the water circulators into the hydraulic corners; and (the hydraulic corners force at least some of the water directed therein by the hydraulic walls downward, towards the bottom of the lagoon, thereby creating the conditions for the formation of the biologically active granules, the water in the lagoon when said X circulators are disposed in the lagoon having an initial pH of at least 7.5, after which the pH may range from 6.2 to 10.

Without wishing to be bound, in all of the embodiments described herein, the circulators create an upper aerated zone (DO>1 mg/l), a lower anaerobic zone (ORP more negative than −250 mV) and an intermediate anaerobic quiescent zone. The flow pattern is "perimeter flow", that is radially out from the centerline of the circulator to the said hydraulic wall (or baffle) and then down over a porous bed of lagoon granules and then back to the circulator inlet.

When the added oxygen is intentionally curtailed such that the quiescent zone has an ORP more negative than −250 mV, i.e. that the aerobes consumed all the DO in the aerobic zone, then the perimeter flow brings anaerobic substrate to the porous bed of lagoon granules.

The distance from the circulator to the baffle and/or hydraulic wall is so designed to allow sufficient detention that the entire DO is consumed aerobically. In an embodiment, the linear distance between two adjacent circulators ranges from about 25 to about 75 feet, while in another embodiment, it is about 30 feet to about 60 feet, while in another embodiment, is about 40 feet to about 55 feet, while in another embodiment, it is about 46 feet to about 52 feet, while in a further embodiment, the distance is about 48 feet. ft, This corresponds to a radius of the imaginary circle ranging from about 12.5 feet to about 37.5 feet; in one embodiment, while in another embodiment, the radius ranges from about 20 feet to about 27.5 feet, while in a third embodiment, it ranges from about 23 feet to about 26 feet and in a further embodiment, it is about 24 feet. In an embodiment, water circulator configuration parameters, such as spacing distance, may be determined by measuring the ORP of the quiescent zone and then expanding the radius until the ORP is more negative than −250 mV. Skilled artisans will recognize that the ideal radius can change if the water has more or less BOD (oxygen consumers). For example, at the lagoon inlet, the radius of the circle is reduced because the high concentration of BOD will consume all DO before the hydraulic wall. This is typically done at a test site and then reapplied in other applications.

In an embodiment, the X circulators are arranged in a lagoon essentially along the circumference of a circle. The circulators are essentially equidistant from the center of the circle. In an embodiment, the radius of the circle ranges in the distances as described above. As described above, there is a minimum of 3 circulators arranged in this circle. In an embodiment, 3 circulators are used, while in another embodiment, 4 circulators are used, while in still another embodiment, 5 circulators are utilized. Any number of circulators may be used, and arranged essentially around the circumference of a circle. The circulators, in an embodiment are arranged symmetrically. When an even number of circulators are utilized, in an embodiment, a line that connects opposing circulators passes through the center of this circle and is substantially equal in length to the diameter of this circle.

In an embodiment, all of the circulators cavitate water from the lagoon and expel the water after cavitation. In another embodiment, at least 1 less than X circulators cavitate water from the lagoon and expel the water after cavitation. In an embodiment, at least 50% of the circulators cavitate water and expel the water after cavitation.

When the water is expelled from the water circulators arranged substantially around the circumference of a circle, at least some of the water expelled travels away from the water circulator in a path essentially parallel to the surface layer of the lagoon water.

Figure 5:
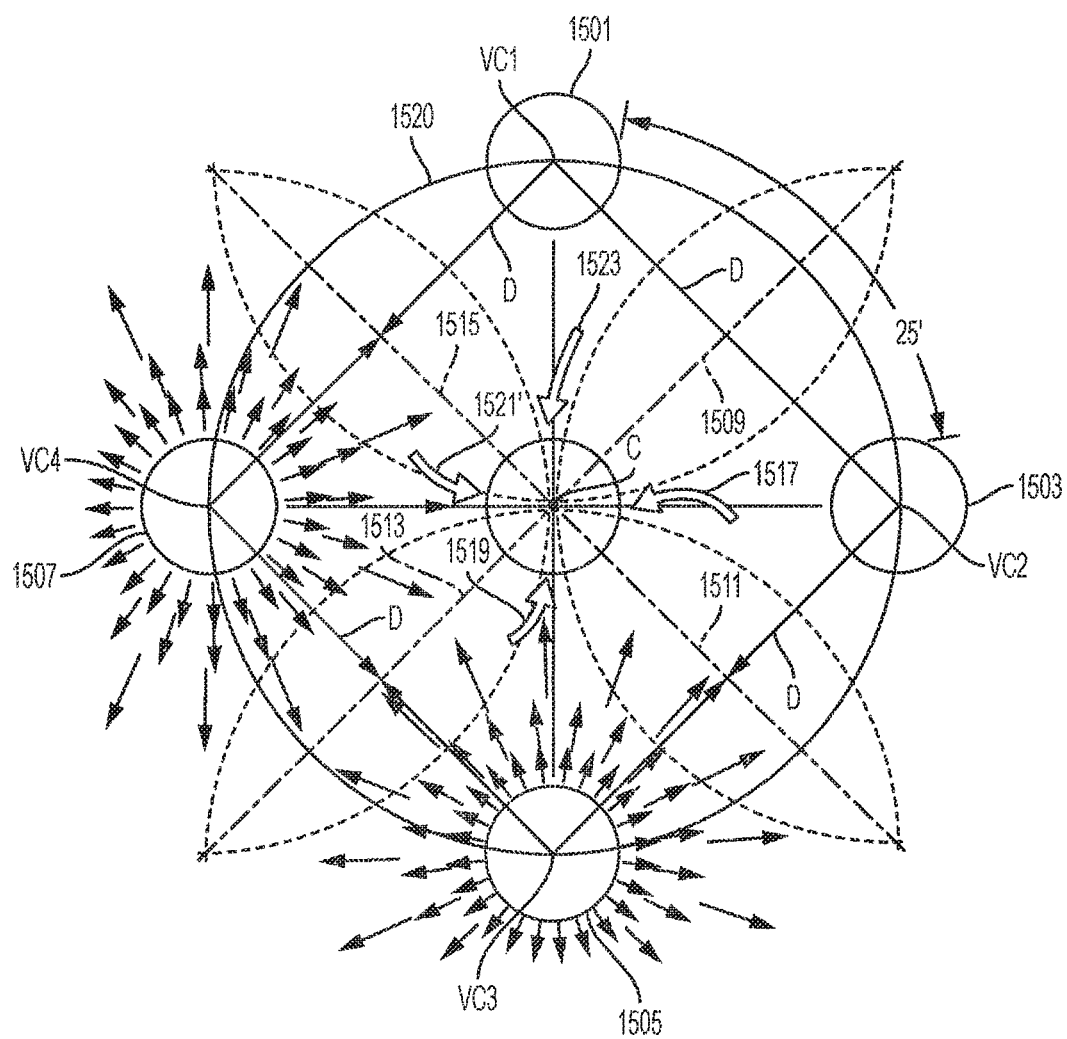
FIG. 5 illustrates a schematic plan view of a number of water circulators according to an embodiment of the present disclosure.

Referring now to FIG. 5 (showing a schematic plan view of a number of water circulators 1501, 1503, 1505, 1507 disposed in a lagoon), a system according to an embodiment of the present disclosure will be described. More particularly, this system is for formation of biologically active granules that digest sludge in a lagoon containing water, the lagoon including a bottom thereof, the water of the lagoon having a surface layer, the water of the lagoon having an initial pH of at least 7.5, after which the pH may range from 6.2 to 10. Further, X number of water circulators are disposed in the lagoon, wherein X is an integer greater than 2 and less than 11 (in the example of this FIG. 5, X equals 4).

At least one of said X number of water circulators is configured to: cavitate water taken from the lagoon; and expel the water after cavitation, wherein the water is expelled such that at least some of the expelled water travels away from the water circulator in a path essentially parallel to the surface layer of the lagoon water (in this example, water circulators 1501 and 1505 comprise the at least one water circulator). The cavitation may be carried out via a reciprocating flow of water, as described in more detail below.

Further, when said at least one water circulator is a number of water circulators less than X, a remainder of said X number of water circulators other than said at least one water circulator is configured to expel water taken from the lagoon, wherein the water is expelled such that at least some of the expelled water travels away from the water circulator in a path essentially parallel to the surface layer of the lagoon water (in this example, water circulators 1503 and 1507 comprise the remainder of water circulators). The remainder of the water circulators may operate in a non-reciprocating flow manner.

Further still, said X number of water circulators are disposed in the lagoon in a configuration such that: each water circulator is located essentially on a circumference of a circle (see call out number 1520) defined by a predetermined radial distance from a center point (see "C") of the circle and each water circulator is located essentially equidistant, along the circumference of the circle, from each adjacent one of the other water circulators.

Moreover, at least some of the water expelled from each of a given pair of adjacent water circulators (see 1501-1503; 1503-1505; 1505-1507; and 1507-1501) forms a respective hydraulic wall (see the dashed lines at 1509; 1511; 1513; 1515), each of the hydraulic walls (see 1509; 1511; 1513; 1515) intersect essentially at the center point (see "C"), and each of a given pair of adjacent hydraulic walls (see 1509-1511; 1511-1513; 1513-1515; and 1515-1509) forms a respective hydraulic corner (see 1517; 1519; 1521; and 1523) where the given pair of hydraulic walls intersect essentially at the center point (see "C"). The hydraulic walls are formed where horizontal outflow vectors from adjacent water circulators are equal and opposite (see, e.g. FIG. 5 showing hydraulic wall 1509 between water circulators 1501/1503, hydraulic wall 1511 between water circulators 1503/1505, hydraulic wall 1513 between water circulators 1505/1507, and hydraulic wall 1515 between water circulators 1507/1501.

In an embodiment, each hydraulic wall in a 4 pack cluster is the hypotenuse of a right triangle (having the radius from the center of the circle to the centerline of the water circulator as each of the two shorter sides). That is, in an embodiment, the square of the length of each hydraulic wall in a 4 pack cluster is equal to the sum of the squares of the lengths of the other two sides. Further, in an embodiment, a 4 pack cluster will have each water circulator provide 25% of its outflow to a given hydraulic wall.

In addition, the hydraulic walls (see 1509; 1511; 1513; 1515) direct water expelled from each of the water circulators into the hydraulic corners (see 1517; 1519; 1521; and 1523) and the hydraulic corners force at least some of the water directed therein by the hydraulic walls downward, towards the bottom of the lagoon (for example, in the area in FIG. 15 marked by the dashed circle around the center point "C"), thereby creating the conditions for the formation of the biologically active granules.

Other circulators that intentionally cavitate and/or have air injected could be used. The hydraulic wall is formed when the horizontal outflow vectors between any two adjacent circulators are equal and opposite. The opposing flows well up along the collision line until the gravity head is sufficient to redirect the horizontal outflow vertical and down. The water ricochets of the bottom but is pulled towards the swirling influent of the circulator inlet (see e.g., "H" of FIG. 15). The net result is perimeter flow as described herein. The flow alternates between aerobic (upper zone—see, e.g., "C" of FIG. 15 associated with zone 1) and anaerobic (lower zone—see, e.g., FIG. "C" of FIG. 15 associated with lower zone 3). Without wishing to be bound, soluble BOD created by anaerobes is converted to biosolids in the aerobic zone and settles in the lagoon granule bed for conversion to gas.

In this embodiment, when there are a plurality of hydraulic corners, flow is concentrated at the center "C". Water flows down each hydraulic corner to the bottom of the lagoon where it ricochets off the bottom and follows a curvilinear pathway back to the water circulator inlets.

During the flow ricochet process, dense seeds (e.g., biofilm coated calcium carbonate and enzymes formed by the cavitation and heavy hydrolytic brine) do not ricochet but settle at the bottom in the vicinity of "C". The high concentration in the vicinity of "C" promotes excess lagoon granule initiation. Thus a plurality of hydraulic corners in combination with reciprocating flow initiates more lagoon granules. More lagoon granules digest sludge faster. The lagoon granules form a porous bed below the circulation area.

Still referring to FIG. 5, it is noted that in one example, the cavitation of water by the at least one water circulator results from a reciprocating flow of water in the at least one water circulator (discussed in more detail below). Further, it is noted that while the example of this FIG. 5 provides for circulators 1501 and 1505 cavitating the water (via reciprocating flow) and circulators 1503 and 1507 being the remainder of the water circulators and not using reciprocating flow, any other desired number of water circulators may be the reciprocating flow or remainder water circulators. In addition, the reciprocating flow and remainder water circulators may be located at any desired locations on the circumference of the circle. In one specific example, there may be an even number of water circulators and at least two water circulators that are located opposite each other (that is, located a maximum distance apart across the circle) may be the reciprocating flow water circulators (wherein at least some water circulators are remainder water circulators without reciprocating flow).

In an embodiment, the reciprocating flow is adjusted so that the change in direction of the flow of water occurs at a time interval ranging from 0.1 sec to 8 seconds, and in another embodiment, from 0.15 seconds to 6 seconds, and in still another embodiment, from 0.17 sec to 5.5 seconds.

Still referring to FIG. 5, it is noted that in one example: each water circulator has associated therewith a respective vertical centerline (see VC1, VC2, VC3, VC4); a distance D between the vertical centerlines of each of a given pair of water circulators is in a range from about 25 to about 75 feet, and in another embodiment, from about 30 feet to about 60 feet, and still another embodiment, from about 40 feet to about 55 feet, and in still another embodiment, from about 46 feet to about 52 feet, while in another embodiment, about 48 feted is essentially equal for all pairs of water circulators. In one specific example, the diameter of circle 1520 is 42 feet, each water circulator has a diameter (in plan view at the waterline) of 8 feet, an outer edge of each water circulator is located along the circumference of the circle 1520 20 feet from an outer edge of each adjacent water circulator, and D (the straight line distance between vertical centerlines of adjacent water circulators) is 48 feet.

Still referring to FIG. 5, it is noted that each hydraulic corner (see 1517; 1519; 1521; and 1523) has an interior angle defined by a respective pair of hydraulic walls intersecting at the center point to form the hydraulic corner. That is: the interior angle of hydraulic corner 1517 is formed by hydraulic walls 1509 and 1511 and faces towards water circulator 1503; the interior angle of hydraulic corner 1519 is formed by hydraulic walls 1511 and 1513 and faces towards water circulator 1505; the interior angle of hydraulic corner 1521 is formed by hydraulic walls 1513 and 1515 and faces towards water circulator 1507; and the interior angle of hydraulic corner 1523 is formed by hydraulic walls 1515 and 1509 and faces towards water circulator 1501. Further, each interior angle may be essentially 360/X degrees (X being the number of water circulators). In an embodiment, the interior angles range from 120° to 36°.

As described hereinabove, the angle of the hydraulic corners is 360°/X. where X is as defined herein. When X is 3, for example, the angle of the hydraulic corner is 120°, and when X is 4, the angle of the hydraulic corner is 90°, and when X is 5, the angle of the hydraulic corner is 72°, and when X is 6, the angle of the hydraulic corner is 60°. In an embodiment, an angle of the hydraulic corners is 90° (e.g., when there are four water circulators in the configuration). In this embodiment 90°=360°/4 water circulators.

Still referring to FIG. 5, it is noted that in one embodiment, the water is expelled from each water circulator such that at least some of the expelled water travels away from the water circulator in a path along the surface layer of the lagoon water. Regarding the path of the expelled water see, for example, the radial arrows shown around water circulators 1505 and 1507 (of course, the water may be radially expelled from all of the water circulators even though only two sets of radial arrows are shown in this FIG. 5).

Of further note, while FIG. 5 provides an example where X equals 4, other configurations in which X is (for example) an integer greater than 2 and less than 11 may be provided.

Figure 6:
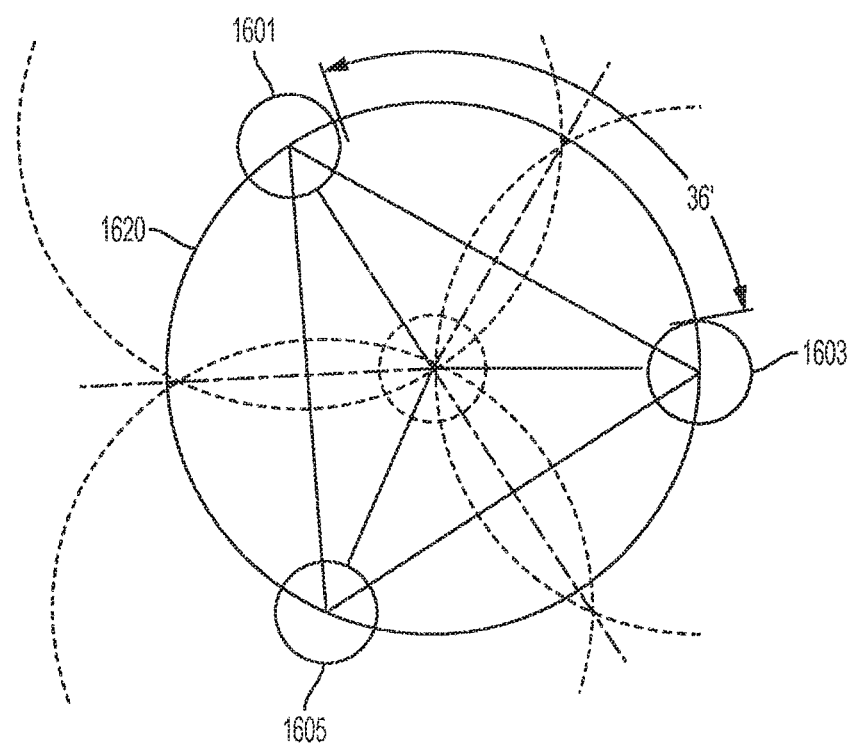
FIG. 6 illustrates a schematic plan view of a number of water circulators according to an embodiment of the present disclosure.

In this regard see, for example, FIG. 6 showing a schematic plan view of three water circulators disposed in a lagoon. More particularly, water circulators 1601, 1603 and 1605 are disposed on circle 1620 to produce hydraulic walls and hydraulic corners in a manner similar to FIG. 5. The three-pack shown here may be particularly advantageous when used in a cylindrical sludge holding tank. For example, a 50 foot diameter ×20 foot deep tank can be used to make lagoon granules that are initiated in the central black dashed circle in FIG. 6.

Figure 7:
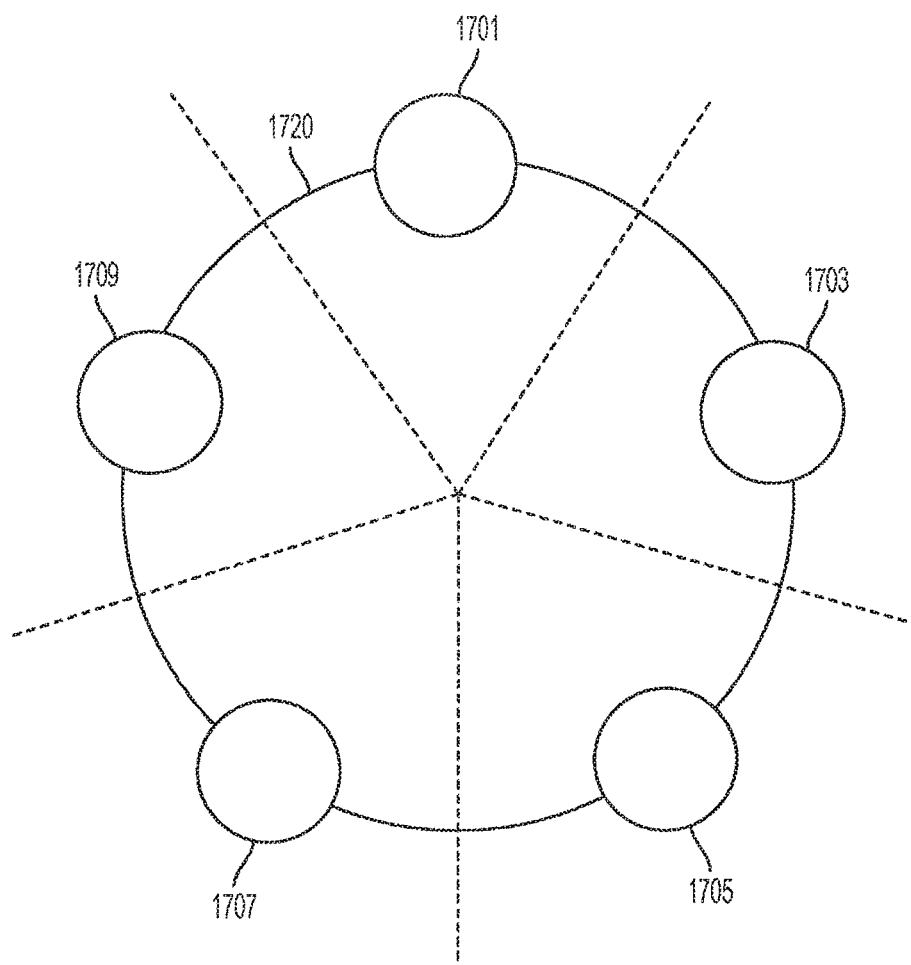
FIG. 7 illustrates a schematic plan view of a number of water circulators according to an embodiment of the present disclosure.

See also, for example, FIG. 7 showing a schematic plan view of five water circulators disposed in a lagoon. More particularly, water circulators 1701, 1703, 1705, 1707 and 1709 are disposed on circle 1720 to produce hydraulic walls and hydraulic corners in a manner similar to FIG. 5.

In yet another embodiment, the present disclosure includes the lagoon containing 2 or more clusters comprised of X circulators as above, wherein each of the clusters are comprised of X circulators located essentially on the circumference of a circle. The number of circulators in each of the clusters may be the same or different. In addition, the circumference of the circles with respect to each of the clusters may be the same or different. In other words, the radius of one of these clusters may be the same or different from the radius of another one of these clusters, but the radii of each of the clusters are in the range described hereinabove. If there is more than one cluster present, the circles do not overlap, instead the distance apart ranges from about 25 feet to about 75 feet, in one embodiment, while in another embodiment, they range from about 30 feet to about 60 feet, and in still another embodiment, they range from about 40 feet to about 55 feet, while in another embodiment, from about 46 feet to about 52 feet, while in another embodiment, about 48 feet. The lagoon may contain 2 to 20 clusters of these circulators, while in another embodiment, the lagoon may contain from 2 to 6 clusters, while in another embodiment, the lagoon contain from 3 to 4 clusters. Thus the number of clusters is dependent on the size of the lagoon, but these clusters are arranged in the lagoon so that the diameter of each of the clusters ranges, in one embodiment, from about 25 to about 75 feet, and in another embodiment, from about 30 feet to about 60 feet, and in another embodiment from about 40 feet to about 55 feet, while in another embodiment, from about 46 feet to about 52 feet and in a still further embodiment, about 48 feet. Any permutations of these diameters and distance between the clusters are contemplated.

Figure 8:
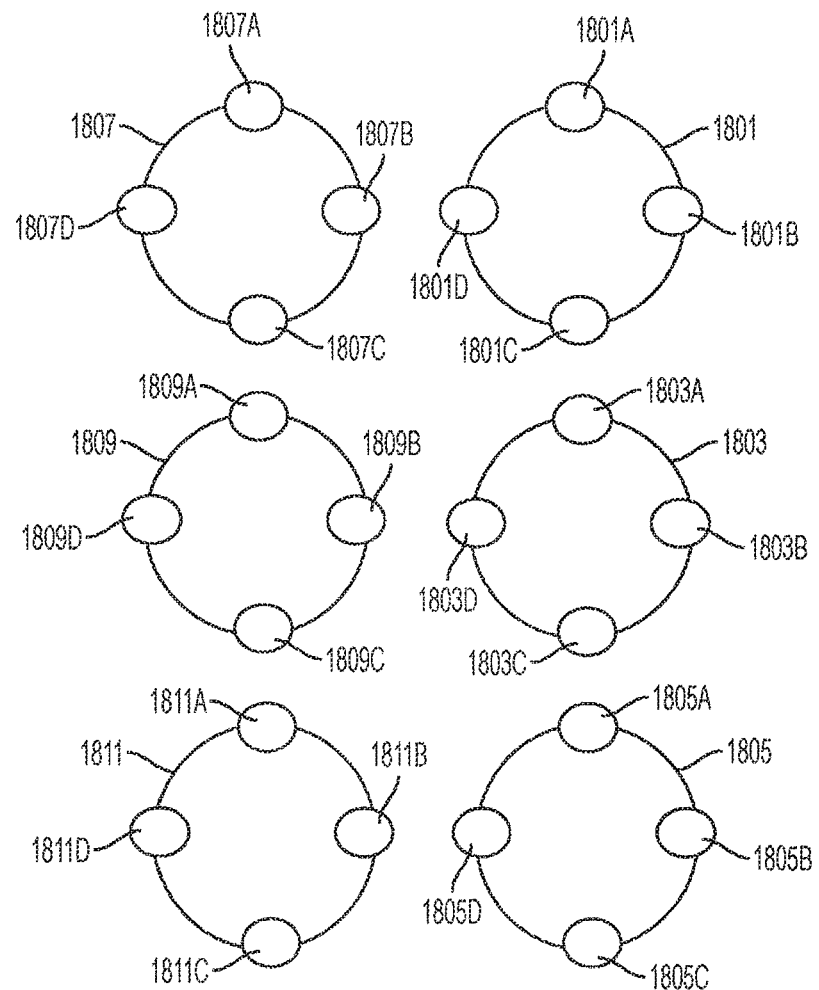
FIG. 8 illustrates a schematic plan view of a number of clusters of water circulators according to an embodiment of the present disclosure.

Further, each of the Y number of clusters of water circulators may comprise a set of water circulators in a configuration such as shown in one of FIGS. 5-7 (or any other desired configuration). In one specific example, shown in FIG. 8, six clusters (see 1801, 1803, 1805, 1807, 1809 and 1811) are provided. Further each of these six clusters includes therein four water circulators. More particularly, cluster 1801 includes water circulators 1801A-1801D; cluster 1803 includes water circulators 1803A-1803D; cluster 1805 includes water circulators 1805A-1805D; cluster 1807 includes water circulators 1807A-1807D; cluster 1809 includes water circulators 1809A-18093D; and cluster 1811 includes water circulators 1811A-1811D.

Clusters may be provided in any desired number and may be positioned relative to each other in any desired configuration. In one example, a water circulator in one cluster may expel water that interacts with water expelled by a water circulator in another cluster such as to form one or more hydraulic walls and/or one or more hydraulic corners. In one specific example (with reference to FIG. 8) water circulator 1801C may expel water that interacts with water expelled by water circulator 1803A (of course, any other pairs of water circulators may operate in a similar manner).

In another embodiment, water circulators and/or clusters as described herein may be provided in multiple lagoons at a given location.

Figure 9A:
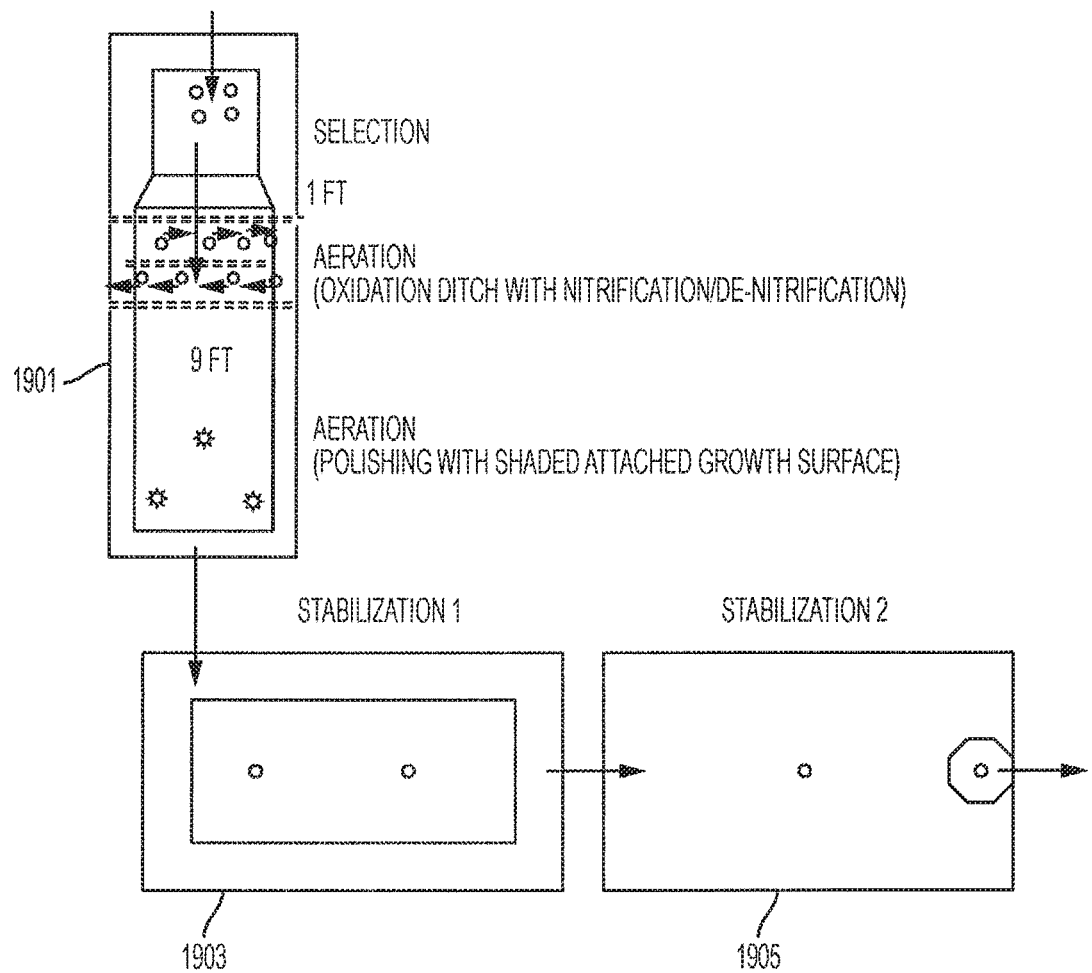
FIGS. 9A-9D illustrate schematic plan views of various lagoon arrangements according to various embodiments of the present disclosure.

For example, with reference to FIG. 9A, water circulators and/or clusters may be located as desired in one or more of multiple lagoons 1901, 1903 and 1905 existing at a particular site.

Figure 9B:
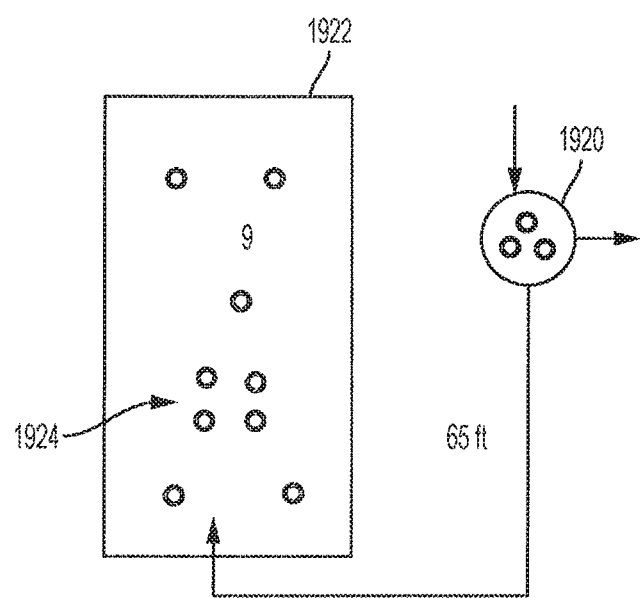

In another example, with reference to FIG. 9B, an open top sludge settling tank 1920 has a three-pack cluster to begin digestion. The tank is settled, for example, for 6 hours per week. Supernatant is returned to the head works; sludge is transferred to a sludge holding pond 1922. The sludge holding pond has a four-pack cluster 1924 and strategically placed mixing circulators to circulate the surface and keep the corners clean.

Figure 9C:
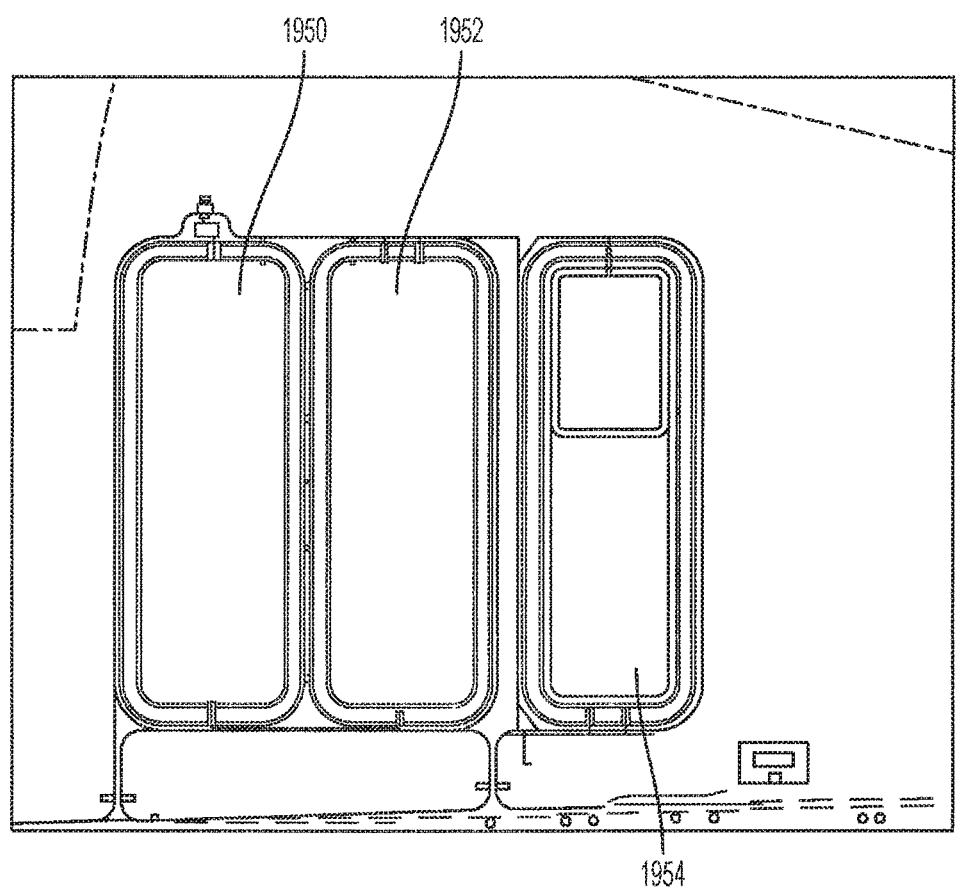

In another example, with reference to FIG. 9C, an example lagoon design (utilizing treatment pond 1950 and stabilization ponds 1952 and 1954) is shown. In connection with this embodiment of FIG. 9C, as with the other embodiments of the present invention, there is permit compliance, odor control and sludge digestion. Further, in connection with this FIG. 9C, the treatment pond may have an anaerobic deep end and an anaerobic shallow end. Further still, in connection with this FIG. 9C, the stabilization pond may be aerobic and shallow.

Figure 9D:
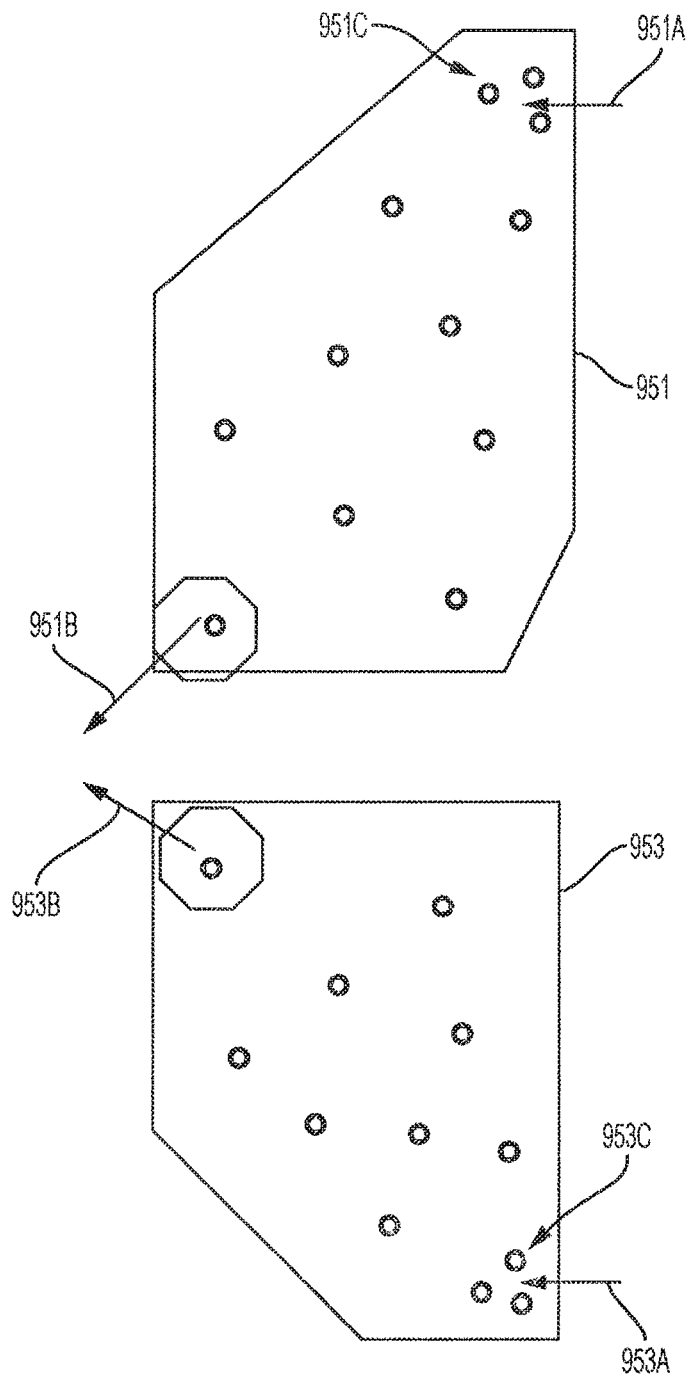

In another example, with reference to FIG. 9D, pond 951 and pond 953 each have a "black water" waste influent (see arrows 951A, 951B) and an effluent (see arrows 951B and 953B). Further, a 3-pack cluster of water circulators 951C is disposed in the corner of pond 951 and a 3-pack cluster of water circulators 953C is disposed in the corner of pond 953. In an embodiment, such a 3-pack cluster configuration may be used to fit into a space where an inlet is triangular.

In an embodiment, the cluster(s) as defined herein, wherein the circulators are arranged essentially on the circumference of a circle, are located such that the hydraulic corners are disposed above a substantially flat, substantially horizontal bottom surface of a lagoon (that is, not over the sloping sidewalls of the lagoon).

Figure 10A:
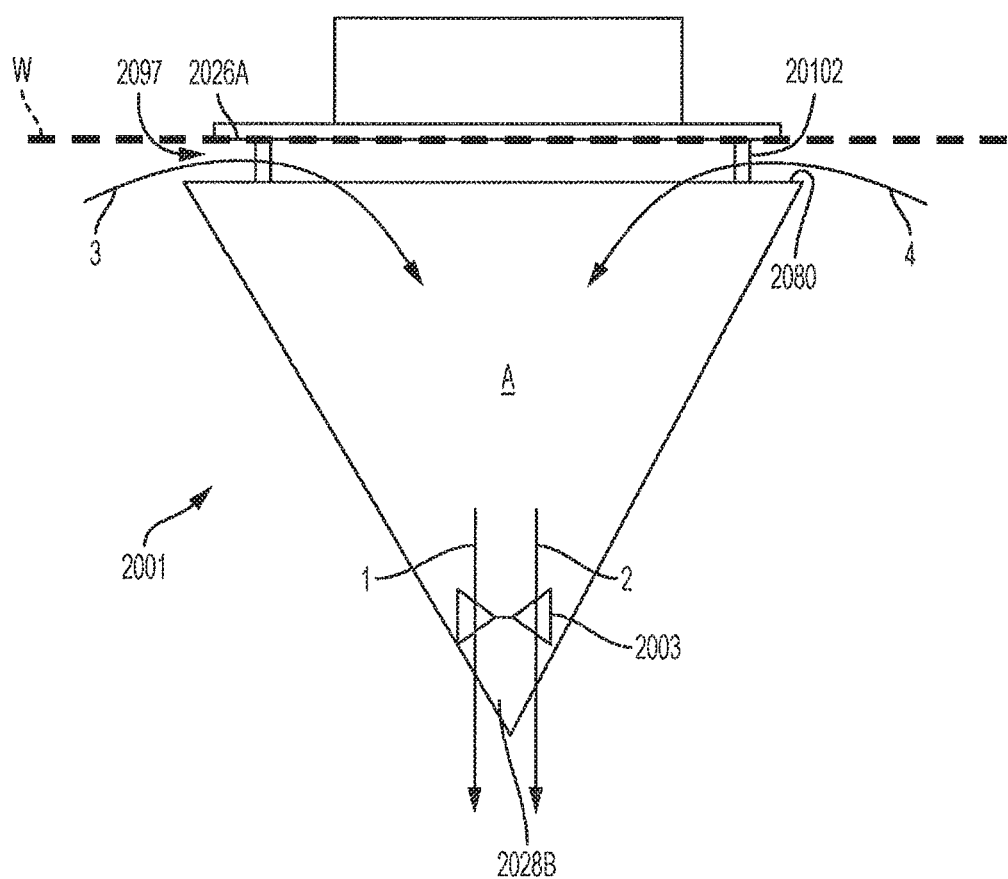
FIGS. 10A-10E illustrate an example of a water circulator operating to provide a reciprocating flow of water and cavitation according to an embodiment of the present disclosure. Schematic side views of the water circulators are provided.

Referring now to FIGS. 10A-10E an example of a water circulator operating to provide a reciprocating flow of water and cavitation is provided. More particularly, as seen in FIG. 10A, water circulator 2001 floats such that waterline W is above outflow lip 2080 (this water circulator 2001 is shown in a simplified schematic form; however, certain components correspond to the water circulator shown in FIGS. 1 and 1A as follows: outflow lip 2080 corresponds to outflow lip 80, supports 20102 correspond to supports 102, rim 2026A corresponds to rim 26A, outflow spaces 2097 correspond to outflow spaces 97, and diverter intake 2028B corresponds to diverter intake 28B).

Still referring to FIG. 10A, the example process begins at time $T_0$. At this time $T_0$, impeller 2003 rotates to pull water from cavity A. The water pulled from cavity A is pushed down and out substantially vertically through diverter intake 2028B (see arrows 1 and 2). In addition, the water pushed down and out through diverter intake 2028B is replaced by water flowing in through outflow spaces 2097 (see arrows 3 and 4).

Figure 10B:
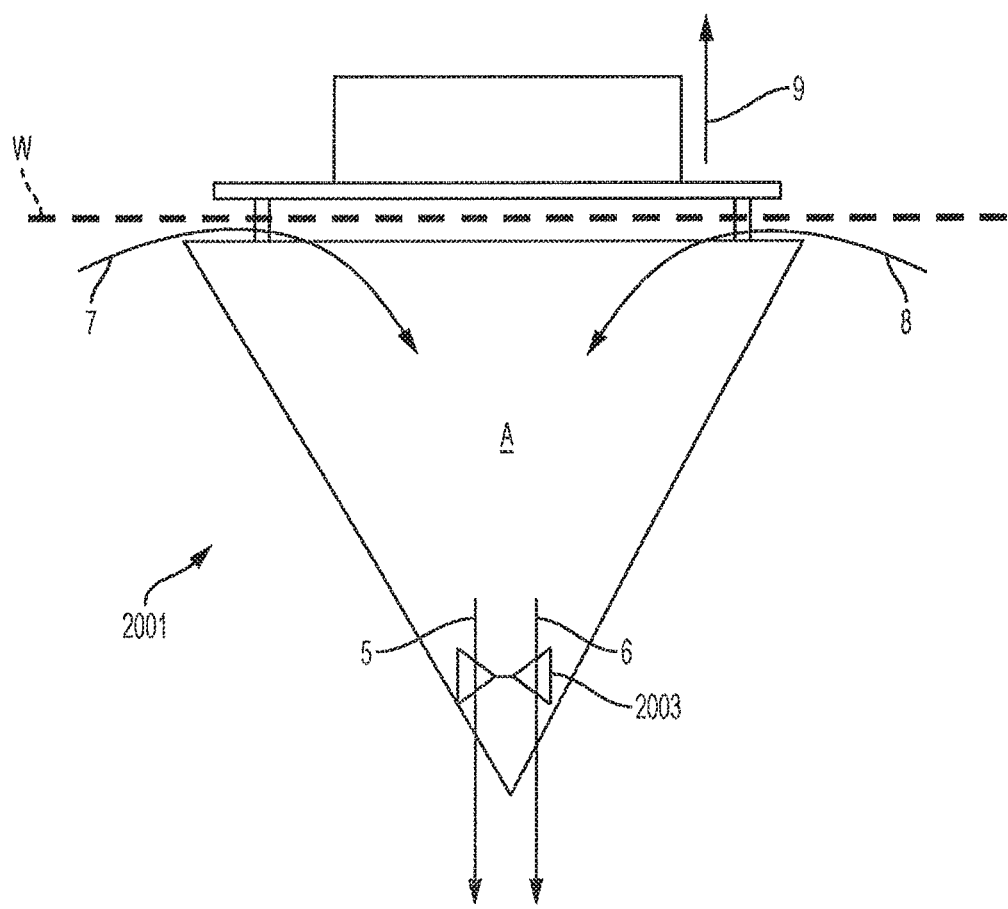

As impeller 2003 rotates, water continues to be pushed down and out through diverter intake 2028B (see arrows 5 and 6 of FIG. 10B). In addition, the water pushed down and out substantially vertically through diverter intake 2028B continues to be replaced in cavity A by water flowing in through outflow spaces 2097 (see arrows 7 and 8 of FIG. 10B). Of note, due to the water being pushed down and out substantially vertically through diverter intake 2028B, the entire water circulator 2001 moves up relative to the waterline W (due to equal and opposite reaction). This movement is seen at arrow 9 of FIG. 10B (as well as in the lowering of the waterline W relative to water circulator 2001).

Figure 10C:
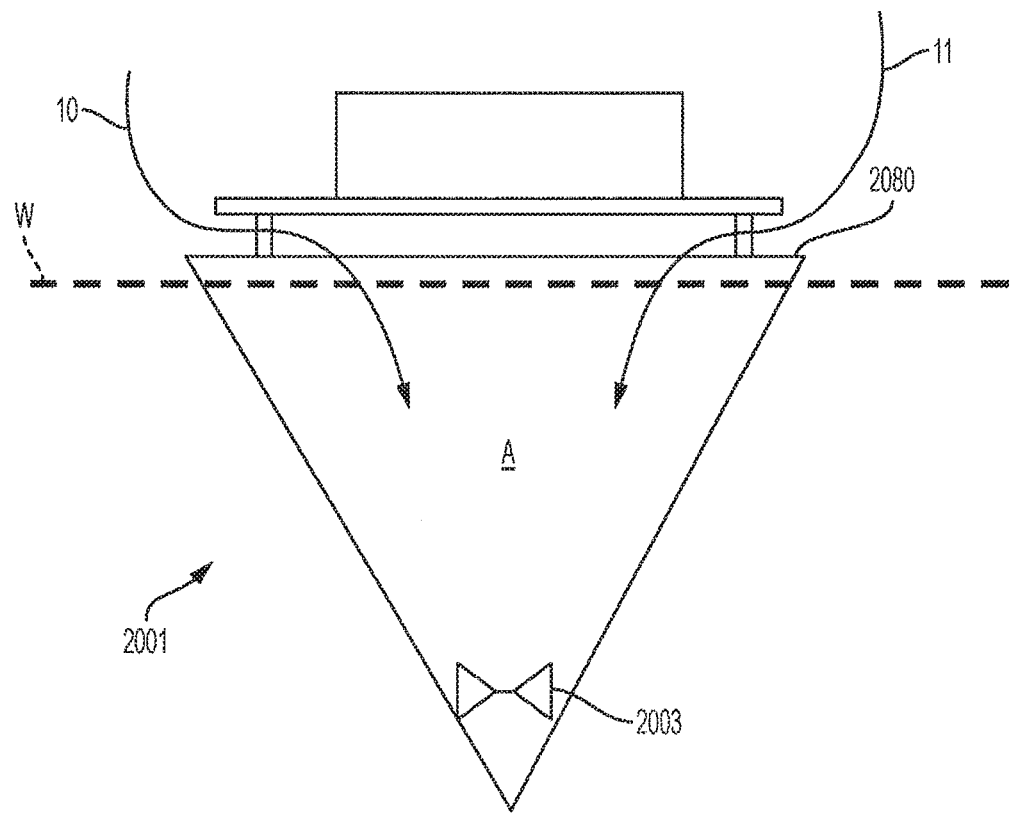
Figure 10D:
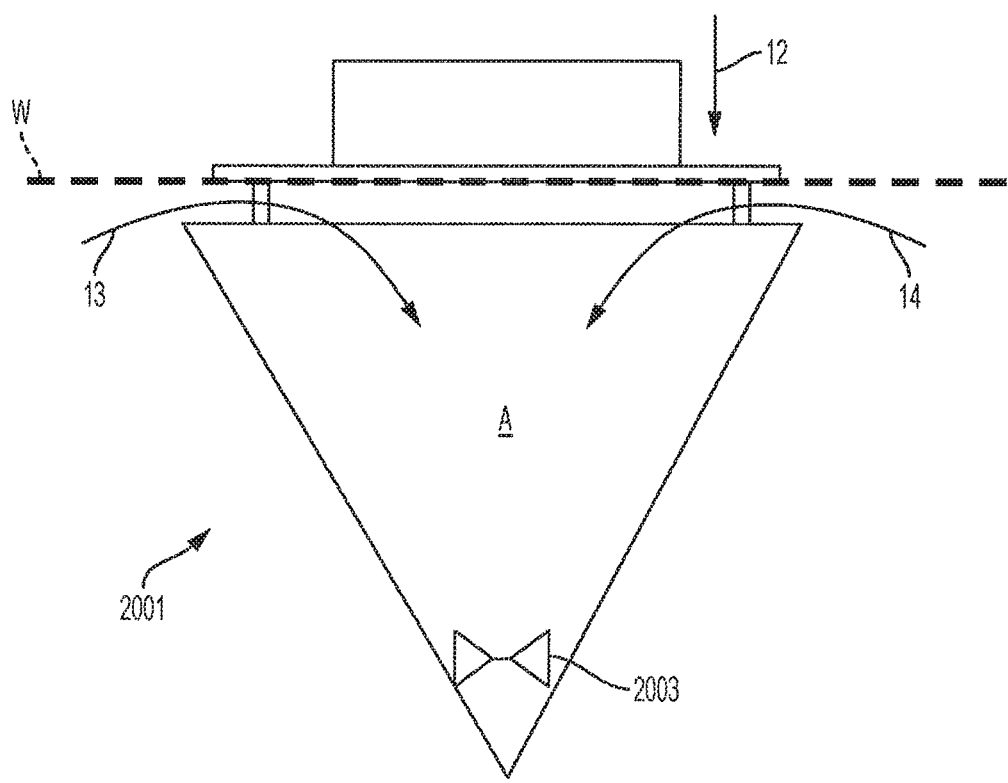

Next, at time $T_1$ (which occurs after time $T_0$) the water circulator 2001 moves up sufficiently high to bring outflow lip 2080 above the waterline W (see FIG. 10C). In one example, the time period between $T_0$ and $T_1$ is 0.15 seconds.

Once time $T_1$ is reached, air is ingested into cavity A (see arrows 10 and 11 of FIG. 10C) and the impeller 2003 loses its prime. A short time thereafter, at time $T_2$, the water circulator 2001 falls back down relative to the waterline W (see arrow 12 of FIG. 10D) and the outflow spaces 2097 ingest water (see arrows 13 and 14 of FIG. 10D). The heel of water and the previously ingested air are then whipped into a froth by the rotating impeller 2003 (which has continued rotating in a single direction (e.g., clockwise) since time $T_0$). In an embodiment, when flow reciprocates, the fill level of the water circulator changes up and down and the lowest level of the water in the water circulator is the heel of water.

Figure 10E:
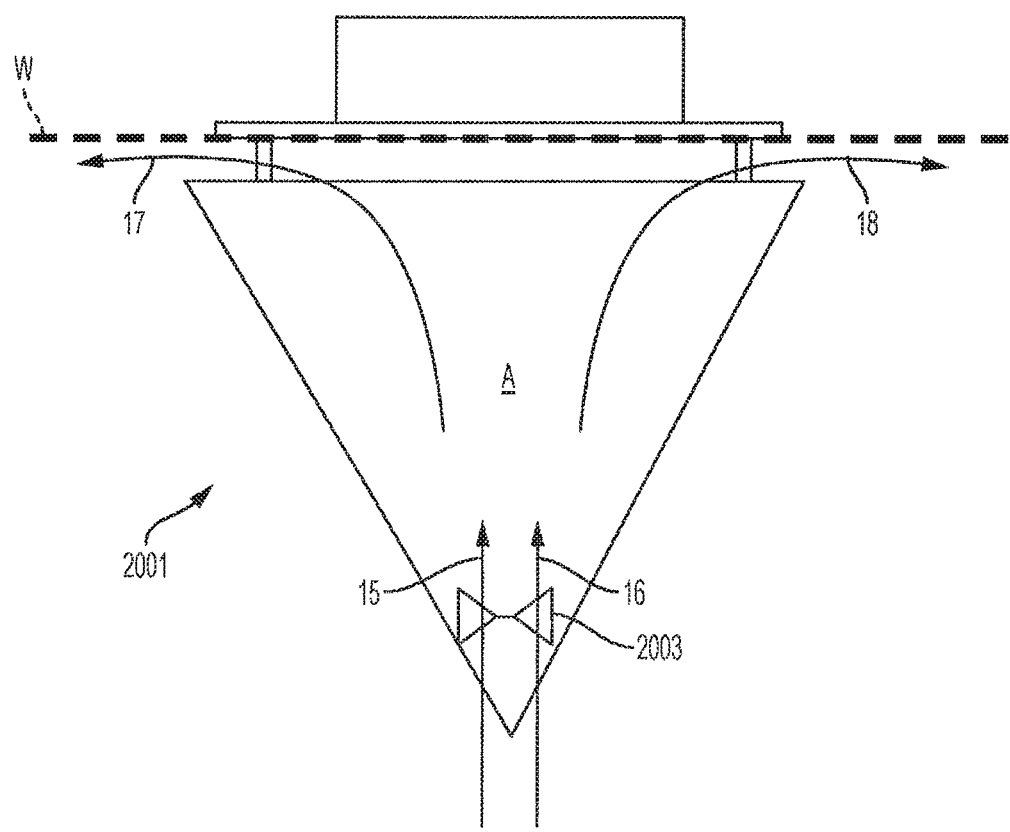

A period of time thereafter, at time $T_3$, the water flow reverses such that higher density water from outside the water circulator 2001 is forced up substantially vertically through the diverter intake 2028B (see arrows 15 and 16 of FIG. 10E), cavity A fills with water, and the water in cavity A then exits via the outflow spaces 2097 (see arrows 17 and 18 of FIG. 10E). The water reverses flow because the water outside the water circulator 2001 is at a relatively higher pressure due to the presence inside the water circulator 2001 of the lower density froth.

Still referring to FIG. 10E, it is noted that the gas-free water (see arrows 15 and 16 of FIG. 10E) flows past the impeller 2003 the "wrong way", causing intense cavitation (and shear) just above the tip of the impeller 2003. Finally, at time $T_4$, the impeller 2003 regains prime and water flow is down and out again (see FIGS. 10A and 10B). The process then repeats (through FIGS. 10C-10E). In one specific example, the process cycles every 6 seconds.

In practice there may be extra cavitating circulators. If VFA odors are perceived, the flow in a circulator may be reversed (to non-cavitating). This reversal of flow is continued in other circulators until the VFA odor is gone (e.g., overnight). For example, in the circumstances where there are initially 4 BFs (cavitating) on the circle, but there are VFA odors. The direction of rotation of the impeller of, for example, one water circulator is reversed and is run in the reverse direction for a day overnight. The next morning, the presence of a VFA odor is monitored. If the odor remains, the direction of rotation of the impeller of, for example, water circulator at the opposite end of the circle is reversed. In almost all circumstances, the VSA odor dissipates. The ideal configuration in this example then is 2 diagonal circulators rotating clockwise and the other two rotating counterclockwise. The hydraulic corners remain at 90° to insure that the maximum number of granules are produced. Later, the sludge inventory is digested, so there are excess granules. The process may then be then reversed and in an embodiment, optionally one of the non-cavitating circulators can be changed to cavitating to increase enzyme production. This may be accomplished, for example, by a reversing switch on the control panel of each water circulator. Thus, the methodology not only reduces or eliminates waste but also reduces or eliminates odor.

In an embodiment, there can be other circulator(s) not in the disclosed configuration. In an embodiment, there is at least one cluster having the circular configuration.

Figure 11:
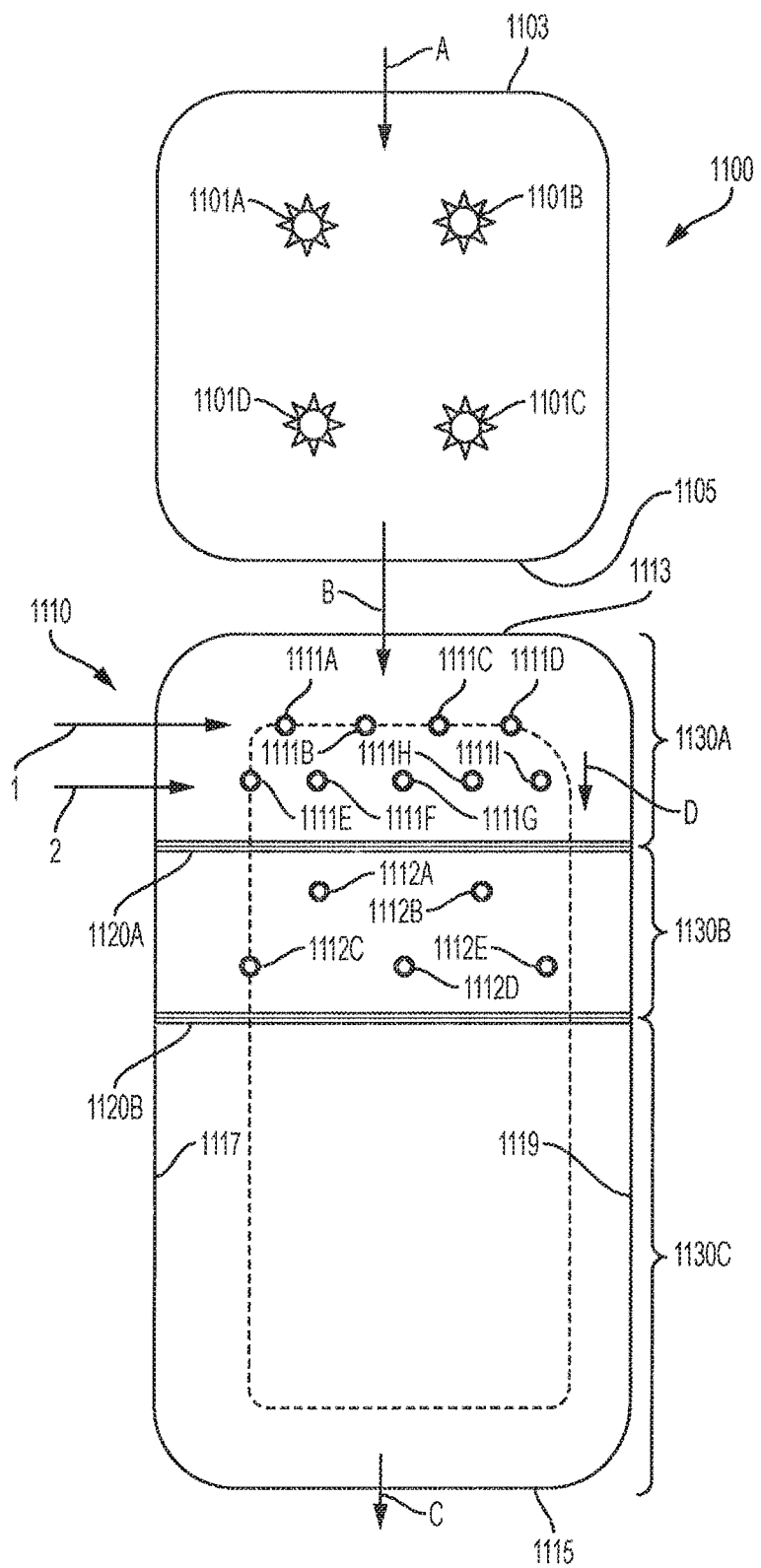
FIG. 11 illustrates a schematic plan view of arrangement of two lagoons according to an embodiment of the present disclosure.

Referring now to FIG. 11, an embodiment applied to first lagoon 1100 and second lagoon 1110 may be provided. In this embodiment, first lagoon 1100 includes conventional aerators 1101A, 1101B, 1101C and 1101D. First lagoon 1100 has an influent side 1103, at which influent (depicted by arrow "A") is received. In addition, first lagoon 1100 has an effluent side 1105, at which effluent (depicted by arrow "B") is output.

Still referring to FIG. 11, second lagoon 1110 has in influent side 1113 at which influent (depicted by arrow B) is received. In addition, second lagoon 1110 has an effluent side 1115, at which effluent (depicted by arrow "C") is output. Further, second lagoon 1110 is bounded by first berm 1117 (extending from influent side 1113 to effluent side 1115) and second berm 1119 (extending from influent side 1113 to effluent side 1115).

Further still, second lagoon 1110 includes first baffle 1120A and second baffle 1120B. The first baffle 1120A separates a first cell 1130A of the second lagoon 1110 from a second cell 1130B of the second lagoon 1110. The second baffle 1120B separates the second cell 1130B of the second lagoon 1110 from a third cell 1130C of the second lagoon 1110. In this embodiment, each of the first baffle 1120A and second baffle 1120B runs the width of the lagoon from the first berm 1117 to the second berm 1119. Further, in this embodiment, each of the first baffle 1120A and second baffle 1120B is a partial depth baffle (that is, each of the first baffle 1120A and second baffle 1120B extends from the surface of the water of the lagoon downward towards the bottom of the lagoon, without reaching the bottom of the lagoon). In one example, each baffle may extend downward, for example, 27 inches. However, the length of the baffle may vary, as long as the baffle effects the process, as described below. Each of the first baffle 1120A and second baffle 120B may comprise a floating component, such as a plastic pipe, which extends from the first berm 1117 to the second berm 1119. In one specific example, the plastic pipe may be 3 inches in diameter. In another specific example, the baffles may be constructed from 22-foot lengths of pipe. In another specific example, the baffle is a reinforced UV resistant fabric with an upper stitched pocket and a lower stitched pocket. In this example, the upper pocket is filled with an airtight 3" diameter×22 ft length of polyethylene (PVC) pipe. In this example, the lower packet is filled with a 1" airtight PVC pipe filled with sand. The weighted 1" pipe serves to keep the partial depth baffle essentially vertical in the lagoon.

Further still, the first cell 1130A of the second lagoon 1110 includes water circulators 1111A, 1111B, 1111C, 1111D, 1111E, 1111F, 1111G, 1111H and 1111I. Each of these water circulators 1111A-1111I may be of a type described herein. In one specific example, each of these water circulators 1111A-1111I may be of the reciprocating flow type (including cavitation) shown in FIGS. 10A-10E. Further, the second cell 1130B of the second lagoon 1110 includes water circulators 1112A, 1112B, 1112C, 1112D and 1112E. Each of these water circulators 1112A-1112E may be of a type described herein. In one specific example, each of these water circulators 1112A-1112E are the reciprocating flow type (including cavitation) shown in FIGS. 10A-10E. Note that in this figure the distance between adjacent water circulators 1111A-1111H is 30 ft. The distance between adjacent water circulators 1112A-1112E in this figure is 60 ft. The difference is due to reduced BOD in second cell 1130B that requires longer detention time to consume the DO added in the water circulators of second cell 1130B.

Still referring to FIG. 11, the water circulators 1111A-1111I may be disposed in a plurality of linear rows, shown here as row "1" and row "2". While this FIG. 11 shows two rows, any desired number of rows (and/or any desired number of water circulators) may be utilized to obtain any desired operating capacity. Further, the dashed rectangle represents the interface between the flat bottom of the lagoon and the sides/berms. In addition, the numeral 10 refers to the depth (in feet) in this example and the other numerals (267, 274, 492 and 278) refer to length/width dimensions (in feet) of the lagoons in this example.

In operation, at least some of the outflow from water circulators 1111A-1111I moves downstream (in the direction of arrow D) and impinges upon the first baffle 1120A. At least some of the water impinging upon first baffle 1120A then bounces off of the first baffle 1120A and is redirected to the base of the water column. This movement of water puts biosolids (TSS)-containing water at the bottom of the water column. The first baffle 1120A (along with the first berm 1117, the second berm 1119 and the influent side 1113) may provide substantially 360 degree containment of the water circulators 1111A-1111I. Without wishing to be bound, the berm-to-berm, partial depth baffles 1120A and 1120B create artificial cells within pond 1110. Surface water is redirected down to the bottom of the water column by baffle 1120A (and later by baffle 1120B) where there are lagoon granules. The lagoon granules remove BOD anaerobically. This has the effect of creating vertical up/down plug flow. BOD is reduced and sludge is digested in situ.

Figure 12A:
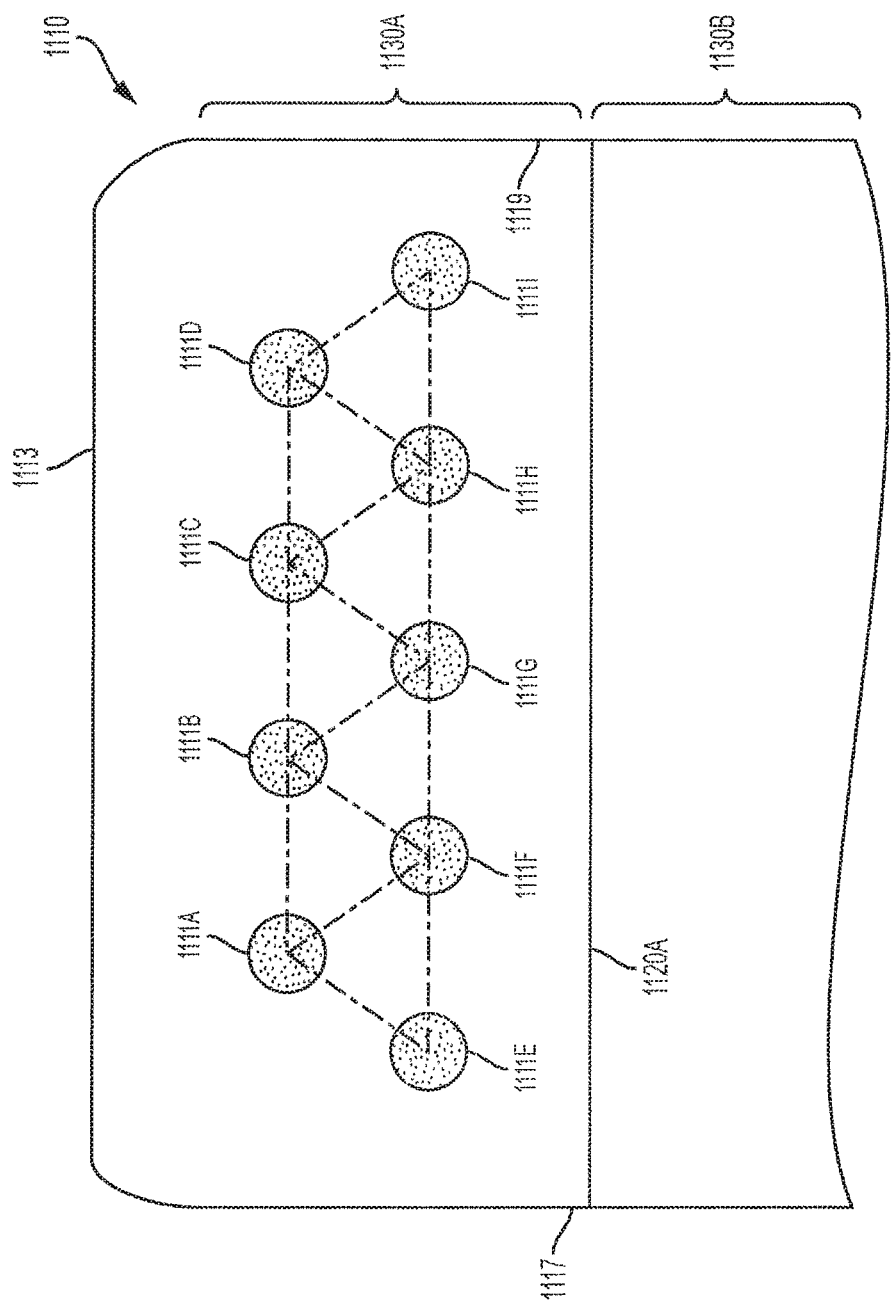
FIG. 12A illustrates a schematic plan view of arrangement of certain water circulators shown in FIG. 11.

Referring now to FIG. 12A, certain details relating to water circulators 1111A-1111I of FIG. 11 are shown (also shown in FIG. 12A are portions of second lagoon 1110 including influent side 1113, first berm 1117, second berm 1119 and first baffle 1120A).

As seen in FIG. 12A, clusters of three water circulators form equilateral triangle configurations. For example, water circulators 1111A, 1111E and 1111F comprise vertices that form a first equilateral triangle (see the dotted lines in the figure connecting these water circulators). Further, water circulators 1111A, 1111B and 1111F comprise vertices that form a second equilateral triangle (see the dotted lines in the figure connecting these water circulators). Further still, water circulators 1111B, 1111F and 1111G comprise vertices that form a third equilateral triangle (see the dotted lines in the figure connecting these water circulators). Of course, the remaining water circulators shown in FIG. 12A form similar equilateral triangles. In addition, it is noted that various equilateral triangles may be formed using a given water circulator more than one time (that is, a given water circulator may be shared by a plurality of clusters, in this case, triangles). In one specific example, the center-to-center distance between the water circulators in FIG. 12A (that is, the length of one of the sides of a given one of the equilateral triangles) is 30 feet. Skilled artisans recognize that equilateral triangles are geometrically equivalent to 3 circulators equidistant around an imaginary center. In other embodiments, water circulators in clusters may be in configurations other than equilateral triangles. For example, they may form any type of triangle, such as acute triangle, obtuse triangle or a right triangle. In other examples, they may form any other desired geometric shape.

Figure 12B:
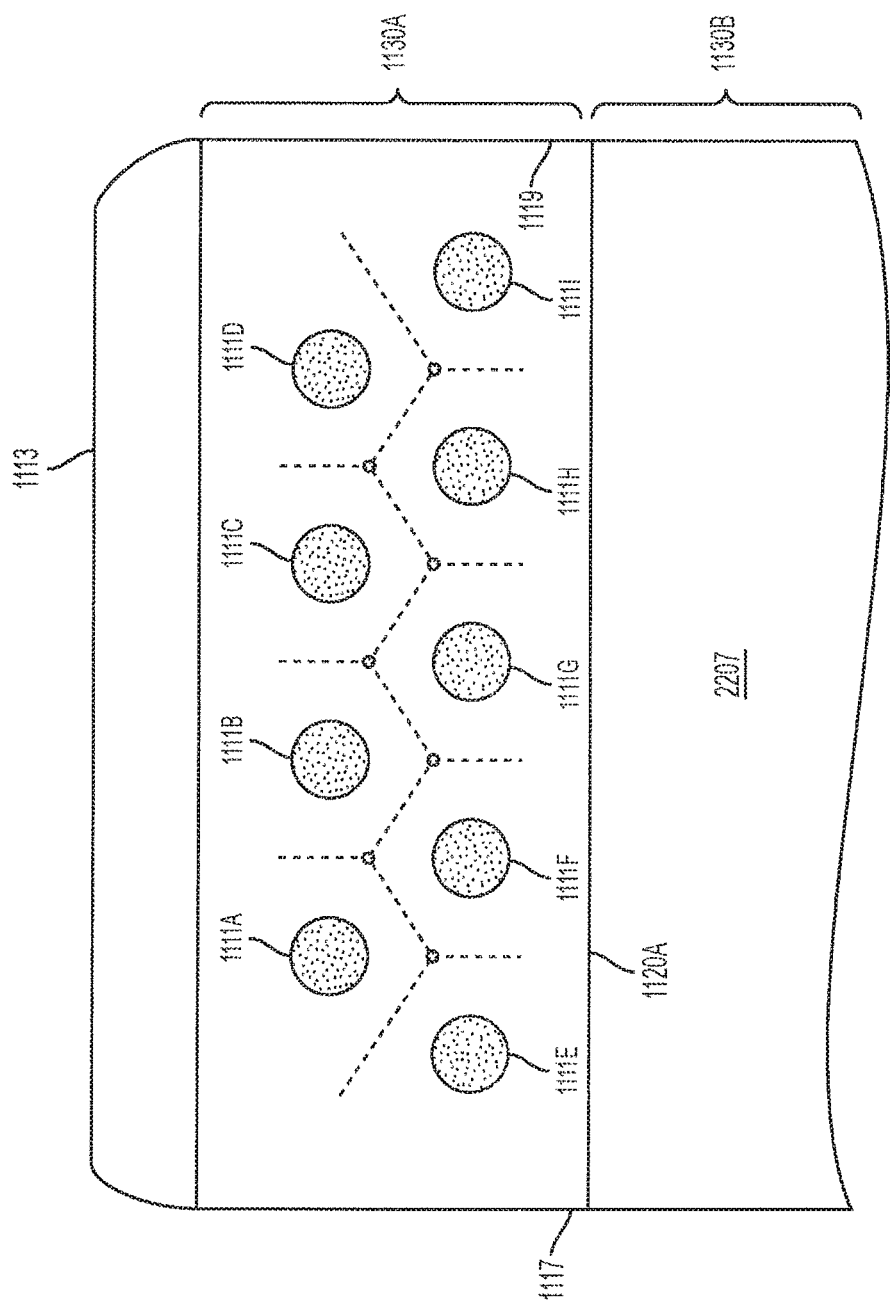
FIG. 12B illustrates a schematic plan view of arrangement of certain water circulators shown in FIG. 11.

Referring now to FIG. 12B, certain details relating to water circulators 1111A-1111I of FIG. 11 are shown (also shown in FIG. 12B are portions of second lagoon 1110 including influent side 1113, first berm 1117, second berm 1119 and first baffle 1120A).

As seen in FIG. 12B, in operation the water circulators 1111A-1111I form a number of hydraulic walls (shown in this FIG. 12B as dashed lines) and a number of hydraulic corners (shown in this FIG. 12B as dots where the dashed lines intersect). These hydraulic walls and hydraulic corners of the configuration shown in FIG. 12B may operate as described elsewhere herein.

Figure 13A:
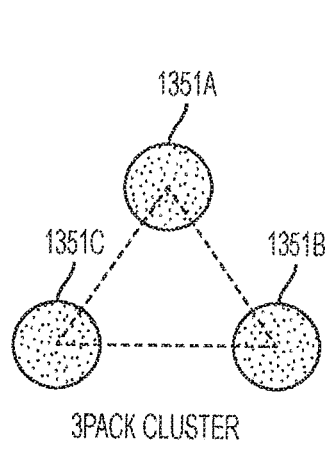
FIGS. 13A-13D illustrate schematic plan views of various arrangements of water circulators according to embodiments of the present disclosure.
Figure 13B:
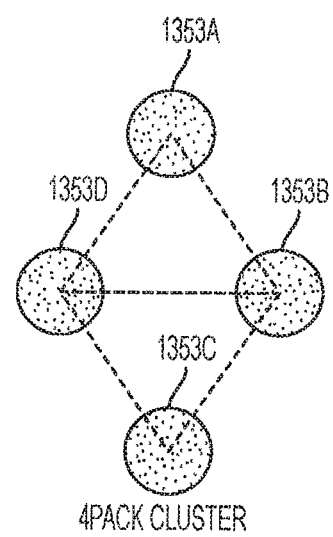
Figure 13C:
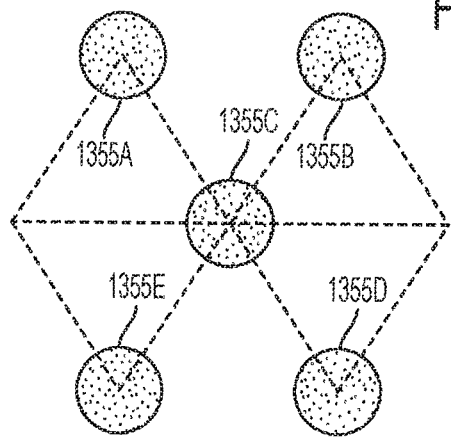
Figure 13D:
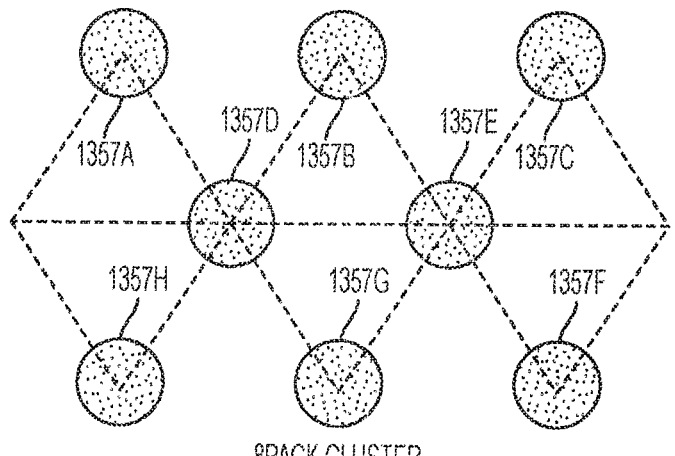

Referring now to FIGS. 13A-13D, illustrated are schematic plan views of various arrangements of water circulators according to embodiments of the present disclosure. More particularly, as seen, in FIG. 13A an equilateral triangle three-pack cluster may be formed of water circulators 1351A-1351C. As seen in FIG. 13B a double equilateral triangle four-pack cluster may be formed of water circulators 1353A-1353D. As further shown in FIG. 13C, a five-pack cluster may be formed of water circulators 1355A-1355E. As can be seen in FIG. 13D, an eight-pack cluster may be formed of water circulators 1357A-1357H.

Figure 14A:
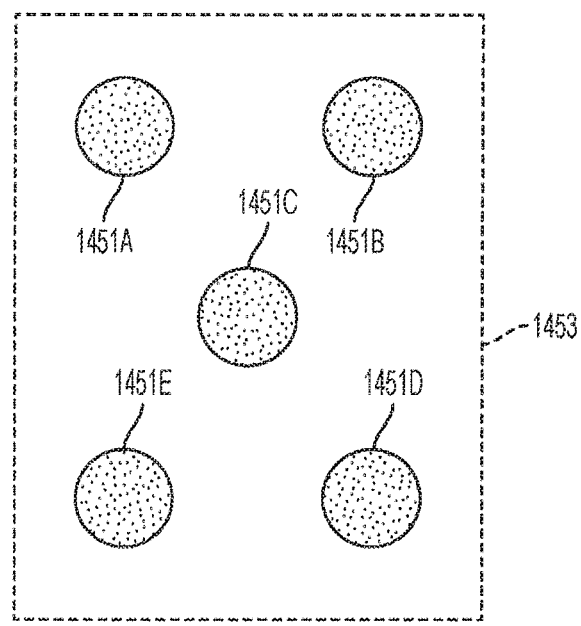
FIGS. 14A-14B illustrate schematic plan views of various arrangements of water circulators according to embodiments of the present disclosure.

Referring now to FIG. 14A, illustrated is a schematic plan view of an arrangement of water circulators according to an embodiment of the present disclosure. More particularly, as seen, in FIG. 14A a five-pack cluster may be formed of water circulators 1451A-1451E. Further, baffle 1453 may provide substantially 360 degree containment of the water circulators 1451A-1451E. In this regard, baffle 1453 may be a closed shape that provides such substantially 360 degree containment without attaching to or connecting with any berm or side of the lagoon.

Figure 14B:
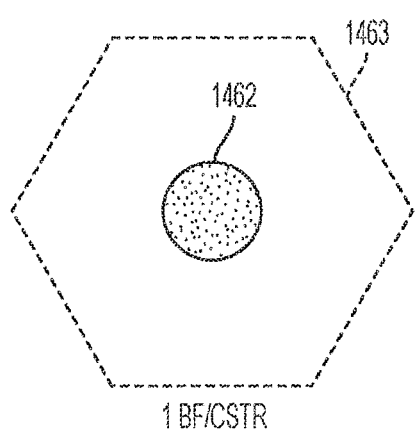

Referring now to FIG. 14B, illustrated is a schematic plan view of an arrangement of a water circulator according to an embodiment of the present disclosure. More particularly, as seen, in FIG. 14B, a single water circulator 1462 may be with baffle 1463, which may provide substantially 360 degree containment of the water circulator 1462. In this regard, baffle 1463 may be a closed shape that provides such substantially 360 degree containment without attaching to or connecting with any berm or side of the lagoon.

As described herein, an aspect of the present disclosure is the formation of biologically active granules. It is these granules which help digest the sludge. The more of these granules that are formed, the faster the sludge is removed (digested) from the lagoon.

Without wishing to be bound, it is believed that the biochemistry of sludge digestion and the formation of the biologically active granules proceeds through the following steps.

Waste is converted into living and dead bacteria by aerobic bacteria, producing $CO_2$. This step is very different for different compounds present in the sludge, as specialized bacteria are needed for specialized compounds (i.e. industrial waste). Dead bacteria are hydrolyzed to simple liquids by extracellular enzymes from facultative bacteria and intracellular enzymes from cell lysing in the cavitation zone. This is a ubiquitous step, since all bacteria have similar element ratios. Facultative and anaerobic bacteria serially ferment simple liquids into acetic acid ($C_2$), which lowers the pH in the pond.

Obligate anaerobes convert $C_2$ into $C_1$ (methane and carbon dioxide). Acid is consumed, raising the pH in the pond. If the methanogens are part of a biofilm, $H_2$ production is also minimized. In the presence of Sulfur Reducing Bacteria (SRB), $H_2$ is converted to $H_2S$. When $H_2$ is not formed, SRB remain inactive, thus preventing production of $H_2S$.

The lagoon containing the sludge not only contains these bacteria, but also calcium and carbonate ions.

Without wishing to be bound, it is believed that cavitation described hereinabove creates such force that it causes the water molecules to break apart into free radicals, hydrogen free radical (.H) and hydroxyl free radical (.OH). It is also believed that the cavitation also causes mineral crystals to nucleate when the solution is supersaturated with calcium carbonate. When the pH initially is 7.5 or greater, the calcium ions react with carbonate anions and calcium carbonate seed crystals are formed. Once the seed crystals are formed, the pH of the lagoon water may vary to as low as 6.2 or as high as 10. Seeds (granule precursors) are discharged at the base of the water column. The seeds grow and propagate. As small seed crystals flow around in perimeter flow, the crystals grow in size and weight until they can precipitate into the anaerobic zone. Once in the anaerobic zone, the crystals are coated with a gas-forming anaerobic biofilm. As gas forms and occludes to the biofilm-coated crystal, the crystal floats into the facultative zone. Facultative bacteria attached to the biofilm. The facultative bacteria protect the biofilm by consuming toxic oxygen and feed the biofilm by converting solids serially into shorter and shorter fatty acids. C2 fatty acids (acetic acid) and $CO_2$ (C1) are the primary food of the gas-forming biofilm. The individual granules gradually agglomerate into large crystals that settle and do not fluidize. Immature granules can be fluidized; mature granules sink permanently. Eventually the granular fluidized bed is intermediate between alluvial and gelled sludge. The alluvial sludge and granules are well mixed by produced gas. However, the gelled sludge is not.

With respect to the seeds being discharged at the base of the water column, in an embodiment, the seed outflow is initially at the surface until the seeds hit a hydraulic wall. Without wishing to be bound, it is believed that the hydraulic wall redirects flow down to the bottom. The path of least resistance is under the downward flowing hydraulic corners and thus at the base of the water column. When there is a hydraulic corner, the seeds are concentrated (e.g. in a 4-pack cluster from 4 different water circulators) and thus agglomerate into granules more easily.

Without wishing to be bound, it is believed that once the $CO_3^-$, indirectly produced by the granule, reacts with the $Ca^{++}$, thereby stabilizing the gel to form calcium: carboxylic acid ion pairs. The immediate gel collapses to become alluvial sludge (i.e. un-stabilized sludge). The process is iterative over time. The gel layer thins and the granule bed increases. The carbonate extracts $Ca^{++}$ from the sludge gel, destabilizing it. The resultant $CaCO_3$ is used to increase the size of the granules and form new granules. The bacteria bind the $CaCO_3$ to the granule with a bacteria-produced glue to increase the size of the granule.

It is believed, without wishing to be bound, that bacteria use the local $CaCO_3$ as a base on which they form a biopolymer that enlarges the granule. In addition, bacteria bond to other mineral salts, e.g. calcium phosphate and struvite, to form a biofilm which anchors to the granules. The colonizing bacteria form a synergistic biofilm on the heavy mineral. The mineral salts selected for use as granules encourages biofilm formation. The inner bacteria are obligate anaerobes, e.g. Geobacter and Methanosaeta. The outer bacteria are facultative bacteria that hydrolyze bio-solids into bio-liquids. The inner bacteria convert bio-liquids into gas and consume acid, raising pH. The obligate anaerobes in the interior utilize oxygen to produce $C_1$ (methane) and/or carbon dioxide gases. A superficial coating of facultative bacteria consumes trace oxygen and extracellular and intracellular enzymes convert biosolids (sludge) into liquid BOD. The facultative granule's exterior hydrolyzes the castings into liquids while the interior converts liquids sequentially into gas and consumes acid. The free radicals and intense jets of hot water (from cavitation bubble collapse) described hereinabove attack the bacterial cell wall and lyse it, releasing intracellular enzymes. Intracellular enzymes are also released by cavitation. The combination of the extracellular enzymes and the intracellular enzymes and intracellular enzymes produced by free radicals digest the sludge. It is well accepted that bacterial activity shows a first order response by slowing when temperatures drop. For example, ammonia oxidation is well known to have a strong dependency with temperature. The nitrification bacteria responsible for ammonia oxidation are inactive at temperatures below 5° C.

Surprisingly, the reduction in biochemical oxygen demand (BOD) is independent of ambient temperature when an aerobic vertical surface is combined with horizontal anaerobic granules. BOD is the amount of dissolved oxygen needed by aerobic biological organisms in a body of water to break down organic matter at a specific temperature over a defined period of time.

The alluvial sludge is digested in situ. The granules are dense enough to sink through the alluvial sludge, but they do not penetrate the gel-structured recalcitrant sludge. The alluvial sludge is digested, leaving entering solids and recalcitrant sludge to be digested. The new sludge (i.e. incoming solids, aerobic produced biosolids and fresh worm castings) is alluvial because new biosolids rain down from the quiescent zone above without yet forming a new gel. The granules have capacity to handle this load.

Recalcitrant sludge is difficult to digest because the granules are in intimate contact only on the substantially spherical granule's contact surface area with substantially flat recalcitrant sludge's gelled structure. Only the granule's lower surface, in direct contact with recalcitrant sludge, has the opportunity to digest. Thus, recalcitrant sludge is digested slowly.

Without wishing to be bound, for a more detailed explanation of the biochemistry of how the granules break down the sludge, reference is made to the Appendix. Thus, without wishing to be bound, it is believed that waste treatment has 4 steps: 1. Oxygen addition makes solids and $CO_2$ gas; 2. Enzymes hydrolyze solids into simple, soluble liquids; 3. Acid formers make serially shorter acids; 4. Acid consumers convert short acids into gas.

In a natural pond, Step 1 conversion of soluble BOD to solids is usually rate limiting because natural ponds are clean. That is there is little to convert to gas.

In a waste treatment pond, Step 2 is rate limiting (that is why solids accumulate).

In the present disclosure, there are two separate rate-limiting steps. Step 1 is rate limiting because the incoming BOD is removed from the lagoon effluent and solids do not accumulate (i.e. solids are digested in situ). By making excess granules, all the acid formed is consumed; the pH is stable (~6.5) and there is no odor (no VFA (volatile fatty acid) and no $H_2S$).

In the present disclosure: 1. The cluster(s) and the hydraulic corners create excess enzymes (the cavitation lyses bacterial solids releasing their intracellular enzymes). 2 The enzymes hydrolyze BOTH the incoming solids and the pre-existing solids inventory. 3 Granules grow on the seeds made during cavitation up to the food available (incoming solids+inventory solids). 4. Thus, excess granules are made during inventory removal (excess only after the pre-existing inventory is digested). 5. Once the inventory is gone, the available substrate is only incoming solids. 6. The granules have too little food and thus cannot be rate limiting.

In an embodiment, the absence of outboard hydraulic walls (that is, the absence of hydraulic walls in areas outside of the circle) has the unexpected result of controlling trace odors. There is continuous wave activity. This creates a situation where suspended solids are acted on by gravity and friction. Gravity pulls all solids down. During the half wave cycle when the wave is rising, there is a down friction force on the particle. The net force is to pull particles to the wave/no-wave interface, leaving a substantially clear or "sweet" layer on the surface that is virtually solids free.

In an embodiment, the "sweet" layer extends down from the surface of the water at least 6 inches. In an embodiment, the above mentioned wave activity is from the falling reciprocating flow water circulators. In an embodiment, the activity of the falling reciprocating flow water circulators increases the depth of the "sweet" layer.

Thus, in an embodiment, the continuous wave formation outboard of the cluster has the surprising effect of controlling lagoon odor by creating an aerated, solids-free "sweet" layer cap over the entire lagoon. The continuous wave motion also inhibits cyanobacteria growth (blue green algae). Cyanobacteria are disrupted by continuous waves and do not bloom. When cyanobacteria bloom, they consume alkalinity and the pH often rises above permit limits (>9). Thus the absence of outboard hydraulic walls indirectly controls effluent pH by preventing cyanobacteria blooms.

Each cavitating water circulator lyses bacteria and algae. It may be difficult to calculate the degree of this lysing as it is dependent on the cavitation, the moles of bacteria and the moles of algae. To develop a measure for design, the ratio of the circulator flow (# of circulators * flow per circulator) divided by the influent flow is a useful dimensionless ratio. In an embodiment, a dimensionless ratio of the flow rate of the reciprocating water circulator per influent gallons per day ranges from 2 to 15, while in another embodiment, it ranges from 3 to 11, while in another embodiment, it ranges from 4 to 9. In a specific example, a ratio with respect to flow rate is 1 reciprocating BF water circulator/0.3 Million Gallons Per Day=6.7 [6.7=1 circulator * 2 MGD per circulator/0.3 MGD influent]. Table 1 below provides examples of ratios.

TABLE 1

| # of circulators | Flow per circulator MGD | influent flow MGD | RATIO |
| --- | --- | --- | --- |
| 1 | 2 | 0.3 | 6.7 |
| 3 | 2 | 0.7 | 8.6 |
| 4 | 2 | 1 | 8.0 |
| 1 | 2 | 0.6 | 3.3 |
| 1 | 2 | 0.5 | 4.0 |
| 2 | 2 | 0.8 | 5.0 |
| 4 | 2 | 0.8 | 10.0 |

An advantage of the present arrangement is that these granules are concentrated in the center of the circle of the circulators, making the granules more concentrated in one area, thereby making the sludge digestion more effective by mechanically breaking through the recalcitrant gel. Once gas is produced below the gel, the rising produced gas destabilizes the gel, making it alluvial. As the destabilization expands from the hydraulic corners, the recalcitrant gel breaks down and is readily digested.

In one specific example, the lagoon is at least four feet deep (with an anaerobic bottom and with essentially no limit on the maximum depth). In another specific example, the lagoon is at least seven feet deep (with an anaerobic bottom and with essentially no limit on the maximum depth).

In another example, lagoon granule productivity is surprisingly increased by forming "hot spots" of high concentration of reagents. When there are hot spots, there is more lagoon granule initiation. When there is more initiation, there is more lagoon granule proliferation. When there is more proliferation, there is more hydrolysis. When there is more hydrolysis, more intracellular enzymes are released (from lysed dead bacteria). When more intracellular enzymes are released, more biosolids are turned into simple liquids. When there are more simple liquids, more gas is formed. When more gas is formed, more simple liquids are pulled into lagoon granules. Sludge digestion accelerates.

In another example, provided is a mechanism to make granules in an aerobic environment (cavitation is aerobic) and then have them work in an unmixed anaerobic environment (anaerobic granules are well known and known to digest sludge when the granules are well mixed). In one specific example, the conditions are aerobic (making nitrite), but the granules are anaerobic and digest sludge (in this example, ammonia in supernatant from sludge digestion increased from 0.25 mg/l to 35 mg/l).

In another example, there are two $CaCO_3$ formation strategies: The first is pH >7.5 to initiate granule formation (this may only need to happen once). The second reaction takes place at the produced gas/supernatant interface where $CaCO_3$ can be made at a pH less than the above pH wherein $CO_2$ gas reacts with calcium in the bubble-surrounding water (e.g. pH=6.5).

As described herein, in various examples lagoon granules: (1) are biologically active; (2) produce $CH_4$, $CO_2$ and $H_2O$ (not $H_2S$); (3) self initiate and self propagate.

Further, as described herein, in various examples disclosed mechanisms: (1) operate best at cold temperatures (e.g., T<25° C.); (2) provide reciprocating flow past a constantly turning impeller; (3) use water having a pH greater than or equal to 7.5 one time only; (4) provide small granules (immature) that are fluidized (mature granules are not fluidized); (5) provide granules that do not wash out, but can cement-in in high calcium/high pH environments; (6) provide granules that are in reduced surface tension hydrolytic brine.

FIGS. 15-18 and 23 are presented to illustrate, without wishing to be bound, the biochemistry that is believed to be occurring in the embodiments described hereinabove when a baffle is used.

Without wishing to be bound it is believed that the hydraulic wall redirects the pathway of the expelled water as described here. The low resistance flow pathway is at the bottom of the water column just above the sludge blanket. Once outside the hydraulic wall, density differences cause the water to stratify into layers of differing density. Legacy sludge (pre-existing) is at the bottom. Clear water is at the top. There is an aerobic zone just below the clear layer where dissolved oxygen comes diurnally from microalgae. Just above the legacy sludge is a layer of mature granules, i.e. granules that are substantially spherical. They produce gas. Produced gas occludes to immature granules, i.e. granules that are not yet substantially spherical. The occluded gas carries immature granules to the aerobic/facultative interface. At the interface, differences in surface tension cause the bubbles to oscillate and strip occluded gas. Gas-stripped immature granules fall back to the bottom. The up and down motion creates a gently mixed zone the quiescent zone where substrate and immature granules are mixed. Meanwhile, suspended solids in the aerobic zone sink to the interface. The interface is violently mixed by oscillating bubbles (caused by changing surface tension in the interface.) Intact bacterial cells are ruptured, releasing their internal fluids.

Figure 23:
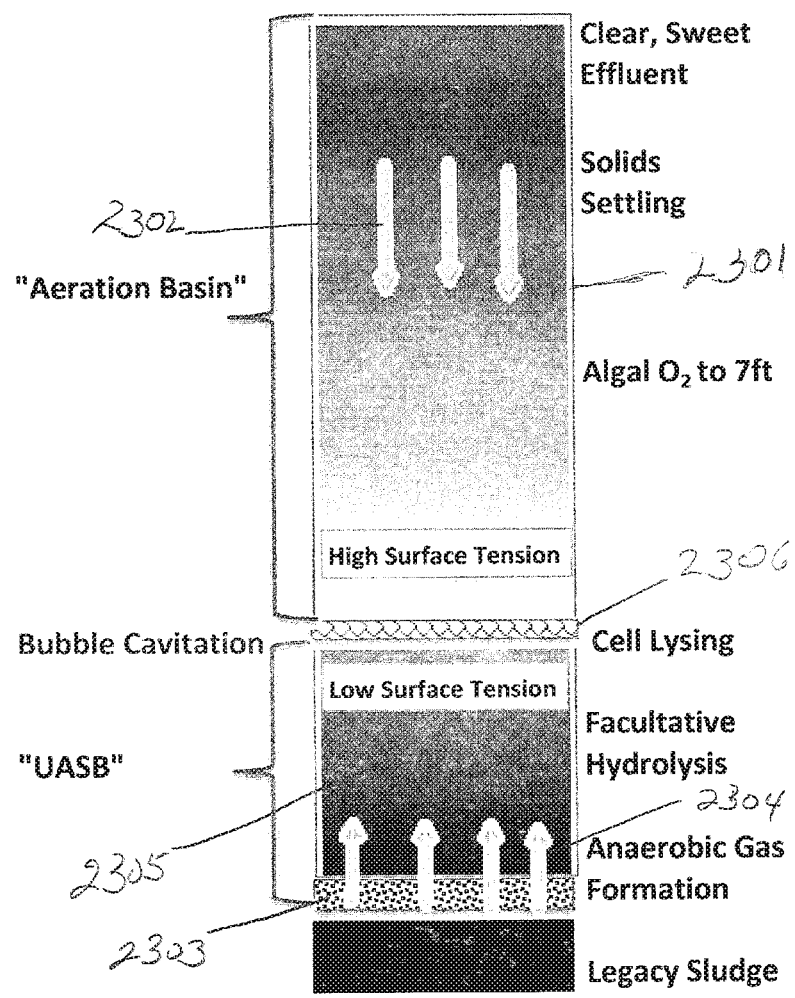
FIG. 23 illustrates a cross-sectional representation of the sludge in a pond after treatment with the system discussed in the present disclosure.

Without wishing to be bound and referring to FIG. 23, there is a quiescent or gently mixed aerated zone (2301) (DO>1 mg/l) where SBOD is converted into TSS. TSS settles 2302 (downward arrows). The surface tension of this water is close to pure water. (For example in one embodiment: 69.17 mN/m (pure water is 72 mN/m)).

The dots (2303) represent the gas-forming mature granules that are biologically active but do not fluidize. The upward arrows (2304) show the rising gas. The low surface tension zone (2305) is a facultative fluidized zone where immature granules are pulled up by occluded produced gas until the gas is released at the aerobic/facultative interface (high surface tension/low surface tension) and the immature granules fall. The surface tension of the fluidized bed is low, 44.98 mN/m in one embodiment (FIG. 12A embodiment). The reason surface tension is low is facultative bacteria convert solids first into long chain fatty acids (soap).

The interface between high and low surface tension (2306) is shown in FIG. 23. In an embodiment, it is about 3 inches thick. Internal bubble pressure is directly proportional to surface tension. Thus the upper part of the interface has small volume, high-pressure bubbles. The lower part of the interface has large volume, low-pressure bubbles. As an individual bubble transitions through large bubble/low surface tension and then into small bubble/high surface tension water, it is believed that the bubble geometry is inherently unstable (big on the bottom, small on top). This imbalance causes each bubble to cavitate.

As TSS rains down from above, each intact bacterial cell is torn apart by the cavitating bubbles, reducing solids mass as internal water is released. For example, about 80% of the cell mass is water, 18% is substrate (sugars, enzymes, electrolytes, etc.) and 2% is non-digestible ash. The released digestive enzymes accelerate biological hydrolysis in the fluidized bed. For perspective, the COD in the high surface tension aerobic zone is 254 mg/l; the COD in the low surface tension facultative zone is 40,000 mg/l. This large swing in 3" of vertical travel is unheard of in a quiescent water column.

There is a critical mass of cell lysing that has to occur to insure that solids mass hydrolysis is greater than solids mass accumulation. Gas from a critical mass of granules provides sufficient gas to lyse virtually all the intact cells that rain down through the low/high surface tension interface. Legacy (ancient) sludge is gradually converted into gas at the sludge/mature-granule interface. The default position is sludge accumulates because there is insufficient hydrolysis.

Figure 15:
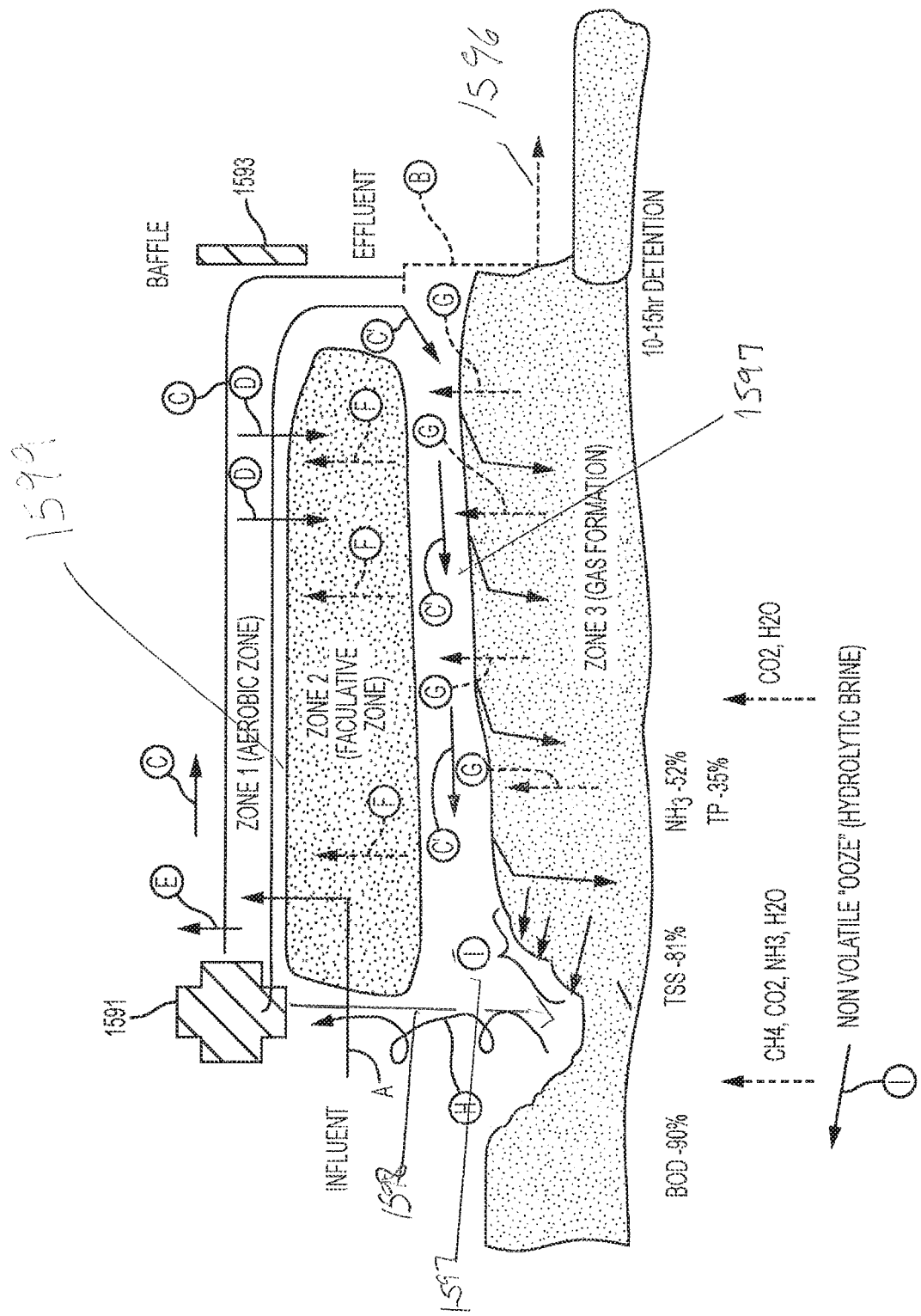
FIG. 15 illustrates a cross-section of a portion of a lagoon according to an embodiment of the present disclosure.

Referring now to FIG. 15, a cross-section of a portion of a lagoon including cavitating water circulator 1591 and baffle 1593 according to an embodiment of the present disclosure is shown (this FIG. 15 is provided to aid in discussing an example of water movement and processing). As seen in this FIG. 15, Zone 1 (aerobic zone) has flow out "C" and down "C". Further, the flow splits with a portion (see "B") out of the cell as effluent and with a portion (see C') across face of the bed (down and to the left) C' essentially equals C minus B.

Further still, the aerobic zone depicted (Zone 1) is 1 ft deep (e.g., DO=6.49 mg/l @1 ft) as DO migrates down after impacting baffle 1593 and DO is consumed. In Zone 2 (facultative zone), the ORP=−431.4 mV (highly anaerobic). Further still, produced solids comprising the aforementioned granules settle into Zone 2 (see "D"). A low pressure point is produced at the bottom of "H". Water is brought up by "H" from the low pressure point. In addition, an amount of influent (see "A") is essentially equal to the amount of effluent (see "B").

Still referring to FIG. 15, Zone 2 (facultative zone or quiescent zone) is gently mixed by rising gas and falling liquids (not by water circulator 1591 pumping action).

Further, Zone 2 is anaerobic (e.g., −431.4 mv @ 2 ft) but rich in enzymes from cell lysing during cavitation. Further still, produced solids from Zone 1 are hydrolyzed. In addition, serial shortening of simple soluble compounds after hydrolysis (to acetic acid) releases $CO_2$ (see "F"). During this process the pH rises from 6.5 to 7.4.

Still referring to FIG. 15, particles build up inside the BF/CSTR (that is, inside the area contained by the baffle 1593) via centrifugal separation (right angle turn). Moreover, return water flows across the bed face. Some water is pulled down into the bed by granules' breathing (filter feeders). In addition, non volatile ionic compounds accumulate (e.g., the cations being $Ca^{++}$ (15,900 mg/l), $NH_4^+$ (5,320 mg/l), Total Phosphate (5,000 mg/l)) and volatile compounds (see "G") leave as gas bubbles. In this regard, BOD is converted into $CH_4$, $CO_2$, $NH_3$ & $H_2O$ leaving small residual BOD (27 mg/l, a 90% reduction in BOD).

Still referring to FIG. 15, water outflows radially in Zone 1 from Circulator 1591 to the baffle 1593, where it is redirected and pulled directly back to the circulator 1591 inlet. The recirculating flow is high surface tension. Tiny crystals formed in the circulator cavitation 1599 recirculate until they grow large enough to precipitate.

Radial outflow continues, for example, for about 6 seconds (in an embodiment 5.85 seconds) and then a non-swirling pulse of liquid 1598 shoots down towards the anaerobic zone, Zone 3. Entrained crystals transfer out of the recirculating perimeter flow fluid 1597 during this pulse of, for example 6 seconds, and penetrate the anaerobic zone (like a cannonball). Once in the anaerobic zone, the crystal is coated with a gas-forming anaerobic biofilm.

Gas is produced in the anaerobic zone. Produced gas occludes to the immature granule, lifting it out of the anaerobic zone into the facultative, fluidized zone 1597. Facultative bacteria grow all around the biofilm coated seed crystal.

As the immature granule with low surface tension rises towards the recirculating aerobic perimeter flow, the interface between high and low surface tension causes bubbles to strip from the immature granule and cavitate. Intact cells are lysed by the cavitation.

Finally, outflow (0.18 MGD max) begins 1596 at the sludge blanket/fluidized bed interface.

Still referring to FIG. 15, it is seen that the configuration discussed above provides for a non-homogeneous lagoon having three distinct stratification layers. In addition, in the configuration shown in FIG. 15, water is allowed to escape only from the bottom of the water column (i.e. below the bottom of the baffle).

Figure 16:
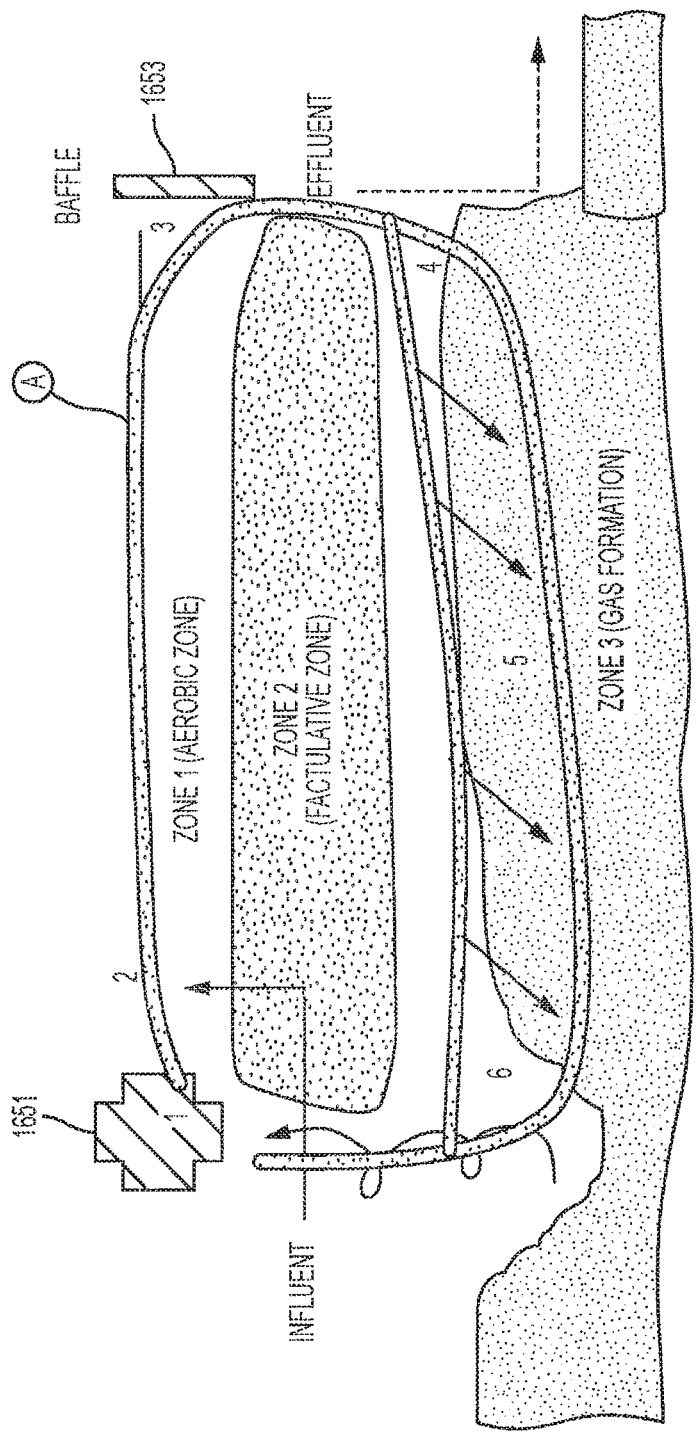
FIG. 16 illustrates a cross-section of a portion of a lagoon according to an embodiment of the present disclosure.
Figure 17:
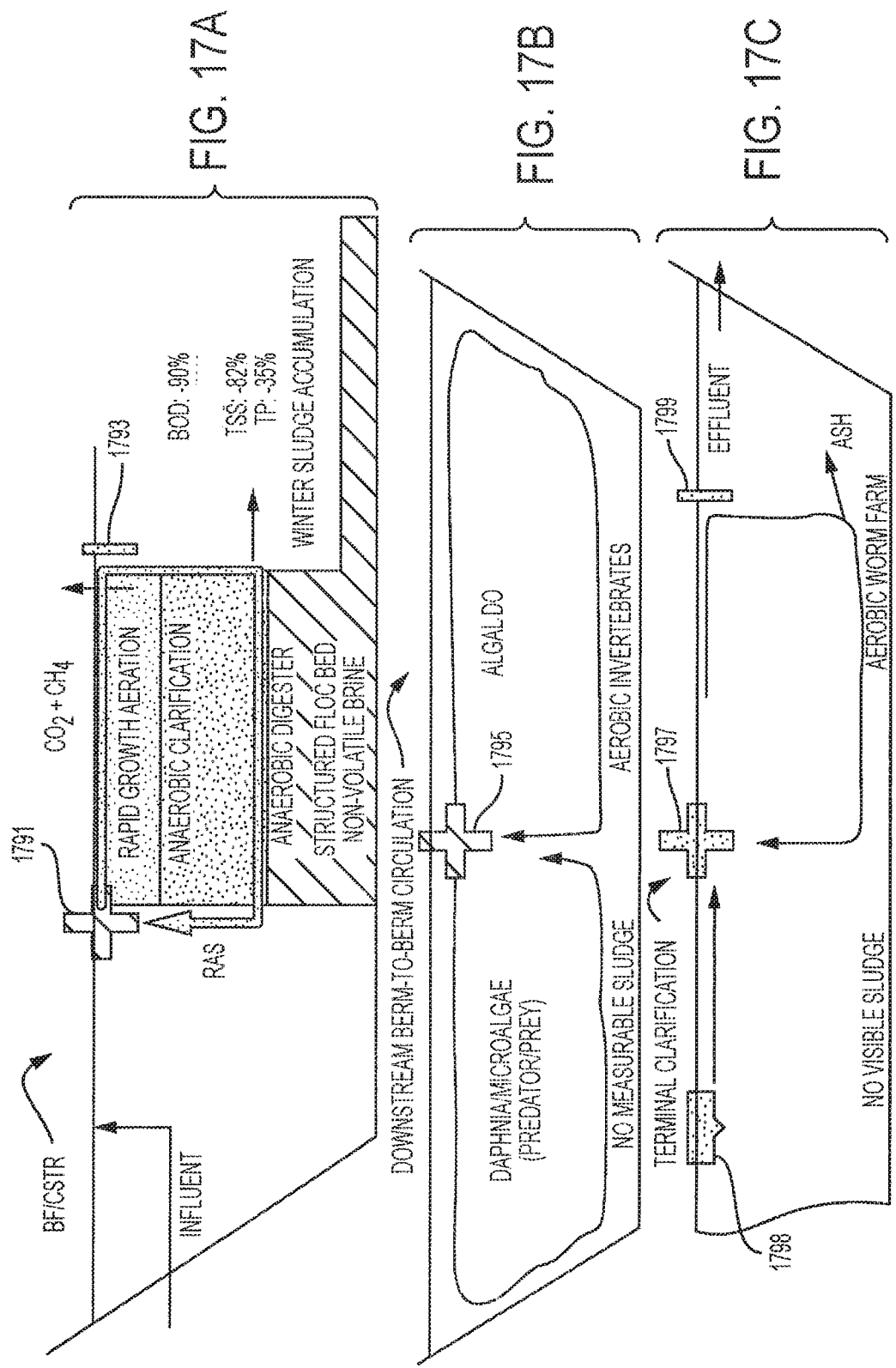
FIGS. 17A, 17B and 17C illustrate views of a lagoon according to an embodiment of the present disclosure.

Referring now to FIG. 16, a cross-section of a portion of a lagoon including water circulator 1651 and baffle 1653 according to an embodiment of the present disclosure is shown (FIG. 16 is provided to aid in discussing an example of water movement and processing). As seen in FIG. 16 (which is similar to FIG. 15), the flow pattern through the BF/CSTR is "perimeter flow" (see "A") that encircles a strongly anaerobic center (zone 2).

Still referring to FIG. 16, there are six distinct areas as the perimeter flow completes the circuit. One of these areas is the cavitation area (see "1"). In this area flow reverses, for example, every 6 seconds (0.15 seconds down; 5.85 seconds out and back, net 2 MGD up and out). In addition, fat is hydrolyzed into soap and surface tension is ~20% lower than pure water. Without wishing to be bound, as discussed hereinabove, it is believed that cavitation and varying surface tension lyse cells, releasing internal fluids.

Still referring to FIG. 16, area 3 is the high DO zone. Here DO is, for example, ~6.5 mg/l. In this area, it is believed, without wishing to be bound, that internal enzymes are partially oxidized, increasing the rate of hydrolysis of solids into simple liquids. In this area eddies re-entrain microbubbles as surface outflow thins; outflow depth is, for example, 3/8" thick; water is redirected down by baffle; and a hydraulic wall is formed.

Still referring to FIG. 16, between areas 3 and 4 is where air bubbles escape. Water becomes anaerobic (e.g., −448.1 mv); water flows down (air microbubbles float up and out); BOD absorbs dissolved DO; and effluent leaves BF/CSTR below hydraulic wall (FIG. 15, flow 3).

Still referring to FIG. 16, area 5 is where granules, initially created by $CaCO_3$ seeds that formed granules described before and by gas/liquid propagation, pull dirty water into each granule. Here carbon is converted into gas ($CH_4$, $CO_2$); non-volatiles accumulate as hydrolytic brine (e.g. $Ca^{++}$=15,900 mg/l); free ammonia is reduced by increased salinity (e.g., pH=6.5; T>10° C. (warmer than surface)); Total Dissolved Solids (as dissolved NaCl)=1,410 mg/l); cell internal fluids are extracted by osmosis from low internal salinity to high external salinity, feeding granules; and 90% of BOD, for example, is turned into gas.

Still referring to FIG. 16, area 6 is where high salinity diffuses out of bed into influent swirl. The brine concentration stabilizes. Here the swirl centrifugally separates out produced solids, adding to the porous bed; the swirl scours a valley below the water circulator identified as BF 1651 via mechanical action; the cycle repeats; and the bed depth stabilizes.

Referring now to FIGS. 17A, 17B and 17C illustrated are views of a lagoon according to an embodiment of the present disclosure. More particularly, FIG. 17A shows a cross-section of the lagoon at an upstream end (the cross-section of this FIG. 17A is shown with the most upstream end on the left with a downstream end being on the right). FIG. 17B shows a cross-section of the lagoon downstream of the rightmost portion of FIG. 17A (the cross-section of this FIG. 17B is shown with one lateral berm on the left and another lateral berm on the right). The lagoon, in FIG. 17B, has an aerobic bottom, such as in a natural lake. FIG. 17C shows a cross-section of the lagoon with an aerobic bottom, such as a natural lake, at a downstream end (the cross-section of this FIG. 17C is shown with the most upstream end on the left with a downstream end being on the right).

As seen in FIG. 17A, the lagoon includes water circulator 1791 (which may be a BF circulator operating in cavitation mode) and baffle 1793. Operation of the water circulator 1791 and baffle 1793 causes stratification as shown in FIG. 17A.

As seen in FIG. 17B, the lagoon, in this case, a natural lake with an aerobic bottom, includes water circulator 1795 (which may be a BF circulator operating in mix mode). Operation of the water circulator 1795 causes circulation as shown in FIG. 17B. Of note, the Daphnia, as defined herein, may be anything that prays on microalgae, such as zooplankton. Of further note, the aerobic invertebrates may be detritivores (that is, they consume dead bacteria and dead algae). Of further note, the algal DO refers to dissolved oxygen produced by algae.

As seen in FIG. 17C, the lagoon includes water circulator 1797 (which may be a GF circulator), baffle 1799 and water pump 1798 (which may be, for example, a 10 HP pump). Operation of the water pump 1798, the water circulator 1797 and the baffle 1799 causes water flow as shown in FIG. 17C. Of note, the ash may be primarily from worms. Of further note, the baffle 1799 may serve to protect the effluent physical structure from floating solids.

Still referring to FIGS. 17A-17C, it is noted that the system may be operated 24 hours a day, seven days a week. Further, it is noted that the configuration may be repeated for multiple lagoons (e.g., 50% improvement in free ammonia in lagoon one, another 50% improvement in free ammonia in lagoon two, etc.).

Figure 18:
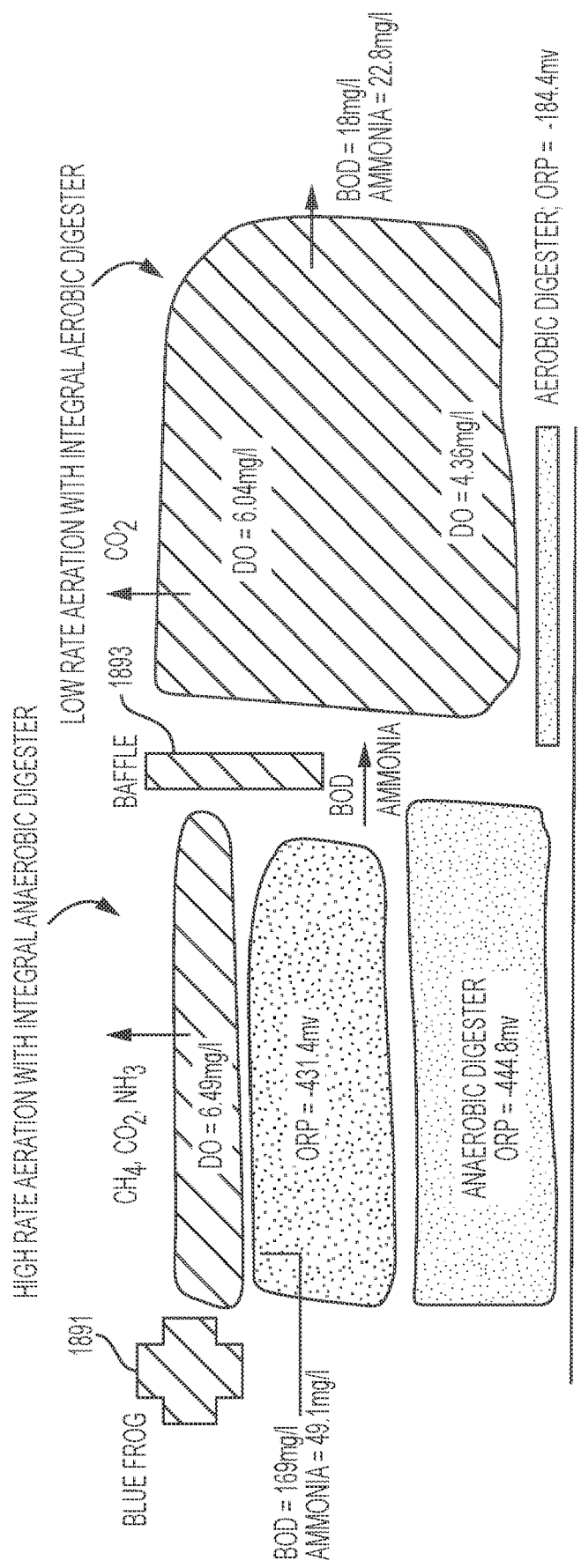
FIG. 18 illustrates a cross-section of a portion of a lagoon according to an embodiment of the present disclosure.

Referring now to FIG. 18, illustrated is a cross-section of a portion of a lagoon according to an embodiment of the present disclosure. As seen in this FIG. 18, a lagoon includes water circulator 1891 and a baffle 1893. Operation of the water circulator 1891 causes the stratification as shown on the left of baffle 1893 (this area on the left of baffle 1893 provides a high rate aeration with integral anaerobic digester). Further, operation of the water circulator 1891 provides the low rate aeration with integral aerobic digester as shown on the right of baffle 1893).

Thus, it is believed, without wishing to be bound, that the granules propagation is effected by the following process: The ammonia gas reacts with the carbon dioxide gas to form ammonium and calcium carbonate, which occurs at the bubble supernatant interface. In addition, the ammonia reacts with the water to raise the pH. The free ammonia, which causes the pH to become more basic (raises pH), inhibits anaerobic activity more than it inhibits the facultative acid formers. On the other hand, when the concentration of free ammonia is reduced, the pH falls concomitantly therewith. In addition, the temperature drops and salinity increases. Eventually, an equilibrium forms and the pH is 6.5, thereby creating the conditions for granule propagation and anaerobic biosolids digestion.

It is believed, without wishing to be bound that granule formation requires three distinct steps: (1) Seed crystal formation; (2) A sticky biofilm grows around the seed; (3) Sticky seeds agglomerate into mature granules. Seed crystals occur if the pH >7.5 once; thereafter, a propagation mechanism makes seeds @ pH ~6.5. The sticky biofilm coats the seed at a facultative ORP (ORP is less negative than −250 mv). The mature anaerobic granule does not occur unless the environment is fully anaerobic (ORP is more negative than −250 mv). The vertical inlet design is more anaerobic and therefore the bed of mature granules forms within the CSTR, not outside the CSTR. Note that inside the BF/CSTR, the anaerobic zone is built up to a height greater than the aerobic zone outside the BF/CSTR.

Figure 19:
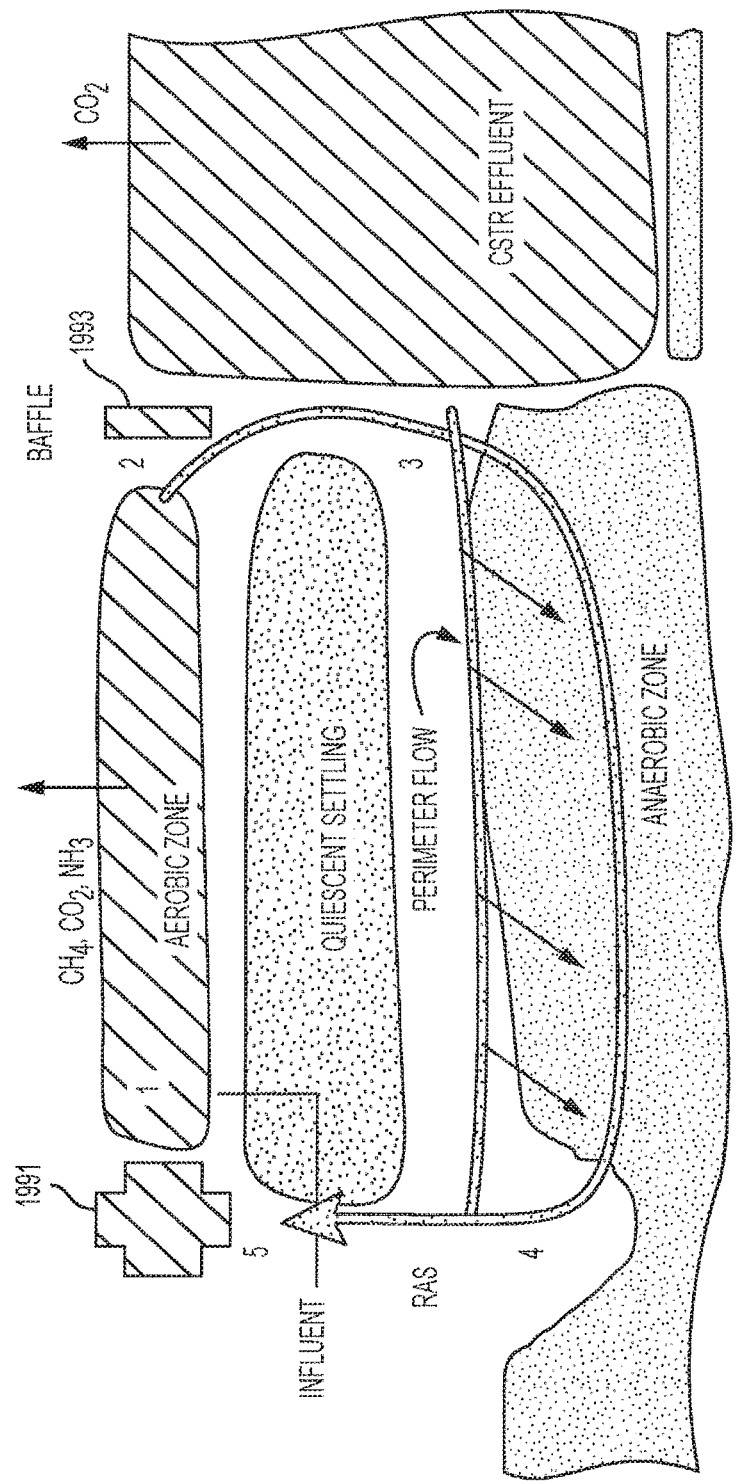
FIG. 19 illustrates a cross-section of a portion of a lagoon according to an embodiment of the present disclosure.

Referring now to FIG. 19, an additional description of an embodiment of the present disclosure is provided. In this FIG. 19, the water circulator 1991 intentionally cavitates and pushes water (e.g., 2 MG/D) around the perimeter of a "tank-in-a-tank". More particularly, at "1", intense cavitation lyses bacteria cells, releasing internal digestive enzymes. Half the ammonia (as free ammonia) is boiled off. The aerobic zone has a DO~6.5 mg/l. At "2", a baffle 1993 redirects flow straight down to the bottom ("3"). Water and concentrated enzymes flow down; air bubbles float up and out. DO at "3" is, for example, 0.18 mg/l. A deep, porous, anaerobic (e.g., ORP=−448.1 mV) floc bed ("lagoon granules") forms at the bottom, producing gas and brine (non volatile cations & anions) and then sucking in fresh substrate. Flow percolates horizontally through the bed to "4". The water circulator 1991 has a vertical inlet that creates a tornado-like swirl down to "4". The low pressure point is at "4". Horizontal bottom flow is sucked into the vortex and swirls up and into the water circulator 1991 as RAS. Perimeter flow is established with an upper aeration zone, a lower anaerobic zone and a quiescent settling zone in the middle. As used herein, the quiescent settling zone is synonymous with the quiescent zone. There is no mechanical stirring of the granules in this zone, and the granules that are present flow through the zone settle in the anaerobic zone. BOD is reduced by, for example, 90%.

Figure 20:
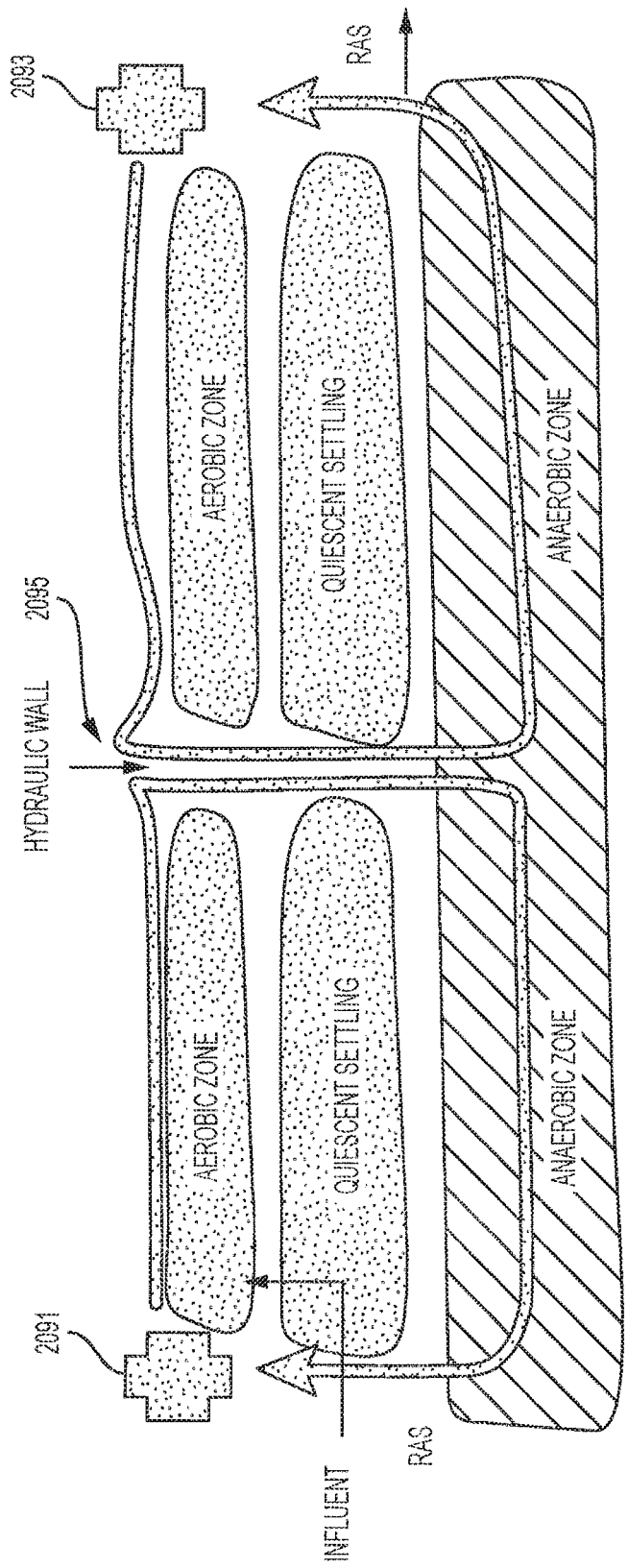
FIG. 20 illustrates a cross-section of a portion of a lagoon according to an embodiment of the present disclosure.

Referring now to FIG. 20, an embodiment is shown in which water circulators 2091 and 2093 cooperate to produce hydraulic wall 2095. In this embodiment, the hydraulic wall 2095 functions as one of the partial depth baffles described herein, resulting in the aerobic, quiescent settling and anaerobic zones shown in FIG. 20. Also resulting from the hydraulic wall 2095 is the perimeter water flow shown in FIG. 20.

Figure 21:
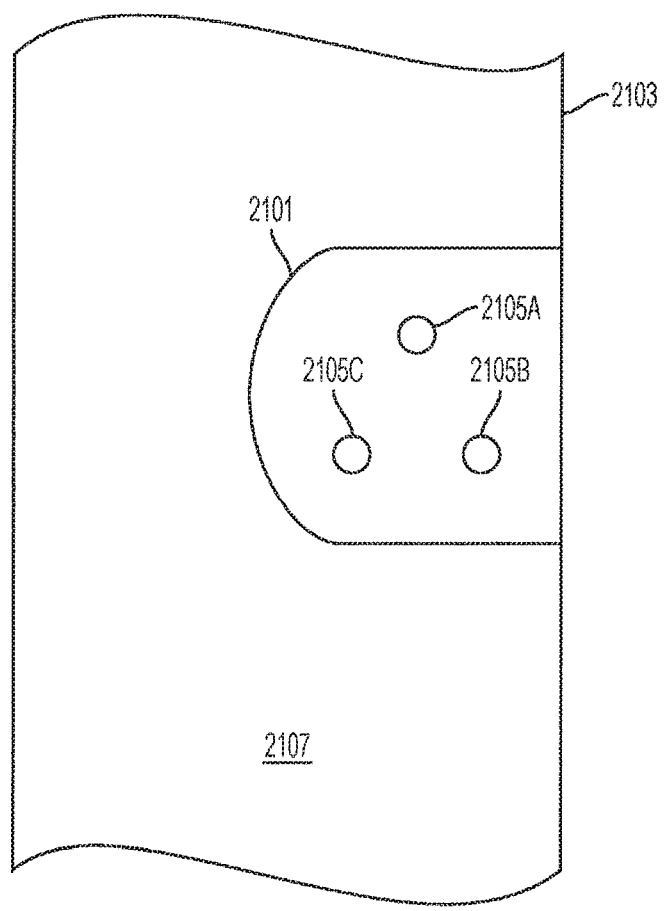
FIG. 21 illustrates a schematic plan view of arrangement of certain water circulators (and baffle) according to an embodiment of the present disclosure.

Referring now to FIG. 21 (which is a plan view), an embodiment is shown in which partial depth baffle 2101 extends from a first berm 2103 back to the first berm 2103, containing therein water circulators 2105A, 2105B and 2105C. While this FIG. 21 shows baffle 2101 extending from a right side berm, the baffle 2101 could instead extend from a left side berm or any other desired side of the lagoon 2107. In an example, a section of the berm may act as a portion of the baffle.

Figure 22:
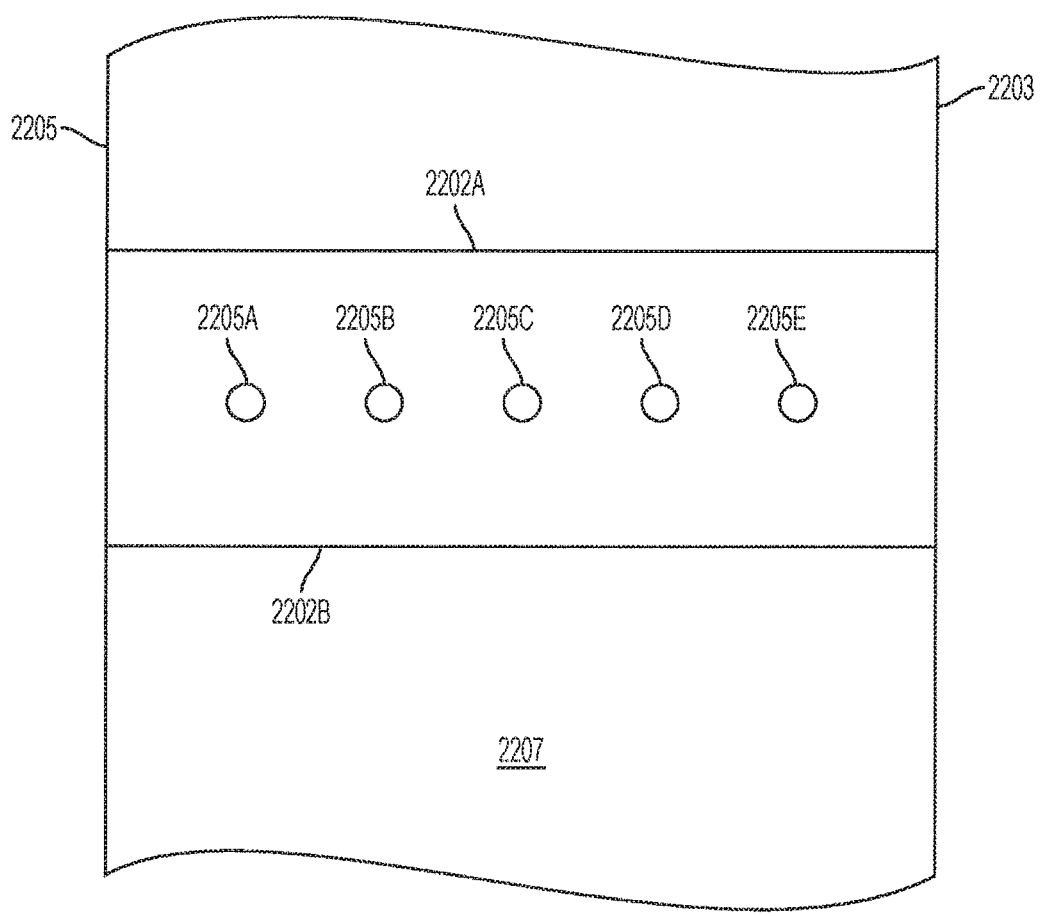
FIG. 22 illustrates a schematic plan view of arrangement of certain water circulators (and baffles) according to an embodiment of the present disclosure.

Referring now to FIG. 22 (which is a plan view), an embodiment is shown in which partial depth baffle 2202A and partial depth baffle 2202B extend from berm 2203 to berm 2205 in lagoon 2207, containing between the two baffles a linear line of water circulators 2205A-2205E. In an example, sections of one or more berms may act as portions of the baffles.

In another embodiment, a surface aerobic layer with dissolved oxygen >1.0 mg/l is in fluid communication with a subsurface anaerobic layer with oxygen reduction potential (ORP) more negative than −250 mV. In this regard, as is known to one of ordinary skill in the art, an ORP equal to or greater than 0 mv is aerobic, an ORP between 0 and −250 mv is facultative, and an ORP below −250 mv is anaerobic.

In another embodiment, a system is provided for formation of biologically active granules that reduce BOD in a lagoon containing circulating water. In this embodiment, the lagoon includes a bottom thereof. The water of the lagoon has a surface layer with dissolved oxygen >1.0 mg/l and a pH >7.0 and an anaerobic bottom layer with an ORP more negative than −250 mV and a pH <7.0 wherein substantially horizontal surface water flows repeatedly through the surface layer and then through the bottom layer before returning to the inlet of a water circulator.

In another aspect of the present disclosure, in any of the embodiments described herein, the distance between two neighboring circulators range from 10 feet to 50 feet, and in another embodiment from 20 feet to 40 feet, and in still further embodiment, from 25 feet to 35 feet, and in still another embodiment, from 28 feet to 32 feet, and in still another embodiment, 30 feet.

The following examples are meant to illustrate the present invention, but are non-limiting.

Comparative Example 1 and Example 1

In this example, a chicken processing plant passed its waste through an anaerobic digester, neutralized the once-digested waste with CaO and then passed it through an aerobic sequencing batch reactor. The double-digested solid waste was then pumped into a sludge holding pond. The recalcitrant sludge was circulated with a BF/CSTR and 9 outlying BFs. New sludge was digested as received, but ancient sludge inventory was not reduced.

The 4 BFs adjacent to the influent were converted into aeration (reciprocating flow) mode and the CSTR baffle was removed. The BFs were about 100 ft from each other, too far to form hydraulic corners. Sludge digestion improved slightly.

The 4 BFs were then moved to 30 ft spacing to form a plurality of hydraulic corners. Ancient sludge digestion began and pre-existing "sandbars" were digested. Forming a plurality of hydraulic corners was a vast improvement.

Example 2

4 reciprocating blue frog circulators were placed on 30 ft centers adjacent to the inlet of a large pond with 0.5 MGD municipal waste flow (BF cluster). The mean sludge depth (n=14) was 5.0 ft. After 86 days, the mean sludge depth was 2.55 ft, a −49% reduction.

Example 3

1.) In a lagoon treating 0.8 MGD of municipal waste, a 4-pack cluster of water circulators (all 4 in cavitating mode) was installed with 30 ft center-to-center spacing. 2.) The pond had a persistent VFA odor and the effluent BOD was too high (105 mg/l). 3.) 49% of the sludge was digested (~2.5 ft) in 3 months. 4.) The flow was reversed (to non-cavitating) on two of the 4 circulators (diagonally opposed) in the cluster (the ratio (discussed in connection with Table 1) was =5.6). 5.) Overnight, the odor went away and the BOD dropped to 40 mg/l. 6.) The next sludge measurement (after 6 months) showed a 55% total reduction in sludge.

Without wishing to be bound, this is what is believed to have occurred: 1.) During the first 3 months, granules and excess enzymes were made. 2.) The enzymes hydrolyzed the alluvial sludge inventory and produced VFA. 3.) The granules did not have enough capacity to consume all the VFA. 4.) Excess VFA caused the odor. 5.) Dissolved VFA increased the BOD of the effluent to e.g., 105 mg/l. 6.) When the set up was changed from 4 cavitating BFs to 2 cavitating/2 non-cavitating BFs, there was a reduction in the enzymes released (less gross cavitation=less lysing=fewer enzymes) (the ratio (discussed in connection with Table 1) went from 10 to 5). 7.) With fewer enzymes to hydrolyze solids into VFA, the now excess granules consumed all the VFA, the odor ceased, the BOD was cut in half and the rate of sludge digestion slowed.

In this example, the number of cavitating circulators acts like a throttle to modulate enzyme production. Throttling up (4 of 4) made Step 4 of waste treatment (acid consumption) rate limiting. Throttling back (2 of 4) made VFA production rate limiting. This was unexpected because there is a three way balancing act: sludge digestion, VFA production and VFA consumption.

It was unexpected to have two rate limiting steps in the same process. This is only possible because solids surge (i.e. sludge build up) allows separation of the overall process into two processes. The hydraulic corners maximized the production of granules so that they were in excess once the alluvial sludge inventory was digested (total solids <2.5%); the percent of circulators in cavitating mode allowed throttling back until acid formation was rate limiting (i.e. all the VFA produced is immediately consumed). This makes the effluent clean, the pond odor-free and no sludge accumulates. It is believed that this effect has never been achieved before without added chemicals, added bacteria or added enzymes.

Example 4 and Comparative Example 2

4 reciprocating BF circulators (horizontal inlet) were placed on 30 ft centers adjacent to the inlet of a large pond with 0.5 MGD municipal waste flow to form a BF cluster. The mean sludge depth (n=14) was 5.0 ft. After 86 days, the mean sludge depth was 2.55 ft, a −49% reduction.

A single BF (reciprocating flow; horizontal inlet)/CSTR and two freestanding BFs treated a smaller lagoon (flow=0.1 MGD) containing 4.51 ft of sludge. After 200 days, the sludge was 2.34 ft (−48%). The flow per reciprocating BF was about the same, but, in contrast, the time to reduce similar amounts of sludge with the BF cluster was reduced by 57% (200 days versus 86 days).

Without the cluster (a single BF/CSTR), it took 200 days to digest half the sludge; with the cluster, half the sludge was digested in 86 days. The increased cluster rate of digestion was unexpected. The improvement is one of making more engineered hydraulic walls to stimulate anaerobic lagoon granule activity by "force feeding" the granules with anaerobic substrate delivery.

Comparative Example 3 and Example 5

The BF/CSTR (horizontal inlet) is a well-mixed tank with an upper produced, well-mixed high-DO aerated zone (DO=9.4 mg/l) and an induced lower DO, well-mixed, aerated zone (DO=7.99 mg/l). BOD is reduced 11.3%.

The improved BF/CSTR (vertical inlet) is not well mixed. There is an upper aerated zone (DO=6.49 mg/l) and a lower anaerobic zone (DO=0.18 mg/l; ORP=−441.6 mV). Flow "A" follows the inside perimeter of the baffle-enclosed area, creating a large quiescent zone ("Zone 2") in the middle of the enclosed area. BOD is reduced 90%.

Referring to FIG. 16 and without wishing to be bound, it is believed that: (1) At "1", cavitation lyses intact bacteria cells, releasing internal enzymes; (2) At "2", collapsing cavitation bubbles strip free ammonia out of the water; (3) "3" is the end of the aerobic zone, where water is redirected down to the bottom; (4) Between "3" and "4" water flows down and air bubbles rise up. DO drops from 6.49 mg/l to 0.18 mg/l (this flow is about ⅜" thick and the concentrated enzymes produced in "1" are not diffused through the quiescent zone, but stay concentrated in perimeter flow "A"); (5) Between "4" and "6", water flows along the bottom, laterally back towards the inlet (the water is highly anaerobic (ORP=−441.6 mV), in addition, lagoon granules pull this enzyme-rich, anaerobic substrate into the granules and convert substrate into gas and brine); (6) At "6", swirl from BF 1601 creates a tornado-like vortex that creates a low pressure zone at "6". Flow is pulled laterally into the vortex and is pulled up vertically into the BF 1601 inlet.

The difference between 90% BOD reduction and 11.3% BOD reduction is large and unexpected. The BF/CSTR with horizontal inlet creates two aerated zones. The BF/CSTR with vertical inlet creates an aerated zone and an anaerobic zone. The anaerobic zone distinguishes the BF/CSTR (vertical) from the BF/CSTR (horizontal).

Example 6

Referring to FIG. 17C, worms commingle non-digestible ash and any remaining sludge to make worm castings. The returning perimeter flow has DO >0.5 mg/l. A FIG. 4 GF pump was placed 75 ft from the under/overflow outlet as shown in FIG. 17C. TSS dropped from 126 mg/l to 14 mg/l in one month and stayed at that low level. This unexpected drop is attributed to using perimeter flow to bring low levels of DO to the sludge/supernatant interface so that a viable worm colony is created. Worm castings are shot up into the returning flow and eventually are bled out of the system through the under/overflow.

Example 7

The Example 6 was replicated in Example 8, except the FIG. 4 GF was replaced by the FIG. 1a BF (mix mode). The pre-existing surface discharge means was surrounded by the FIG. 9D, 953B baffle. TSS was reduced −85% from 40 mg/l to 6 mg/l.

Explanation of Example 7

The FIG. 17C over/underflow did not exist in the Example 8 discharge means. Surrounding the existing surface discharge with the FIG. 9D, 953D baffle forces surface flow down the baffle face and then return to the BF inlet. The baffle rejects floating trash. Continuous sine waves sink suspended solids via a combination of gravity and half up-cycle downward friction to create a 6" clear sweet surface layer. As the surface 6" is redirected downward, a fraction is bled off and discharged, lowering the measured TSS.

As used herein, the terms "BOD" refers to biochemical oxygen demand.

The term "MGD" means Million gallons per day

The term "ORP" refers to Oxidation reduction potential, a measure of how anaerobic a system is "VFA: stands for volatile fatty acid.

The term "TSS" refers to total Suspended Solids.

The term "COD" refers to Chemical Oxygen Demand.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

APPENDIX

The following provides more detail as to what is believed to be the biochemistry involved in the process described in the present disclosure. Without wishing to, be bound, it is believed that:

1. The impeller rotates so as to push water down and out.
2. The chassis rises up as water is pushed down (equal and opposite reaction).
3. The radial annular opening rises above the waterline, ingests air and the impeller loses its prime.
4. The chassis crashes down, covering the annular opening with water.
5. The heel of water and the ingested air are whipped into froth by the impeller.
6. The froth density is lower than the surrounding water density and flow reverses.
7. Gas-free water flows past the impeller the "wrong way", causing intense cavitation (and shear) at the tip of the impeller.
8. Prime is regained and flow is down and out again.
9. The process cycles every 6seconds.
10. Cavitation bubble-collapse and re-formation stretches water molecules to the breaking point, forming ·OH and ·H free radicals.
11. Cavitation also causes mineral crystals to nucleate when the solution is supersaturated.
12. If the pH >6.5, $CO_3^=$ anions are formed and $CaCO_3$ seeds form.
13. Free radicals are among Nature's most energetic chemical entities.
14. The free radicals attack the bacterial cell wall and lyse it.
15. BOD increases slightly because BOD-rich intracellular fluid is released.
16. TSS declines significantly because the deflated sac has less mass.
17. Intracellular enzymes (protease-rich) are also released.
18. The $CaCO_3$ seeds are coated with a bacterial biofilm.
19. The bacteria secrete EPS, making the surface sticky.
20. Coated seeds agglomerate together and form lagoon granules.
21. The lagoon granules organize themselves based on the free ammonia in "hydrolytic brine" surrounding the granules at the bottom of the lagoon.

22. The brine is concentrated and rich with intracellular enzymes and extracellular enzymes.
    a. Normally sludge digestion is rate-limited by hydrolysis (with extracellular enzymes only). Solids accumulate.
    b. By adding intracellular enzymes to the extracellular enzymes, the rate of hydrolysis exceeds the rate of sludge accumulation. Solids are liquefied.
23. Lagoon granules convert hydrolyzed liquids into gas via 3 pathways.
    a. $H_2$ pathway
    b. Acetate pathway
    c. $CO_2$ DIET pathway

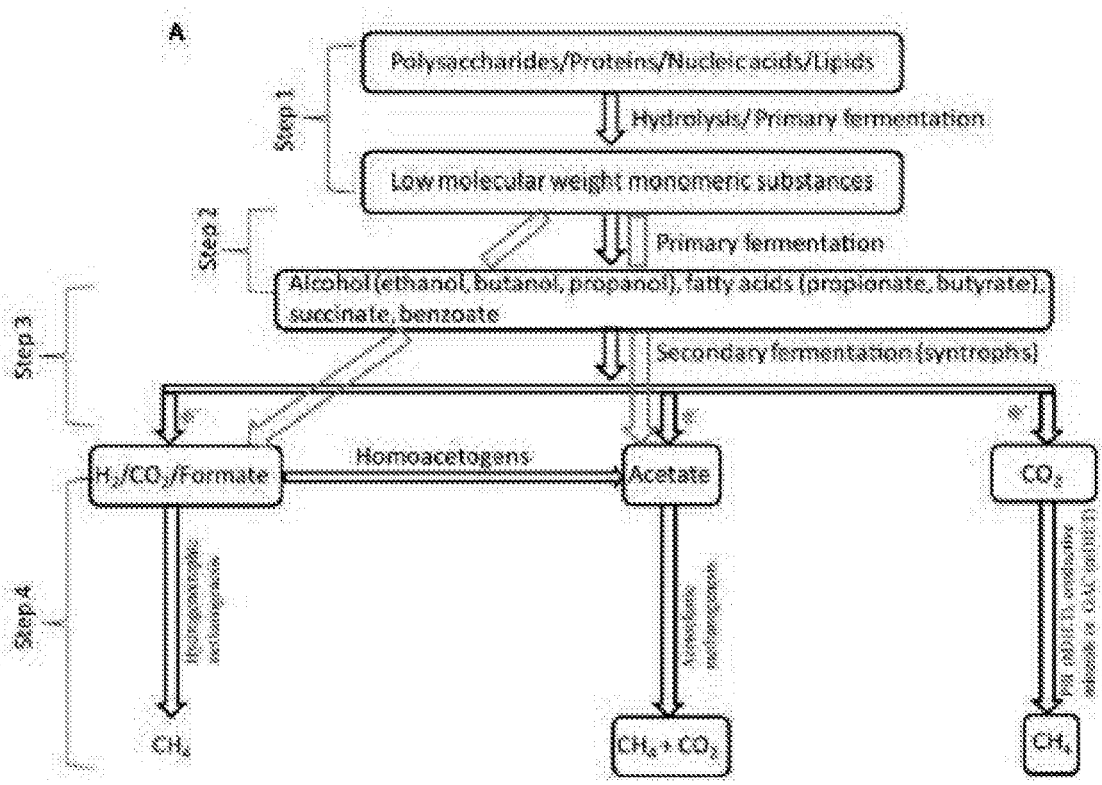

The biochemistry, with an aerobic bottom, such as a natural lake is slightly different:
1. Microalgae convert alkalinity and sunlight into DO and algal mass.
2. Zooplankton predators consume microalgae, creating a balanced system that controls pH, DO and TSS.
3. Algal DO supports an aerobic community that consumes dead algae and any other detritus that accumulates on the pond floor ("detritovores").

4. The water column clears.
5. Worms feed head down/tails up.
6. Worms shoot castings (including non digestible ash) up into the water column where they exit as part of the effluent stream.
7. TSS increases slightly.
8. There is no visible sludge in the downstream section of the terminal pond.
    9. Denitrification does not occur in BFS facultative ponds because the bottom is not anoxic.
    a. A portion of the effluent can be pumped back to the terminal BF/CSTR with its anaerobic section and at least some CBOD.

Clarification improves in the natural lake section. Without wishing to be bound, it is believed that cavitation by the water circulators, such as BFs and GFs, is used to mechanically tear off flagella from slow-to-settle flagella-bearing bacteria.

What is claimed is:

1. A system for the treatment of sludge in a lagoon containing water that promotes the formation of biologically active granules that digest sludge in the lagoon, the lagoon including a bottom thereof, the water of the lagoon having a surface layer, the system comprising: (i) X number of water circulators in a cluster having an impeller disposed in the lagoon, wherein X is greater than or equal to three, at least one of said X number of water circulators being configured to: (a) cavitate water taken from the lagoon; and (b) expel the water after cavitation, wherein the water is expelled from said impeller at constant impeller rotational speed at a cyclically varying flow rate radially across a surface of the lagoon from the centerline of each circulator such that at least some of the expelled water travels away from each of the water circulators in a path essentially parallel to the surface layer of the lagoon water and wherein at least some of the expelled water travels downward as a pulsed liquid flow towards the bottom of the lagoon; when said at least one water circulator is a number of water circulators less than X, the remainder of said X number of water circulators, other than said at least one water circulator, being configured to expel water taken from the lagoon, wherein the water is expelled from the remaining water circulator(s) such that at least some of the expelled water travels away from the water circulator in a path essentially parallel to the surface layer of the lagoon water; said X number of water circulators are disposed in the lagoon in a configuration such that: each water circulator is located essentially on a circumference of a circle defined by a predetermined radial distance from a center point of the circle and each water circulator is located essentially equidistant, along the circumference of the circle, from each adjacent one of the other water circulators; (ii) hydraulic wall formed from at least some of the water expelled from each of a given pair of adjacent water circulators, wherein each of the hydraulic walls intersects at a midpoint of any two adjacent circulators, said hydraulic wall redirecting the expelled water downward towards the bottom of the lagoon, and thereafter towards an inlet of the water circulator, thereby creating conditions for the formation of the biologically active granules; and (iii) a quiescent area in fluid communication and downstream from the water circulator that cavitated the water, and located in a redirected path of the expelled water towards the bottom of the lagoon, whereby the expelled water forms a water column in said quiescent area to stratify the biologically active granules into a plurality of layers according to their density.

2. The system according to claim 1 where each water circulator has associated therewith a respective vertical centerline, wherein there is a distance D between the vertical centerlines of each of a given pair of water circulators, which D ranges from about 25 feet to about 75 feet.

3. The system of claim 1 where X in the cluster is 5.

4. The system of claim 1 additionally comprising hydraulic corners wherein each of a given pair of adjacent hydraulic walls forms a respective hydraulic corner where the given pair of hydraulic walls intersect essentially at the center point; wherein the hydraulic walls direct water expelled from each of the water circulators into the hydraulic corners; and wherein the hydraulic corners force at least some of the water directed therein by the hydraulic walls downward, towards the bottom of the lagoon.

5. The system according to claim 4 where each water circulator has associated therewith a respective vertical centerline, wherein there is a distance D between the vertical centerlines of each of a given pair of water circulators, which D ranges from about 25 feet to about 75 feet.

6. The system of claim 5 where X in the cluster is 5.

7. A method for the treatment of sludge in a lagoon containing water that promotes the formation of biologically active granules that digest sludge in the lagoon, the lagoon including a bottom thereof, the water of the lagoon having a surface layer, the water of the lagoon at the commencement of treatment having an initial pH of at least 7.5, after which the pH may range from 6.2 to 10, the method comprising forming the system of claim 1 by: (a) placing X number of water circulators in the lagoon in a cluster, wherein X is greater than 3; (b) configuring at least one of said X number of water circulators to: (i) cavitate water taken from the lagoon; and (ii) expel the water after cavitation, wherein the water is expelled such that at least some of the expelled water travels away from each of the water circulators in a path essentially parallel to the surface layer; (c) when said at least one water circulator is a number of water circulators less than X, configuring a remainder of said X number of water circulators, other than said at least one water circulator to expel water taken from the lagoon, wherein the water is expelled from the remaining water circulator(s) such that at least some of the expelled water travels away from the water circulator in a path essentially parallel to the surface layer of the lagoon water, and at least some of the expelled water travels downward as a pulsed liquid flow towards the bottom of the lagoon; each water circulator X is located essentially on a circumference of a circle defined by a predetermined radial distance from a center point of the circle and each water circulator X is located essentially equidistant, along the circumference of the circle, from each adjacent one of the other water circulators; (d) configuring the X number of water circulators such that at least some of the water expelled from each of a given pair of adjacent water circulators form a hydraulic wall such that the hydraulic walls are formed at the midpoint of any two adjacent circulators, said hydraulic wall redirecting the expelled water downward towards the bottom of the lagoon, thereby creating conditions for the formation of the biologically active granules, and thereafter towards an inlet of the water circulator; and allowing a quiescent area in fluid communication and downstream of the water circulator cavitating the water to form, said quiescent area located in a redirected pathway of the expelled water flowing towards the bottom of the lagoon, whereby the expelled water forms in the quiescent area a water column to stratify the granules into a plurality of layers according to the density of each of the granules.

8. The method of claim 7 wherein each of a given pair of adjacent hydraulic walls forms a respective hydraulic corner where the given pair of hydraulic walls intersect essentially at the center point; and the hydraulic walls direct water expelled from each of the water circulators into the hydraulic corners; and the hydraulic corners force at least some of the water directed therein by the hydraulic walls downward, towards the bottom of the lagoon.

9. The method according to claim 7 where each water circulator has associated therewith a respective vertical centerline, wherein there is a distance D between the vertical centerlines of each of a given pair of water circulators, which D ranges from about 25 feet to about 75 feet.

10. The method of claim 7 where X in the cluster is 5.

11. Lagoon granules formed by the method of claim 7.

12. A system for the treatment of sludge in a lagoon containing water that promotes the formation of biologically active granules that digest sludge in the lagoon, the lagoon including a bottom thereof, the water of the lagoon having a surface layer, the system comprising: Y number of clusters of water circulators disposed in the lagoon, wherein Y is 2, 3, 4, 5, 6, 7, 8, 9, 10, 11, 12, 13, 14, 15, 16, 17, 18, 19, or 20; each of the Y number of clusters of water circulators comprising the system of claim 1.

13. The system according to claim 12 where each water circulator has associated therewith a respective vertical centerline, wherein there is a distance D between the vertical centerlines of each of a given pair of water circulators, which D ranges from about 25 feet to about 75 feet.

14. The system of claim 12 where X in the cluster is 5.

15. The system of claim 12 additionally comprising hydraulic corners wherein each of a given pair of adjacent hydraulic walls forms a respective hydraulic corner where the given pair of hydraulic walls intersect essentially at the center point; the hydraulic walls direct water expelled from each of the water circulators into the hydraulic corners; and the hydraulic corners force at least some of the water directed therein by the hydraulic walls downward, towards the bottom of the lagoon.

16. The system according to claim 15 where each water circulator has associated therewith a respective vertical centerline, wherein there is a distance D between the vertical centerlines of each of a given pair of water circulators, which D ranges from about 25 feet to about 75 feet.

17. The system of claim 16 where X is 5.

18. A method for the treatment of sludge in a lagoon containing water that promotes the formation of biologically active granules that digest sludge in the lagoon, the lagoon including a bottom thereof, the water of the lagoon having a surface layer, the water of the lagoon at the commencement of treating having an initial pH of at least 7.5, after which the pH may range from 6.2 to 10, the method comprising: forming Y number of clusters of water circulators in the lagoon, wherein Y is 2, 3, 4, 5, 6, 7, 8, 9, 10, 11, 12, 13, 14, 15, 16, 17, 18, 19, or 20; each of the Y number of clusters of water circulators being formed by preparing the system of claim 1.

19. The method of claim 18 where each water circulator has associated therewith a respective vertical centerline, wherein there is a distance D between the vertical centerlines of each of a given pair of water circulators, which D ranges from about 25 feet to about 75 feet.

20. The method of claim 19 where X is 5.

21. The method of claim 18 additionally comprising forming hydraulic corners from a given pair of adjacent hydraulic walls that intersect essentially at the center point the hydraulic walls such that the hydraulic walls direct water expelled from each of the water circulators into the hydraulic corners; and such that the hydraulic corners force at least some of the water directed therein by the hydraulic walls downward, towards the bottom of the lagoon.

22. Biologically active granules that digest sludge prepared by the method of claim 18.

23. The system of claim 20, wherein an upper edge of a baffle is configured to at least partially float on the surface layer of the lagoon water.

24. A method for formation of biologically active granules that digest sludge in a lagoon containing water, the lagoon including a bottom thereof, the lagoon being bounded on at least a first side by a first berm and a second side by a second berm, the lagoon having an influent input side, the water of the lagoon having a surface layer, the water of the lagoon having an initial pH of at least 7.5, after which the pH may range from 6.2 to 10, the method comprising:

placing in the lagoon a baffle, the baffle being disposed across the lagoon between the first berm and the second berm, the baffle dividing the lagoon into at least a first cell and a second cell, the first cell being on a first side of the baffle, the first cell being adjacent to the influent input side of the lagoon, the second cell being on a second side of the baffle, the second cell being adjacent to the first cell, the baffle extending from the surface layer of the lagoon water toward the bottom of the lagoon, the baffle being of a vertical height such that the baffle does not reach the bottom of the lagoon; and placing at least 3 water circulators in the lagoon, each water circulator being disposed in the first cell of the lagoon, each water circulator being configured to (a) take in water from the lagoon travelling along a substantially vertical path, essentially perpendicular to the surface layer of the lagoon water, leading up to the water circulator from below the water circulator; and (b) expel the water taken in, wherein the water is expelled such that at least some of the expelled water travels away from the water circulator toward the baffle in a path essentially parallel to the surface layer of the lagoon water, and at least some of the expelled water travels downward as a pulsed liquid flow towards the bottom of the lagoon;

wherein at least some of the water expelled from a given one of the 3 water circulators forms a respective hydraulic wall between the given water circulator and a respective one of the other water circulators;

wherein each of the hydraulic walls intersects essentially at a center point relative to the 3 water circulators;

wherein each of a given pair of adjacent hydraulic walls forms a respective hydraulic corner where the given pair of hydraulic walls intersect essentially at the center point;

wherein the hydraulic walls direct water expelled from each of the plurality of water circulators into the hydraulic corners;

wherein the hydraulic corners force at least some of the water directed therein by the hydraulic walls downward, towards the bottom of the lagoon, and thereafter towards an inlet of the water circulator, thereby creating the conditions for the formation of the biologically active granules;

wherein at least some of the expelled water impinges on the baffle and is redirected downward toward the bottom of the lagoon; and wherein a path for effluent to travel from the first cell to the second cell is formed below the baffle, between a bottom edge of the baffle and the bottom of the lagoon.

25. The system according to claim 1, wherein X is greater than or equal to five, and wherein each of the X number of water circulators is placed at a vertex of a series of imaginary adjacent triangles, wherein each one of the adjacent triangles shares one side and two vertices with a triangle adjacent thereto in the series of imaginary triangles, and wherein each imaginary triangle is inverted in comparison to the triangle adjacent thereto.

26. The method of claim 7, wherein X is greater than or equal to five, and wherein each of the X number of water circulators is placed at a vertex of a series of imaginary adjacent triangles, wherein each one of the adjacent triangles shares one side and two vertices with a triangle adjacent thereto in the series of imaginary triangles, and wherein each imaginary triangle is inverted in comparison to the triangle adjacent thereto.

27. The system according to claim 12, wherein Y is 5, 6, 7, 8, 9, 10, 11, 12, 13, 14, 15, 16, 17, 18, 19, or 20, and wherein each of the Y number of water circulators is placed at a vertex of a series of imaginary adjacent triangles, wherein each one of the adjacent triangles shares one side and two vertices with a triangle adjacent thereto in the series of imaginary triangles, and wherein each imaginary triangle is inverted in comparison to the triangle adjacent thereto.

28. The method of claim 18, wherein Y is 5, 6, 7, 8, 9, 10, 11, 12, 13, 14, 15, 16, 17, 18, 19, or 20, and wherein each of the Y number of water circulators is placed at a vertex of a series of imaginary adjacent triangles, wherein each one of the adjacent triangles shares one side and two vertices with a triangle adjacent thereto in the series of imaginary triangles, and wherein each imaginary triangle is inverted in comparison to the triangle adjacent thereto.

29. The method of claim 24, wherein the method comprises placing at least 5 water circulators in the lagoon, and wherein each of the water circulators is placed at a vertex of a series of imaginary adjacent triangles, wherein each one of the adjacent triangles shares one side and two vertices with a triangle adjacent thereto in the series of imaginary triangles, and wherein each imaginary triangle is inverted in comparison to the triangle adjacent thereto.

* * * * *